United States Patent [19]
Ido et al.

[11] Patent Number: 5,539,713
[45] Date of Patent: Jul. 23, 1996

[54] RECORDING-PLAYBACK DEVICE WITH TIME DEPENDENT EJECT SEQUENCE

[75] Inventors: Kazuhiro Ido; Eiichi Ishikawa; Masayuki Sakai; Yukio Yoshino, all of Tokyo, Japan

[73] Assignee: Clarion Co., Ltd., Saitame-ken, Japan

[21] Appl. No.: 319,153

[22] Filed: Oct. 6, 1994

[30] Foreign Application Priority Data

Oct. 12, 1993 [JP] Japan ................................ 5-277394

[51] Int. Cl.⁶ ........................... G11B 17/22; G11B 17/04
[52] U.S. Cl. .................................. 369/36; 369/33
[58] Field of Search ............................ 360/98.04, 98.05, 360/98.06, 99.02, 99.03, 99.06, 99.07, 69, 71; 369/33, 34, 36, 38

[56] References Cited

U.S. PATENT DOCUMENTS

| | | | |
|---|---|---|---|
| 4,896,312 | 1/1990 | Odawara et al. ................... | 369/77.2 |
| 4,991,043 | 2/1991 | Harumatsu et al. ................. | 360/94 |
| 5,036,503 | 7/1991 | Tomita ................................. | 369/34 |
| 5,146,446 | 9/1992 | Ota et al. ............................ | 360/98.05 |
| 5,177,722 | 1/1993 | Nakamichi et al. ................. | 360/98.05 |
| 5,193,079 | 3/1993 | Ko et al. ............................. | 360/98.06 |
| 5,239,527 | 8/1993 | Sakiyama ............................ | 369/34 |

*Primary Examiner*—Stuart S. Levy
*Assistant Examiner*—David L. Ometz
*Attorney, Agent, or Firm*—Price, Gess & Ubell

[57] ABSTRACT

The object of the invention is to provide, as an auto-changer device, a medium recording-playback device which makes it possible to improve the ease of operations for ejecting plural recording medium elements from inside the device. The device possesses a stocker in which plural MDs are stored in respective storage sections that are distinguished by identification numbers, a carrier which loads installed MDs into the stocker or ejects them from an insertion port as far as a reloading position, an eject key which sets the eject mode for the MDs, and a CPU which, in response to input of the eject key, causes MDs that are present in the device to be ejected in a set order.

11 Claims, 37 Drawing Sheets

103–106: No. KEYS (LOAD MEDIUM DESIGNATION)
116: EJECT KEY (EJECT COMMAND)
233: CPU (CONTROL MEANS)
3: CARRIER (TRANSPORT MEANS)
5: STOCK (MEDIUM STORAGE MEANS)
50a – 50d: STORAGE SECTIONS (STORAGE REGIONS)

RECORDING-PLAYBACK DEVICE WITH TIME DEPENDENT EJECT SEQUENCE

BACKGROUND OF THE INVENTION

1. Field of the Invention

The present invention relates to a data processing device such as a medium recording-playback device which effects set processes, e.g., information recording and playback in respect of data recorded in a recording medium for carrying information.

2. Description of Related Art

Compact disks (referred to below simply as "CDs") are widely known as a recording medium in which information is recorded. Recently, there has been an increasing availability of systems in which a plurality of CDs are loaded in a storage section of a player called a magazine. A player in which this magazine is set can be accommodated in the trunk of an automobile, and a main unit called a control unit is located near the driver's seat, the arrangements being such that it is possible for both selection and playback of required disks from amongst the CDs in the trunk to be effected from the driver's seat.

In recent years, there have been proposed optomagnetic-system minidisks (referred to below as "MDs"), which are recording media in which information recording disks are held in a case for protection. With MDs, it is possible to play back recorded information, and it is also possible to record information or to effect recording by rewriting information that has already been recorded.

The current development is one in which a variety of products are being developed as media information recording-playback devices for effecting recording on and playback of such MDs, and the art is seeking to optimize these features.

OBJECTS AND SUMMARY OF THE INVENTION

It is the object of the present invention to provide a medium recording-playback device which makes it possible to improve the ease of handling of MDs, etc., and which, in particular, improves the ease of operation for ejecting a plurality of recording media from inside a player unit.

It is an aspect of the medium recording-playback device of the present invention that, in order to accomplish the above object, it comprises a medium storage means in which a plurality of recording medium elements are respectively stored in plural storage regions that are distinguished by identification numbers, a transport means by which recording medium elements currently installed are loaded into respective storage regions of the recording medium storage means, or are ejected to a set position from an insertion port, a control means for inputting ejection commands that set an ejection mode in respect of recording medium elements, and a control means which, in response to these ejection commands, ejects, in a set order, recording medium elements that are present in the device. Since recording medium elements present in the device are ejected in a set order, any trouble involved in the operations by the user for selecting recording medium elements that are to be ejected can be greatly reduced.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in correction with the accompanying drawings.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein.

An example of the operation of a vehicle-mounted MD auto-changer device (referred to simply as "MD device") which is a medium recording-playback device of the invention will be described with reference to the drawings.

This MD device is one in which MDs are inserted and recording and/or playback of information recorded thereon is effected. A description of its structure and of ordinary MDs that are used therein will be omitted here, since these are described in detail in the corresponding U.S. application Ser. No. 08/284,358, filed on Aug. 2, 1994 for PATENT INFORMATION PROCESSING APPARATUS and incorporated herein by reference.

The operation of the CPU in this MD device will now be described with reference to the flowcharts of FIGS. 7–37.

A feature of the present invention resides in ejection processing by which disks present in the device are automatically ejected in a set order. This ejection processing is in correspondence to the flowcharts of FIGS. 12–16, 19, and 20.

Figure 7:
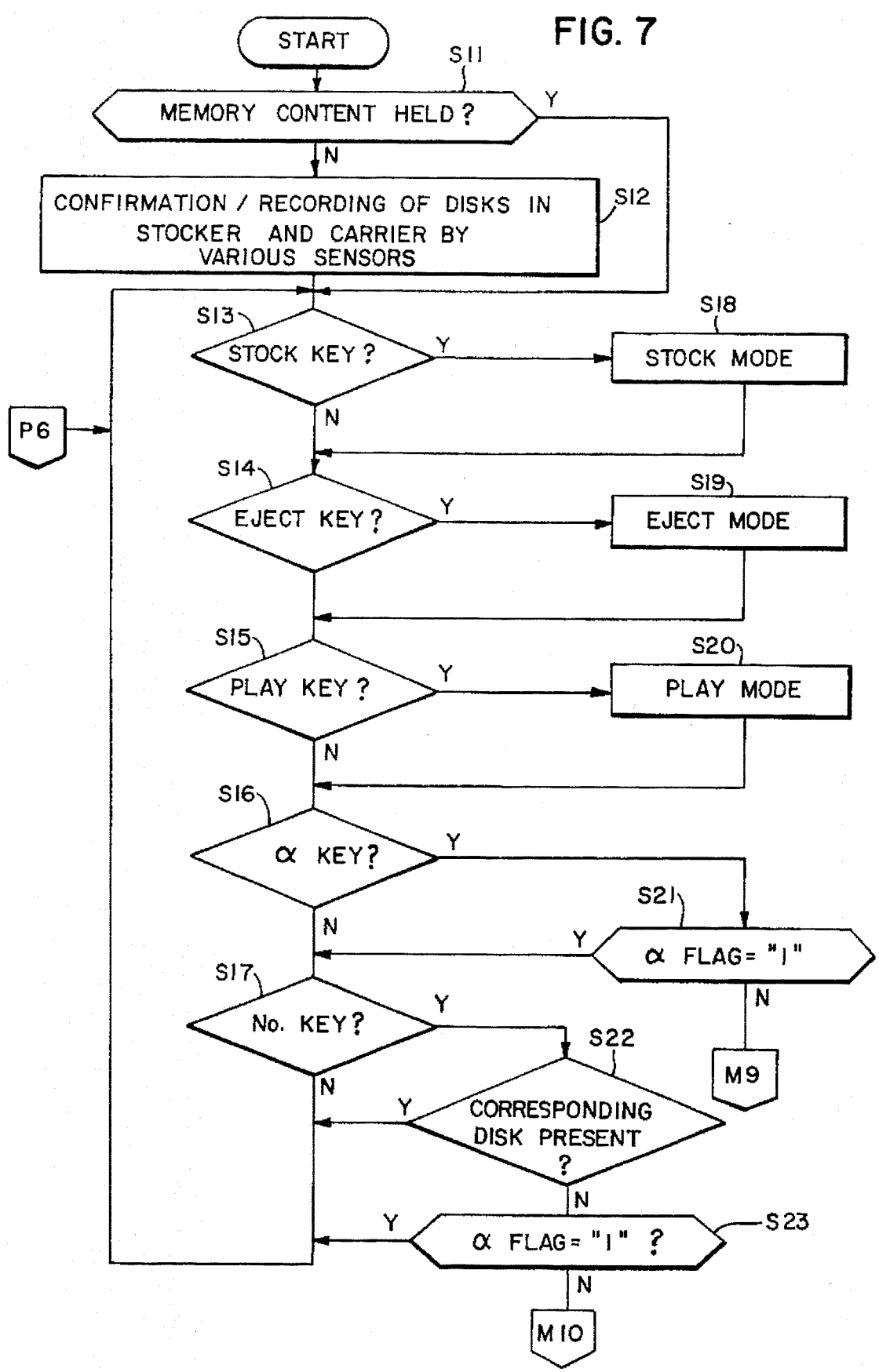
FIG. 7 is a flowchart showing the main routines of a CPU in the vehicle-mounted auto-changer device.

FIG. 7 is a main routine flowchart showing the principal processing operations in the CPU 233 of the MD device.

In FIG. 7, when the power supply for the MD device is switched on (the ACC switch is switched on), it is determined whether or not disk data relating to the various storage sections (50a–50d) of the stocker 5 and to a disk in the carrier 3 are held, through the agency of a vehicle backup power supply, in a memory not shown; that is, inside the above-noted CPU 233 (step S11).

Figure 1:
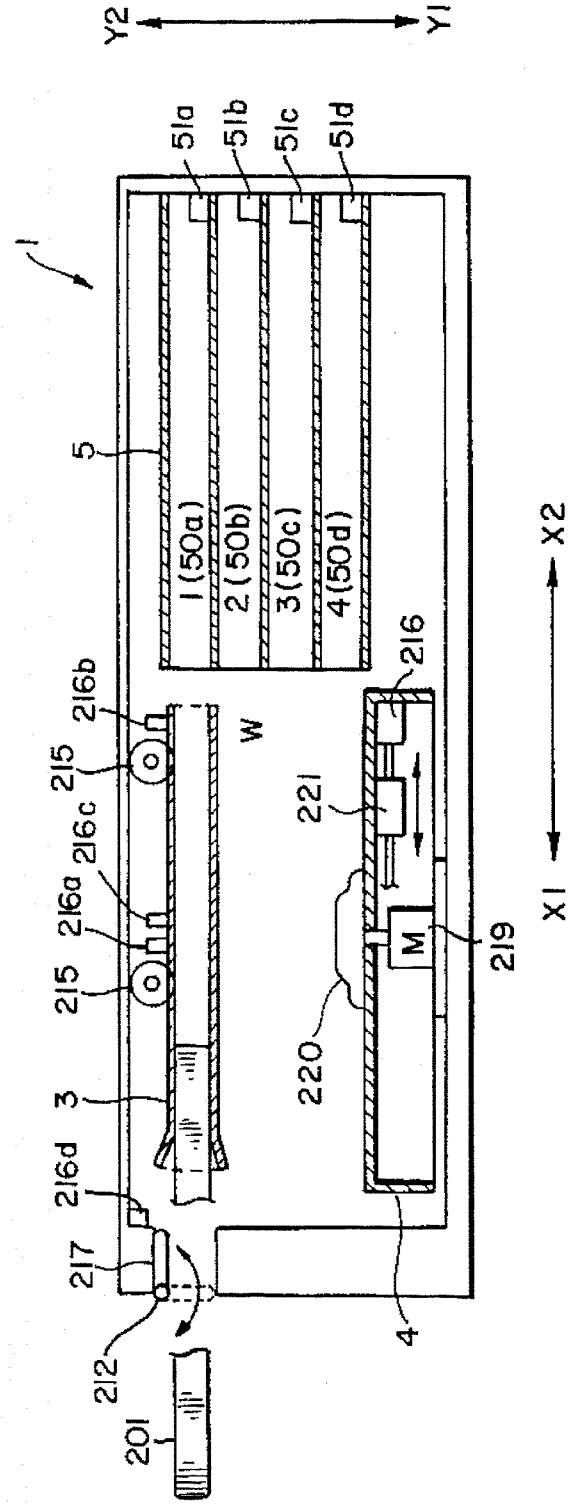
FIG. 1 is a cross-section showing the outline of the internal structure of a vehicle-mounted MD auto-changer device according to an embodiment of the invention.
Figure 2:
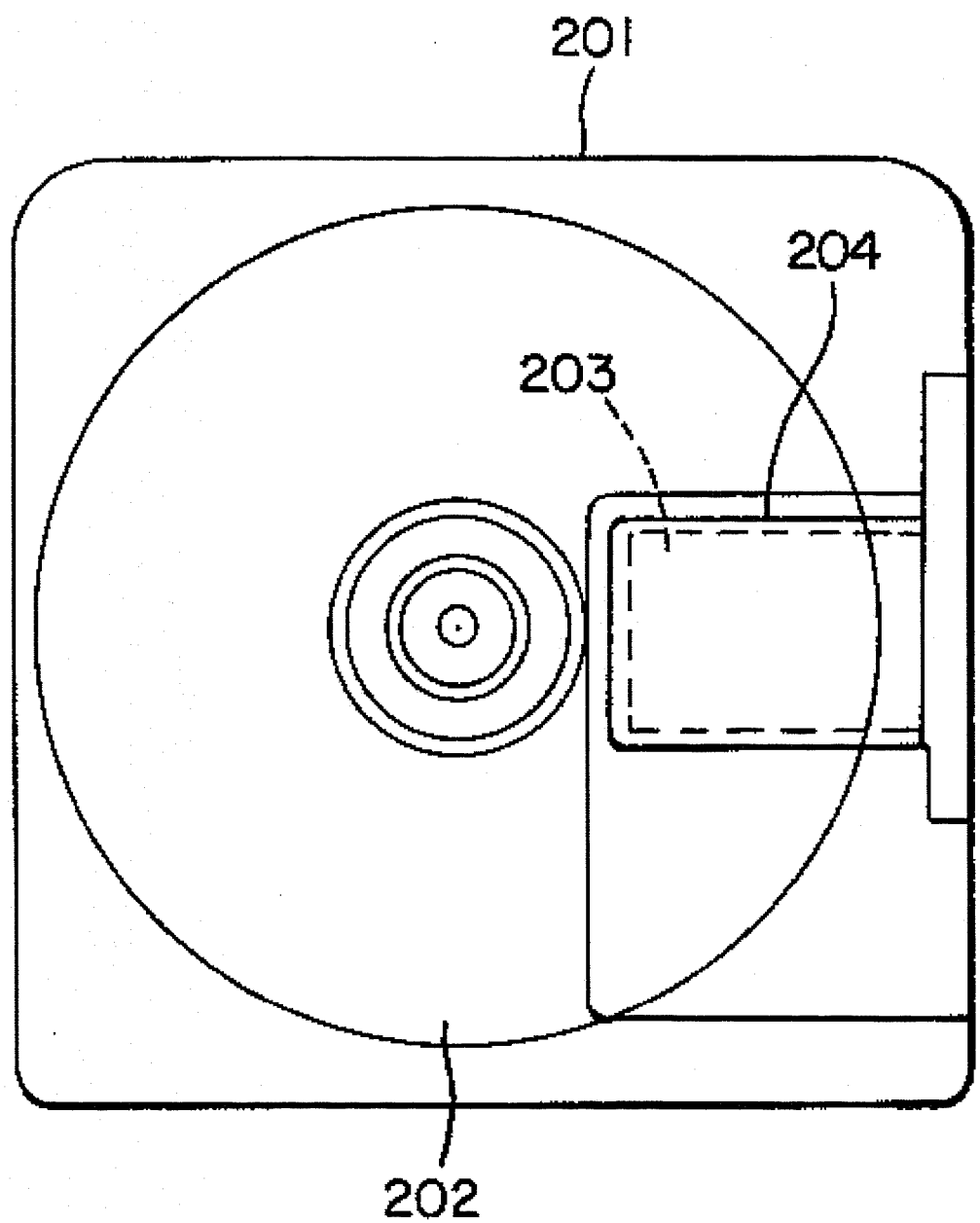
FIG. 2 is a plan view showing the structure of an ordinary MD.
Figure 3:
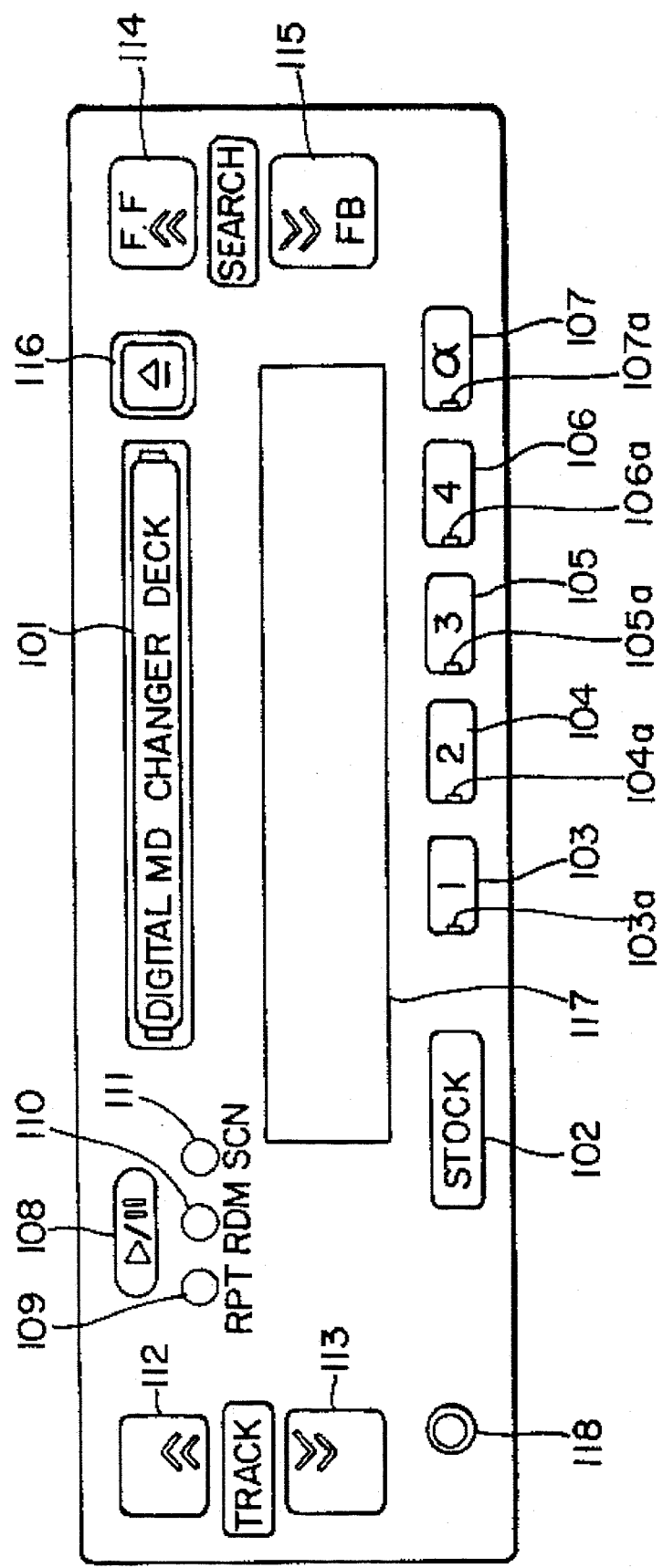
FIG. 3 is a plan view of a front panel.

If no such disk data are held, disks present in the above-noted storage sections (50a–50d) and carrier 3 are detected by the various sensors, shown in FIG. 1, consisting of the disk insertion sensor 216a, loading completion sensor 216b, ejection sensor 216c, disk withdrawal sensor 216d, disk set-down completion sensor 216e, and stocking completion sensors (51a–51d), etc., disk data are prepared, and these disk data (data indicating which stocker 5 storage sections disks are stored in, etc.) are stored in the above-noted memory (step S12).

Next, it is determined whether a stock key 102 input has been received (step S13). If there is no stock key 102 input, it is determined whether eject key 116 input has been received (step S14). If there is no eject key 116 input, it is determined whether play key 108 input has been received (step S15). If there is no play key 108 input, it is determined whether α key 107 input has been received (step S16). If there is no α key 107 input, it is determined whether No. key (103–106) input has been received (step S17). If there is no input from the No. keys (103–106), the routine goes to step S13. If the state is one in which the routine goes round the loop from step S13 to step S17, i.e., a state in which there has been no shift to any of the operating modes, which are the stock mode, play mode and eject mode, "PAUSE" or "STOP," notifying the user that there is no shift to any operating mode, is displayed by the display unit 117.

If it is found in step S11 that disk data are held, the routine goes to step S13.

If there is stock key 102 input in step S13, the routine goes into the stock mode for storing disks in the storage sections (50a–50d) of the stocker 5 (step S18).

If there is eject key 116 input in step S14, the routine goes into the eject mode for discharging a disk from inside the MD device (step S19).

If there is play key 108 input in step S15, the routine goes into the play mode for effecting disk playback, etc. (step S20).

If there is α key 107 input in step S16, it is determined whether the α flag is "1" or not (step S21).

A description relating to the α flag will now be given. If input is supplied from the α key 107, a disk that has been inserted via the disk insertion port 212 is not stored in any of the storage sections (50a–50d), but is set directly on the play section 4, even if one or another of the storage sections (50a–50d) is empty. Further, the α flag becomes "1," and, up to the time it is ejected from inside the MD device, the disk in question is not stored in a storage section (50a–50d).

Further, when the α flag is "1," even if there are disks stored in the various storage sections (50a–50d), access to these disks is inhibited, and recording and/or playback can be effected only in respect of the disk which, in response to the α key 107, has been set directly on the player section 4.

If input is supplied from the eject key 116 when the α flag is "1," the α-designated disk (i.e., the disk that has been set on the player section 4) is immediately ejected front inside the MD unit, and the α flag goes to "0." When the α flag is "0," it again becomes possible to extract and access any of the disks stored in the storage sections (50a–50d).

Thus, when the α flag is "1," even though the MD unit is a so-called auto-changer unit which can hold plural disks, it functions as a single-disk player in which a single disk that has been designated by input of the α key 107 is held.

After entry into the stock mode, which is described later, if, even though the stocker 5 storage sections (50a–50d) are full, a disk is inserted into the MD unit, the α flag automatically goes to "1."

On the basis of the α flag described above, the description returns to FIG. 7.

If the α flag is "1" in step S21, the routine goes to step S17, but if the α flag is not "1," the routine goes to M9, shown in FIG. 10, in the stock mode, which is described later.

The processing operations of step S16 and step S21 are such that, in cases where there is no move to any operating mode and the α flag is "0," a move to the stock mode can be effected on arrival of input from the α key 107, even if there is no stock key 102 input.

If input from a No. key (103–106) is present in step S17, it is determined whether the disk corresponding to the relevant No. key (103–106) is held in the unit (step S22). If the corresponding disk is present, the routine goes to step S13.

If the corresponding disk is not present in step S22, it is determined whether the α flag is "1" (step S23). If the α flag is "1," the routine goes to step S13. If the α flag is not "1" in step S23, the routine goes to M10, shown in FIG. 8, in the stock mode, which is described later.

The processing operations in step S17, step S22, and step S23 are such that, in cases where there is no move to any operating mode and the α flag is "0," a move to the stock mode can be made on input from a No. key (103–106) corresponding to an unloaded, empty storage section, even if there is no stock key 102 input.

Figure 4:
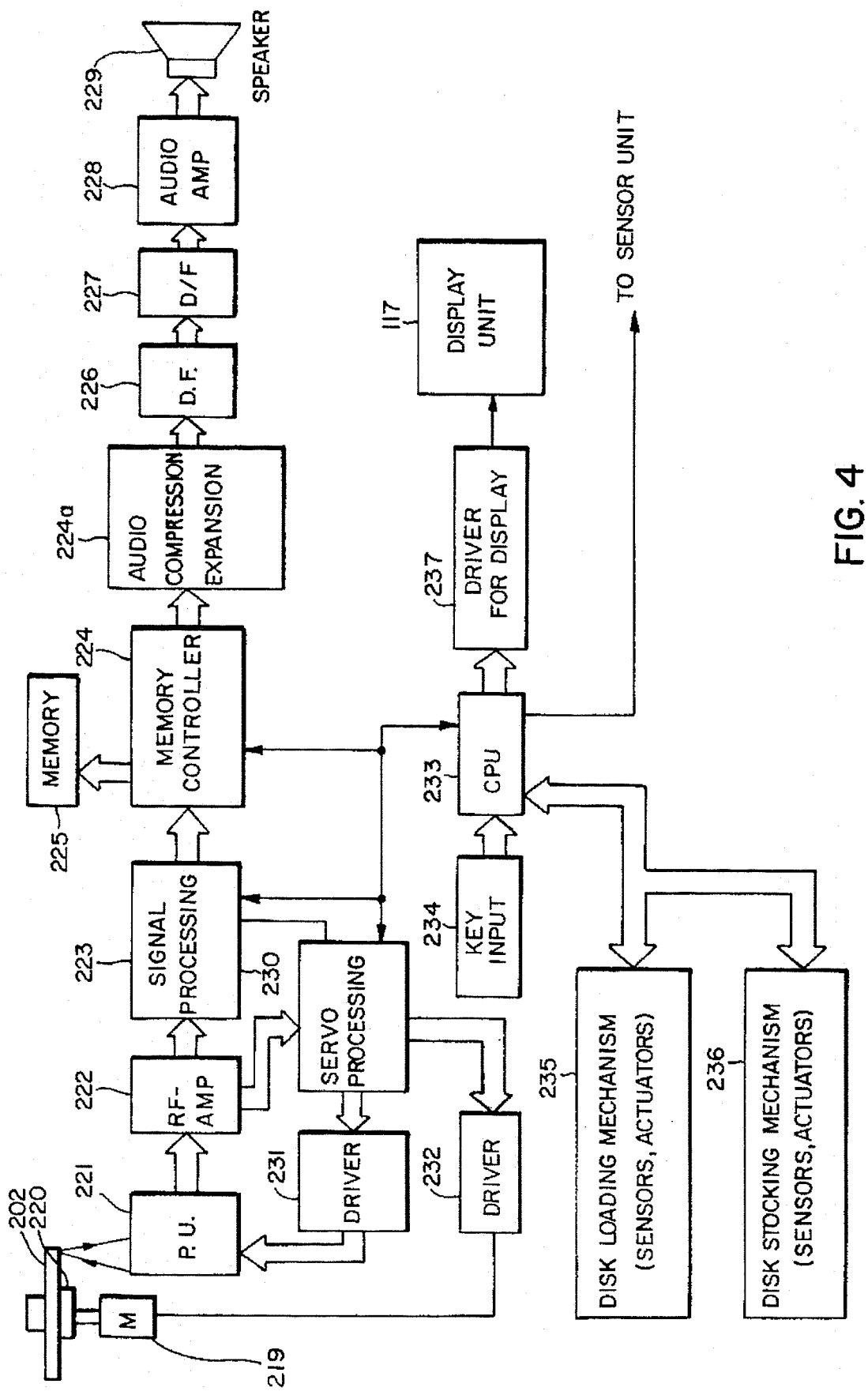
FIG. 4 is a block diagram showing the structure of the vehicle-mounted auto-changer device.
Figure 5:
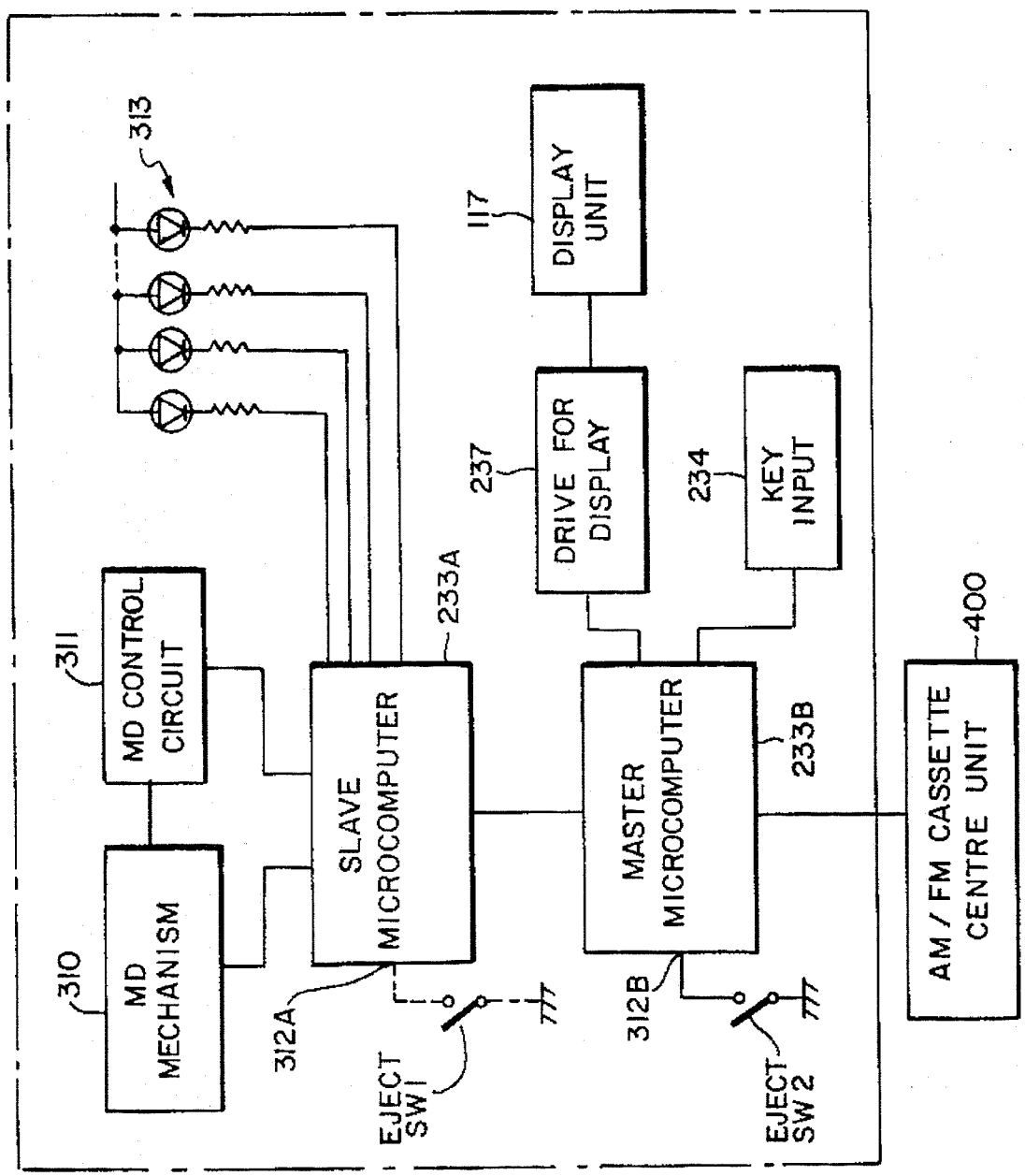
FIG. 5 is a block diagram showing a schematic circuit in the case where the vehicle-mounted MD auto-changer device is applied to a deck type in this embodiment.
Figure 6:
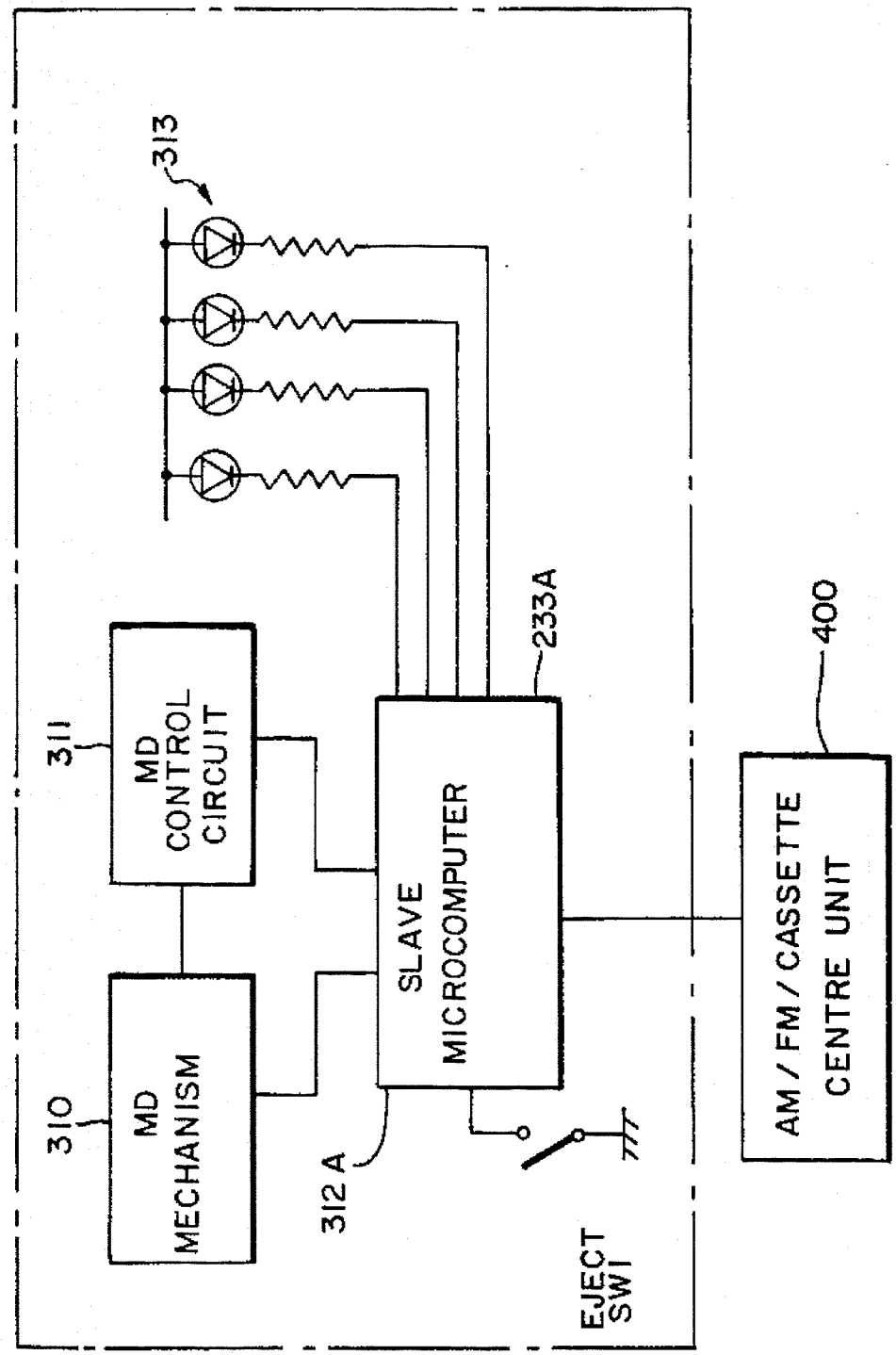
FIG. 6 is a block diagram showing a schematic circuit in the case where, as another embodiment, the vehicle-mounted MD auto-changer device is applied to a black box type.

The processing operation of the CPU 233, shown in FIG. 4, may also be made such that, if the routine is in the middle of an operating mode and the α flag is "0," then, on input from the α key 107 or a No. key (103–106) corresponding to an unloaded, empty storage section, a move to the stock mode is effected without input from the stock key 102.

The description now continues with reference to the CPU 233 processing operations in the stock mode, eject mode, and play mode constituting the various operating modes.

The processing operations of the CPU 233 in the stock mode indicated at step S18 will now be described with reference to FIGS. 8–11.

It is determined whether the α flag is "1" (step S31). If the α flag is not "1," the disk data noted above is referred to in order to determine whether there is an empty storage section in the storage sections (50a–50d) of the stocker 5 (step S32). If there is an empty storage section, then "STOCK MODE," informing the user that the current operating mode has moved to the stock mode, is displayed (step S33), and it is determined whether a disk is held in the carrier 3 (step S34). If a disk is held in the carrier 3, "WAIT," advising the user to wait, is displayed (step S35), and it is determined whether playback operation is currently in progress (step S36).

Figure 9:
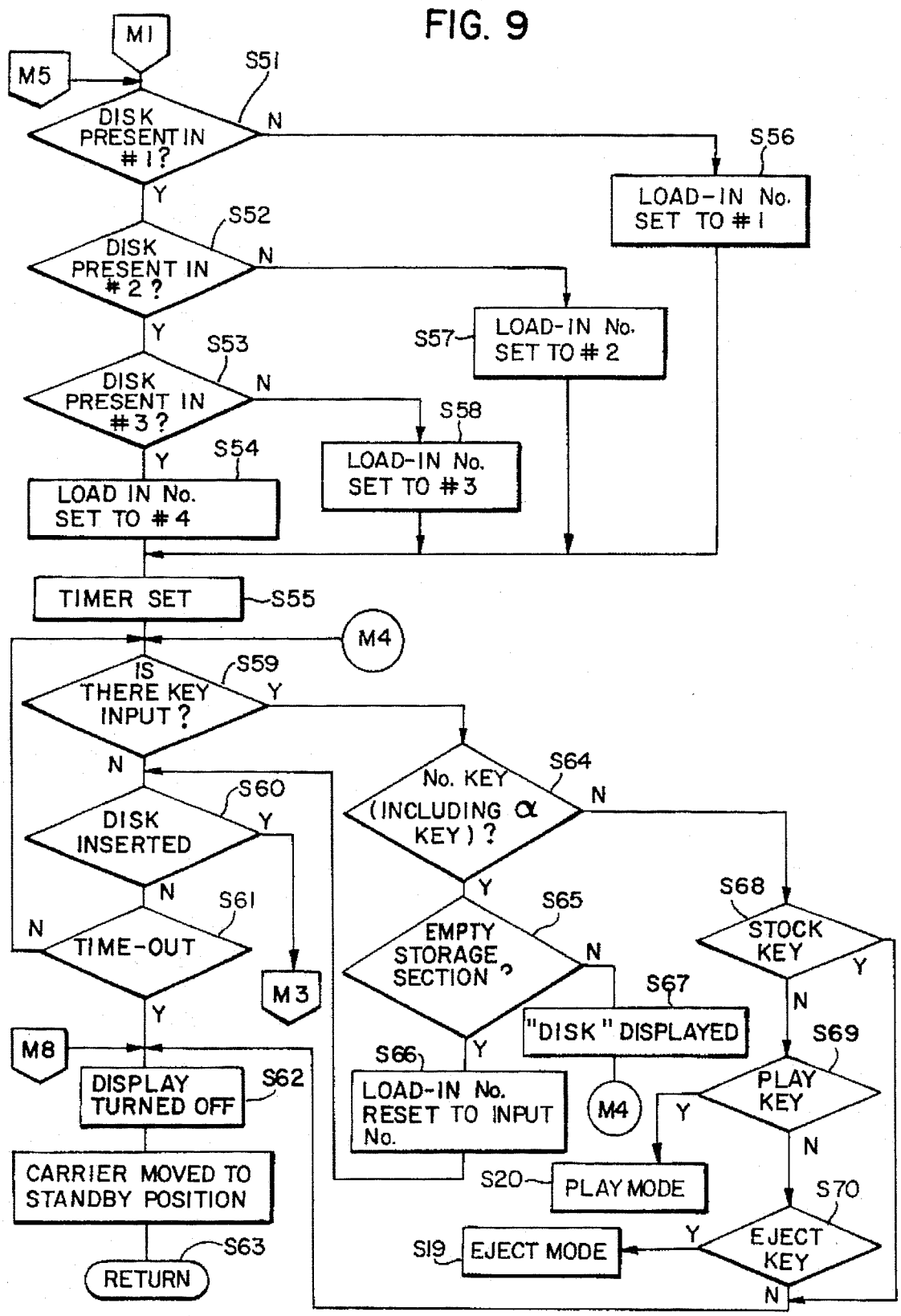
FIG. 9 is a continuation flowchart showing CPU processing operations in the stock mode.

If playback operation is currently in progress it is stopped (step S37), the disk in the carrier 3 is stored in its original storage section, with reference to the above-noted disk data (step S38), the carrier 3 is moved to a position facing the disk insertion port 212, i.e., to the insertion port location (step S39), "STOCK STANDBY," advising the user that preparations for disk storage are satisfactorily completed, is displayed (step S40), and the routine goes to M1 shown in FIG. 9.

If the α flag is "1" in step S31, "α-DISK," which informs the user that the state is one in which it is not possible to effect storage in the stocker 5, i.e., that α-designated disk (α disk) load-in has been completed, is displayed (step S41), and said stock mode is terminated. That is, the routine goes to step S14 of FIG. 7. Also, if there is no empty storage section in step S32, the routine goes to M2 in FIG. 11, which is described later.

If no disk is held in the carrier 3 in step S34, the routine goes to step S39. If playback operation is not currently in progress in step S36, the routine goes to step S38.

In M1 shown in FIG. 9, it is determined whether a disk has been loaded into the storage section 50a, which corresponds to identification number #1 (step S51). If a disk has been loaded into the storage section 50a corresponding to #1, it is determined whether a disk has been loaded into the storage section 50b corresponding to #2 (step S52). If a disk has been loaded into the storage section 50b corresponding to #2, it is determined whether a disk has been loaded into the storage section 50c corresponding to #3 (step S53). If a disk has been loaded into the storage section 50c corresponding to #3, the setting is made such that the disk that has been newly inserted via the disk insertion port 212 will be loaded into the storage section 50d corresponding to #4 (step S54), and a timer not shown which is in the CPU 233 is started (step S55).

If the storage section 50a corresponding to #1 does not contain a disk in step S51, the setting is made such that the disk inserted via the disk insertion port 212 is loaded into the storage section 50a corresponding to #1 (step S56), and the routine goes to step S55. If the storage section 50b corresponding to #2 does not contain a disk in step S52, the setting is made such that the disk inserted via the disk insertion port 212 is loaded into the storage section 50b corresponding to #2 (step S57), and the routine goes to step S55. If the storage section 50c corresponding to #3 does not contain a disk in step S53, the setting is made such that the disk inserted via the disk insertion port 212 is loaded into the storage section 50c corresponding to #3 (step S58), and the routine goes to step S55.

Thus, steps S51–S54 and steps S56–S58 constitute an auto-setting processing stage in which storage locations are automatically set.

After starting the timer in step S55, it is determined whether key input is present (step S59). If there is no key input, it is determined whether a disk has been inserted via the disk insertion port 212 (step S60). If no disk has been inserted, it is determined whether the timer that was started in step S55 has reached time-out (step S61). If it has, the display currently being shown is turned off (step S62), the carrier 3 is moved to a standby position, e.g., a position facing the storage section 50b (step S63), and the stock mode is terminated.

If key input is present in step S59, it is determined whether or not it is α key 107 input or No. key (103–106) input (step S64). If it is α key 107 input or No. key (103–106) input, it is determined whether the storage section (50a–50b) corresponding to the No. key (103–106) from which input has been supplied is empty (step S65). If the input storage section is empty, then resetting in which the storage section specified in the auto-setting processing stage of step S54, step S56, step S57, or step S58 is changed to the storage section input in step S64 is effected (step S66), and the routine goes to step S60. If the input is α key 107 input in step S64, the routine goes to step S66 after the processing of step S65.

Thus, step S64, step S65, and step S66 constitute a manual setting processing stage in which the loading position is arbitrarily set as required.

If there is no empty storage section in step S65, then "DISK," informing the user that the storage section input in step S64 contains a disk, is displayed (step S67), and the routine goes to M4 shown in the drawing. In this case, the arrangements may also be made such that the routine goes to step S55.

If there is no α key 107 or No. key (103–106) input in step S64, it is determined whether the key input of step S59 is stock key 102 input (step S68). If it is not input from the stock key 102, it is determined whether it is input from the play key 108 (step S69). If it is not input from the play key 108, it is determined whether it is input from the eject key 116 (step S70). If there is no input from the eject key 116, the routine goes to step S62.

If it is found that there is input from the stock key 102 in step S68, the routine goes to step S62. If there is input from the play key 108 in step S69, the routine goes into the play mode of step S20 shown in FIG. 7. If there is input from the eject key 116 in step S70, the routine goes into the eject mode of step S19 shown in FIG. 7.

Figure 10:
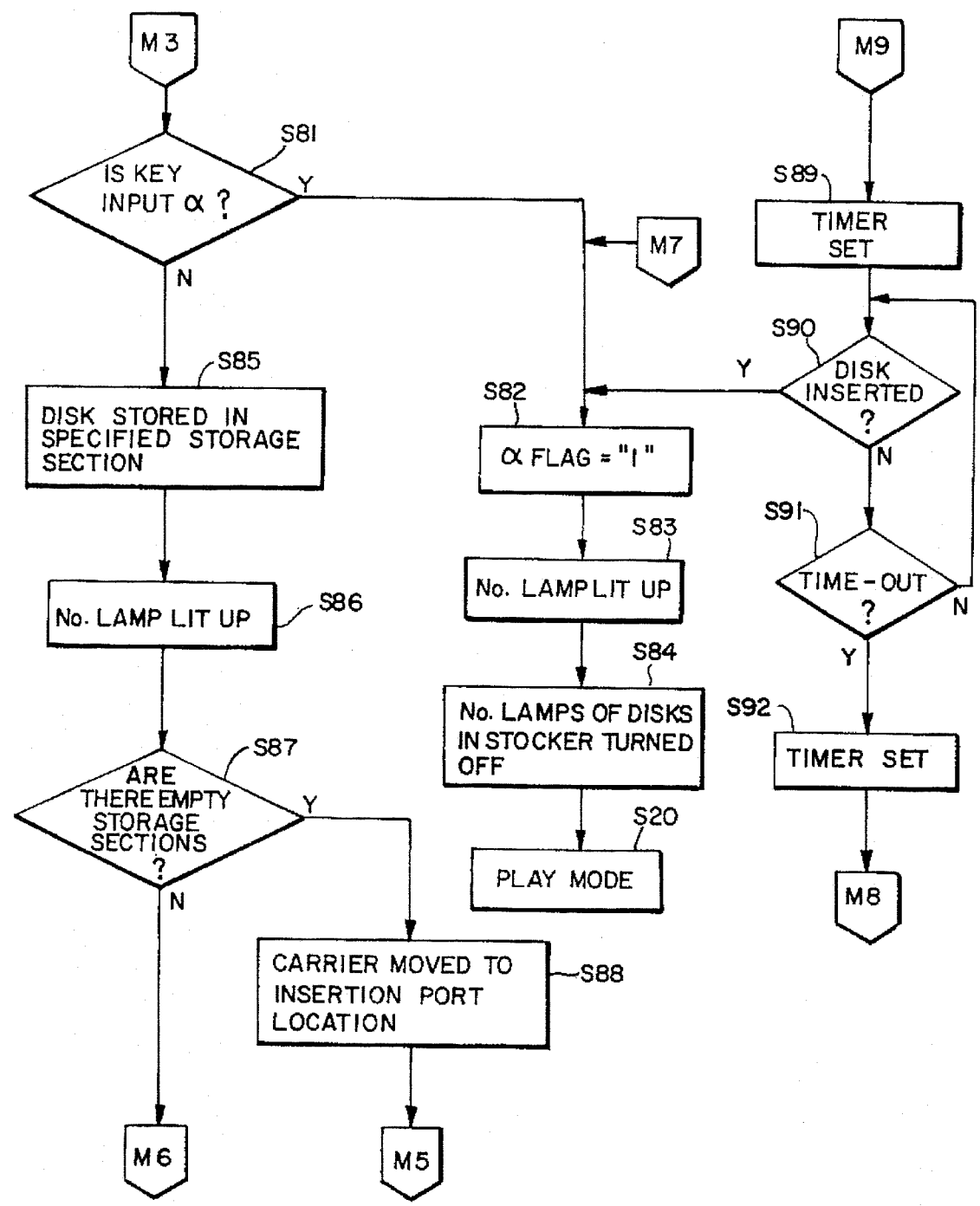
FIG. 10 is a continuation flowchart showing CPU processing operations in the stock mode.

If, in step S60, a disk has been inserted via the disk insertion port 212, the routine goes to M3 shown in FIG. 10.

At M3 shown in FIG. 10, it is determined whether, in step S59, there was input from the α key 107 (step S81). If there has been input from the α key 107, the α flag is made "1" (step S82), a display is given by lighting the No. lamp 107a corresponding to the α key 107 (step S83), the No. lamps (103a–106a) that are currently on and correspond to the storage sections (50a–50d) that contain disks are turned off (step S84), and the routine goes into the play mode of step S20 shown in FIG. 7. Since, as described earlier, accessing of the other stored disks is inhibited when an α disk is held in the device, execution of the processing operation of step S84 improves the ease of use for the user.

If it is found in step S81 that there was no α key 107 input in step S59, then the disk that has been inserted via the disk insertion port 212 is loaded (step S85) into that one of the storage sections (50a–50d) which has been specified by the auto-setting processing of step S54, step S56, step S57, and step S58 or by the manual setting processing of step S66, the No. lamp (103a–106a) corresponding to the storage section (50a–50d) into which this disk is loaded is lit (step S86), and it is determined whether there are any empty storage sections in the stocker 5 (step S87). If there is an empty storage section, the carrier 3 is moved to the insertion port location (step S88), and the routine goes to M5 shown in FIG. 9.

Figure 11:
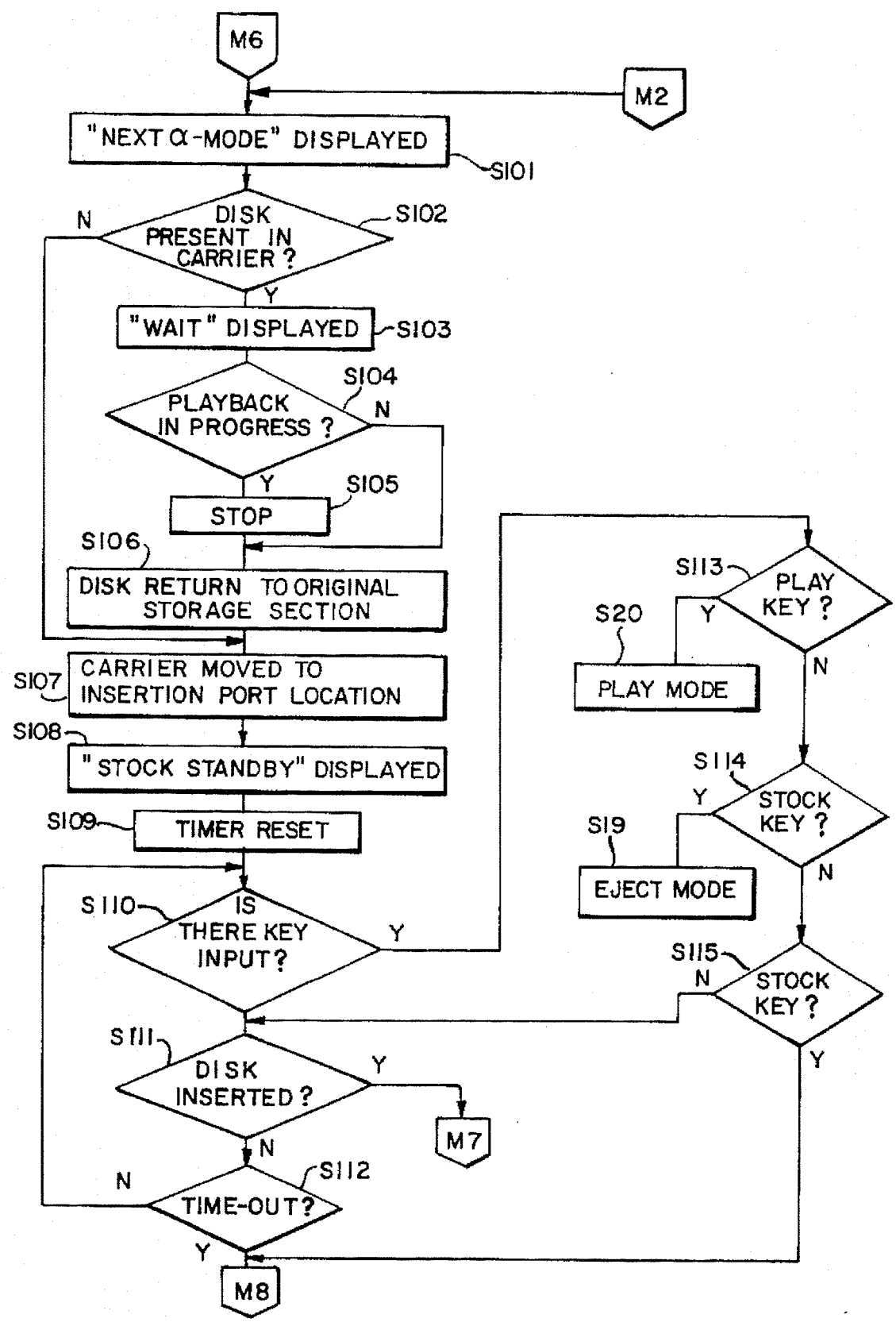
FIG. 11 is a continuation flowchart showing CPU processing operations in the stock mode.

If there is no empty storage section in step S87, the routine goes to M6 shown in FIG. 11.

At M6 in FIG. 11, if there is no empty storage section, "NEXT α-disk," indicating to the user that the disk that is inserted next via the disk insertion port 212 will automatically be taken to be an α disk, is displayed (step S101), and it is determined whether the carrier 3 contains a disk (step S102). If the carrier 3 does contain a disk, "WAIT," advising the user to wait, is displayed (step S103), and it is determined whether a playback operation is currently in progress (step S104). If a playback operation is in progress, this operation is stopped (step S105), and the disk whose playback has been stopped is loaded back into its original storage section (step S106).

Next, the carrier 3 is moved to the insertion port location (step S107), "STOCK STANDBY," advising the user that disk stocking preparations are satisfactorily completed, is displayed (step S108), a timer is started (step S109), and it is determined whether input has been supplied from a key (step S110). If there is no key input, it is determined whether a disk has been inserted via the disk insertion port 212 (step S111). If a disk has been inserted, the routine goes to M7 shown in FIG. 10. On the other hand, if no disk has been inserted, it is determined whether the timer started in step S109 has reached time-out (step S112). The routine goes to M8 shown in FIG. 9 if time-out has been reached, and to step S110 if it has not.

If, in step S102, the carrier 3 does not contain a disk, the routine goes to step S107. If playback operation is not in progress in step S104, the routine goes to step S106.

If key input is present in step S110, it is determined whether it is play key 108 input (step S113). If it is not play key 108 input, it is determined whether it is eject key 116 input (step S114). If it is not eject key 116 input, it is determined whether it is stock key 102 input (step S115). If it is not stock key 102 input, the routine goes to step S111.

If, in step S113, input from the play key 108 is present, the routine goes into the play mode of step S20 shown in FIG. 7. If input from the eject key 116 is present in step S114, the routine goes into the eject mode of step S19 shown in FIG. 7. If input from the stock key 102 is present in step S115, the routine goes to M8 shown in FIG. 9.

If the α flag is not "1" in step S21 shown in FIG. 7, a timer is started in M9 shown in FIG. 10 (step S89), and it is determined whether a disk has been inserted via the above-noted disk insertion port 212 (step S90). If a disk has been inserted, the routine goes to step S82.

If, in step S90, no disk has been inserted, it is determined whether the timer that was started in step S89 has reached time-out (step S91). If it has, it is reset (step S92), and the routine goes to M8 shown in FIG. 9. If the timer has not reached time-out in step S91, the routine goes to step S90.

Next, the CPU 233 processing operation in the eject mode, which is the principal object of the invention and is indicated at step S19, will be described with reference to FIGS. 12–22.

The eject mode comprises auto-eject processing, in which disks present in the MD device are automatically ejected in a set order via the disk insertion port 212, and manual eject processing, which is designated ejection processing by which disks present in the MD device are selected as required and ejected via the disk insertion port 212. Auto-eject processing and manual eject processing are optionally selected by holding the eject key 116 down for different times, i.e., through different eject key 116 input times. In this embodiment, holding the eject key 116 down for a long time results in a move to auto-eject processing, and short-time depression thereof causes a move to manual processing.

First, a move into the eject mode is brought about by supplying input from the eject key 116 (the check judgement of step S14 in FIG. 7).

Figure 12:
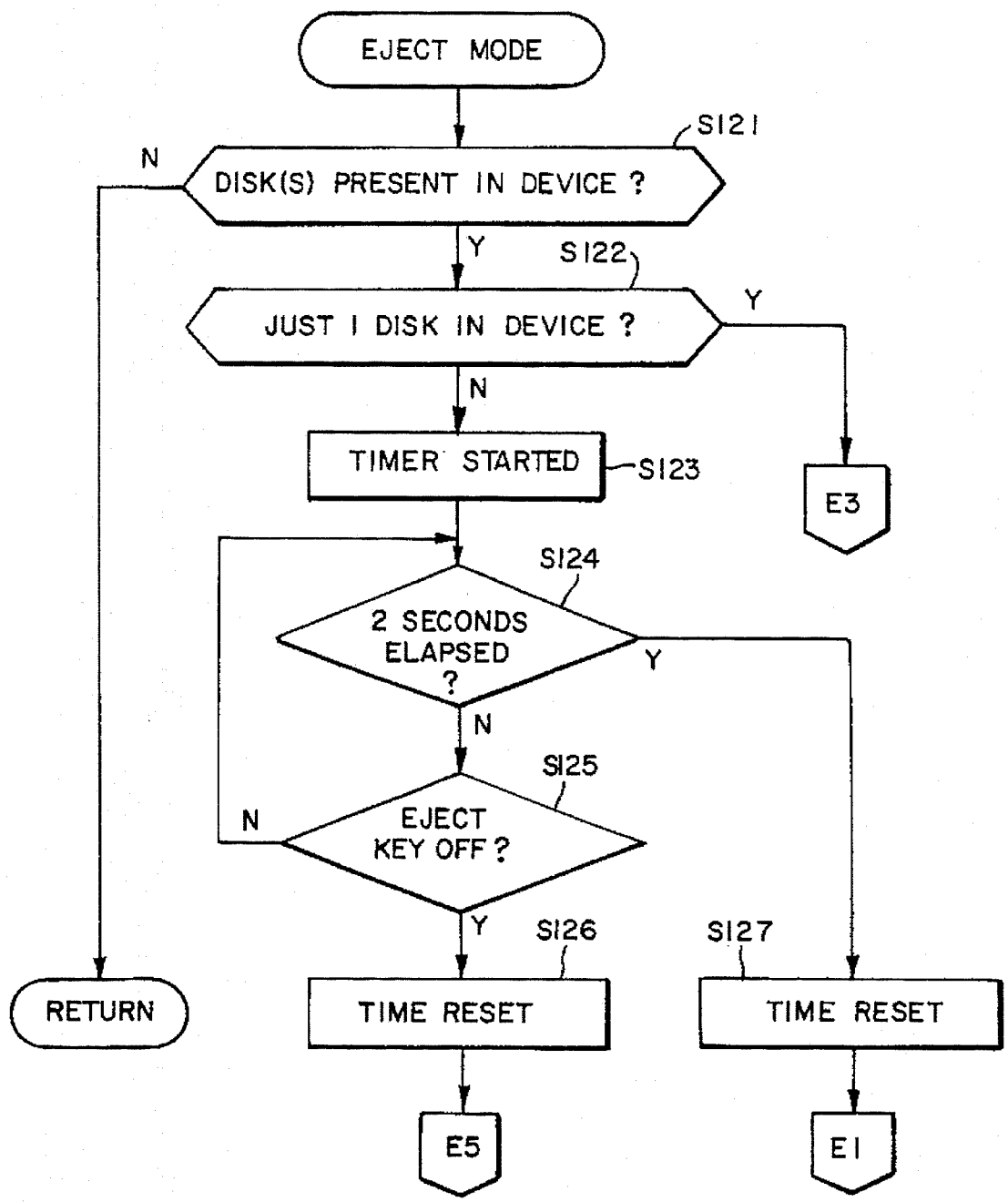
FIG. 12 is a flowchart showing CPU processing operations in the eject mode.

Referring to FIG. 12, on arrival of input from the eject key 116, it is determined whether there are disks present in the MD device, i.e., in the stocker 5, in the carrier 3, or on the player 4, etc. (step S121). If a disk or disks is or are present in the MD device, it is determined whether there is just one disk (step S122). If there is not just a single disk in the MD device, a timer is started (step S123), and then it is determined whether two seconds have elapsed (step S124).

If two seconds have not elapsed, it is determined whether the eject key 116 is in an OFF state. i.e., whether the state is one in which the input of the eject key 116 at the time of the move to the eject mode has been terminated (step S125). If the eject key 116 is in an OFF state, the timer that was started in step S123 is reset (step S126), and there is a move to E5 shown in FIG. 15, which is described later, i.e., to manual eject processing for selective ejection of required disks.

If there are no disks in the MD device in step S121, the eject mode is terminated. If there is just one disk in the MD device in step S122, the routine goes to E3 shown in FIG. 14. Subsequent processing of E3 is processing for automatically ejecting disks present in the device in the manner described below, and the judgement which occurs in step S122 is included in a system in which it is possible to select whether ejection of disks is effected manually or automatically by holding the eject key 116 down for different lengths of time, as indicated in step S124 and step S125 and, if arrangements are made such that the automatic process is immediately selected when there is only one disk in the device, there is no need to wait for the key to be held down for a long time, which is more convenient for the user. Arrangements may, of course, be made such that step S122 is omitted, and a move to step S123 is made after the check judgement of step S121.

Returning to FIG. 12, if the eject key 116 is not in an OFF state in step S125, i.e., if the eject key 116 frown which input was supplied at the time of the move to the eject mode has been held depressed for a long time, the routine goes to step S124.

Figure 13:
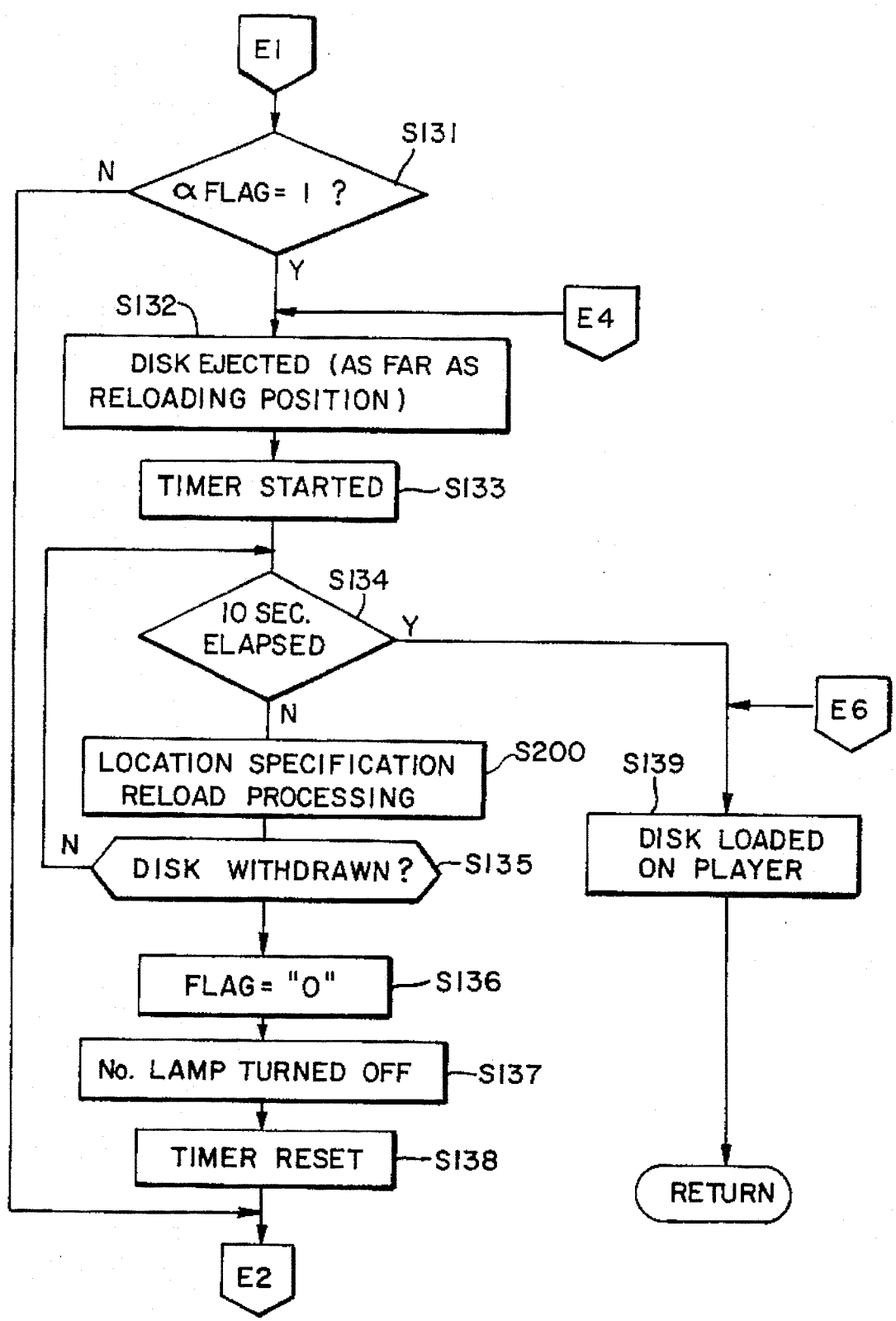
FIG. 13 is a continuation flowchart showing CPU processing operations in eject mode auto-eject processing.

If it is found in step S124 that two seconds have elapsed, the timer that was started in step S123 is reset (step S127), and the routine moves to E1 shown in FIG. 13, i.e., to auto-eject processing in which disks are automatically selected for ejection.

For this auto-eject processing, in E1 shown in FIG. 13 it is determined whether the α flag is "1" (step S131). If the α flag is "1," the α disk is ejected from the disk insertion port 212 as far as a reloading position (an eject position from which reloading is possible) (step S132), a timer is started (step S133), and then it is determined whether 10 seconds have elapsed (step S134). If 10 seconds have not elapsed, location specification reload processing, which will be described later, is performed (step S200) and, after that, it is determined whether the α disk which was in the reloading position, i.e., which was on standby for reloading, has been withdrawn (step S135). If the α disk has been withdrawn, the α flag is set to "0" (step S136), the No. lamp 107a corresponding to the α key 107 is turned off (step S137), the timer that was started in step S133 is reset (step S138), and the routine goes to E2 shown in FIG. 14.

Figure 14:
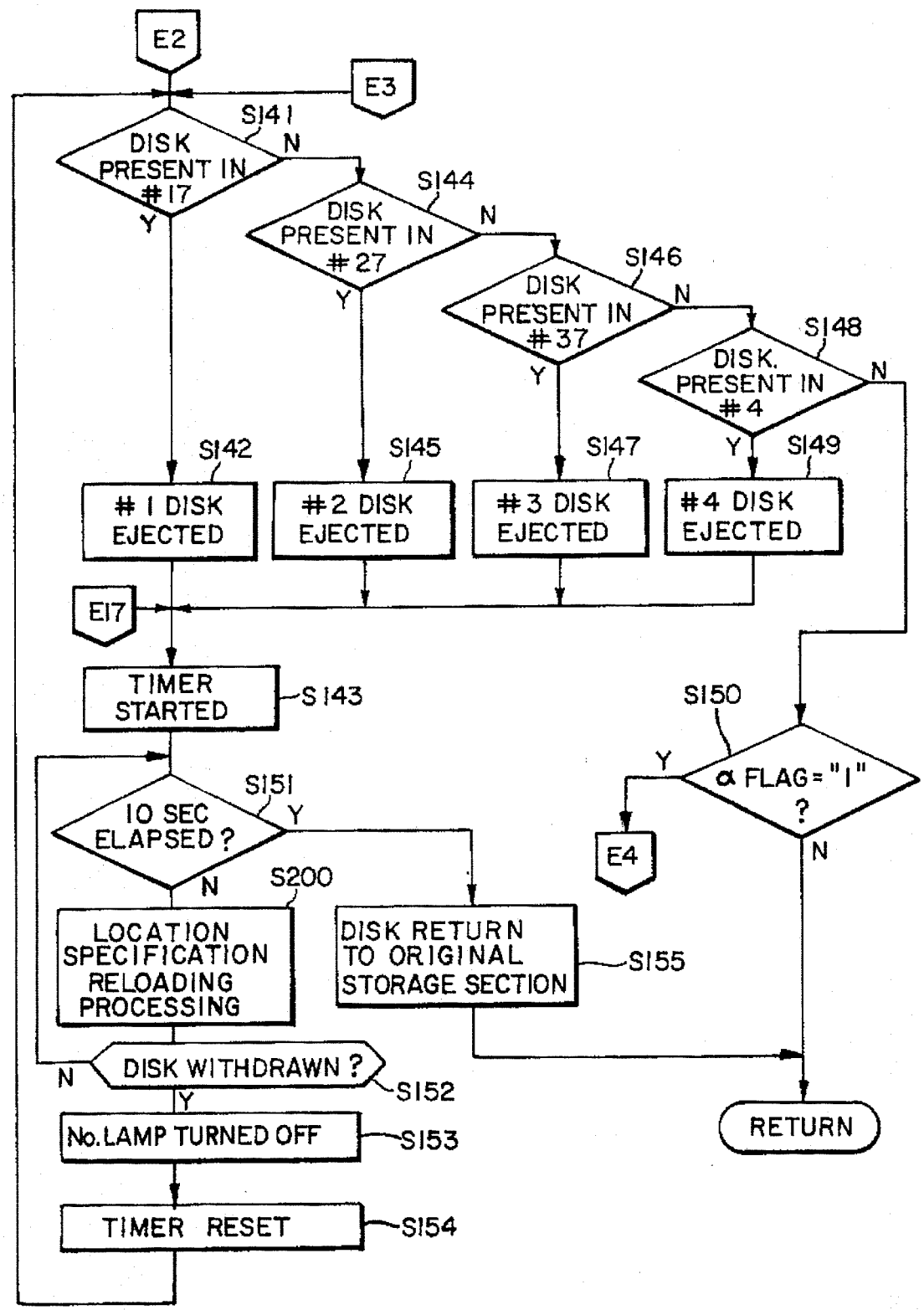
FIG. 14 is a continuation flowchart showing CPU processing operations in eject mode auto-eject processing.

If the α flag is not "1" in step S131, the routine goes to E2 shown in FIG. 14. If, in step S135, the disk has not been withdrawn, the routine goes to step S134. If it is found in step S134 that 10 seconds have elapsed, the α disk on standby for reloading is automatically reloaded and then set on the player section 4 (step S139), and the current eject mode is terminated. The arrangements may also be made such that after the α disk has been drawn in, the carrier 3 is moved to the standby position described with reference to step S63.

In E2 shown in FIG. 14, it is determined whether there is a disk stored in the #1 storage section 50a (step S141). If there is a disk stored in the #1 storage section 50a, it is ejected out of the disk insertion port 212 as far as the reloading position (step S142), and a timer is started (step S143)

If, in step S141, it is found that there is no disk stored in the #1 storage section 50a, it is determined whether there is a disk stored in the #2 storage section 50b (step S144). If there is a disk stored in the #2 storage section 50b, it is ejected from the disk insertion port 212 as far as the reloading position (step S145), and the routine goes to step S143.

If, in step S144, it is found that there is no disk stored in the #2 storage section 50b, it is determined whether there is a disk stored in the #3 storage section 50c (step S146). If there is a disk stored in the #3 storage section 50c, it is ejected from the disk insertion port 212 as far as the reloading position (step S147), and the routine goes to step S143.

If, in step S146, it is found that there is no disk stored in the #3 storage section 50c, it is determined whether there is a disk stored in the #4 storage section 50d (step S148). If there is a disk stored in the #4 storage section 50d, it is ejected from the disk insertion port 212 as far as the reloading position (step S149), and the routine goes to step S143.

If, in step S148, it is found that there is no disk stored in the #4 storage section 50d, it is determined whether the α flag is "1" (step S150). If the α flag is not "1," the current eject mode is terminated.

After the timer has been started in step S143, it is determined whether 10 seconds have elapsed (step S151). If 10 seconds have not elapsed, location specification reloading processing, described later, is performed (step S200), and it is determined whether the disk on standby for reloading has been withdrawn or not (step S152) and, if it has been withdrawn, the No. lamp (103a–106a) corresponding to the storage section of the disk that has been withdrawn is turned off (step S153), the timer that was started in step S143 is reset (step S154), and the routine goes to step S141.

If, in step S152, the disk has not been withdrawn, the routine goes to step S151. If it is found in step S151 that 10 seconds have elapsed, the disk that is on reloading standby is automatically reloaded and then stored in its original storage section (step S155), and the current eject mode is terminated.

If the α flag is "1" in step S150, the routine goes to E4 shown in FIG. 13.

The processing operation of the above-described step S122 shown in FIG. 12 is in correspondence to Claim 4, and it makes it possible to reduce the amount of work involved in control by the user, since, if there is only one disk in the MD device, the routine moves to the auto-eject processing of E3 shown in FIG. 14. Thus, in cases where there is only one disk in the MD device, the situation where this single disk has to be ejected by manual control is prevented, and the disk is ejected automatically.

Arrangements can also be made such that if input is supplied from a set key, e.g. , the eject key 116, in the interval between the processing stages of step S143 and step S151, the disk that was ejected in step S142, step S145, step S147, or step S149 and is on reloading standby is automatically reloaded, and disks other than this reloaded disk are automatically ejected in a set order, with the result that disks in the device are ejected rapidly, without causing the user to wait a set time.

Figure 15:
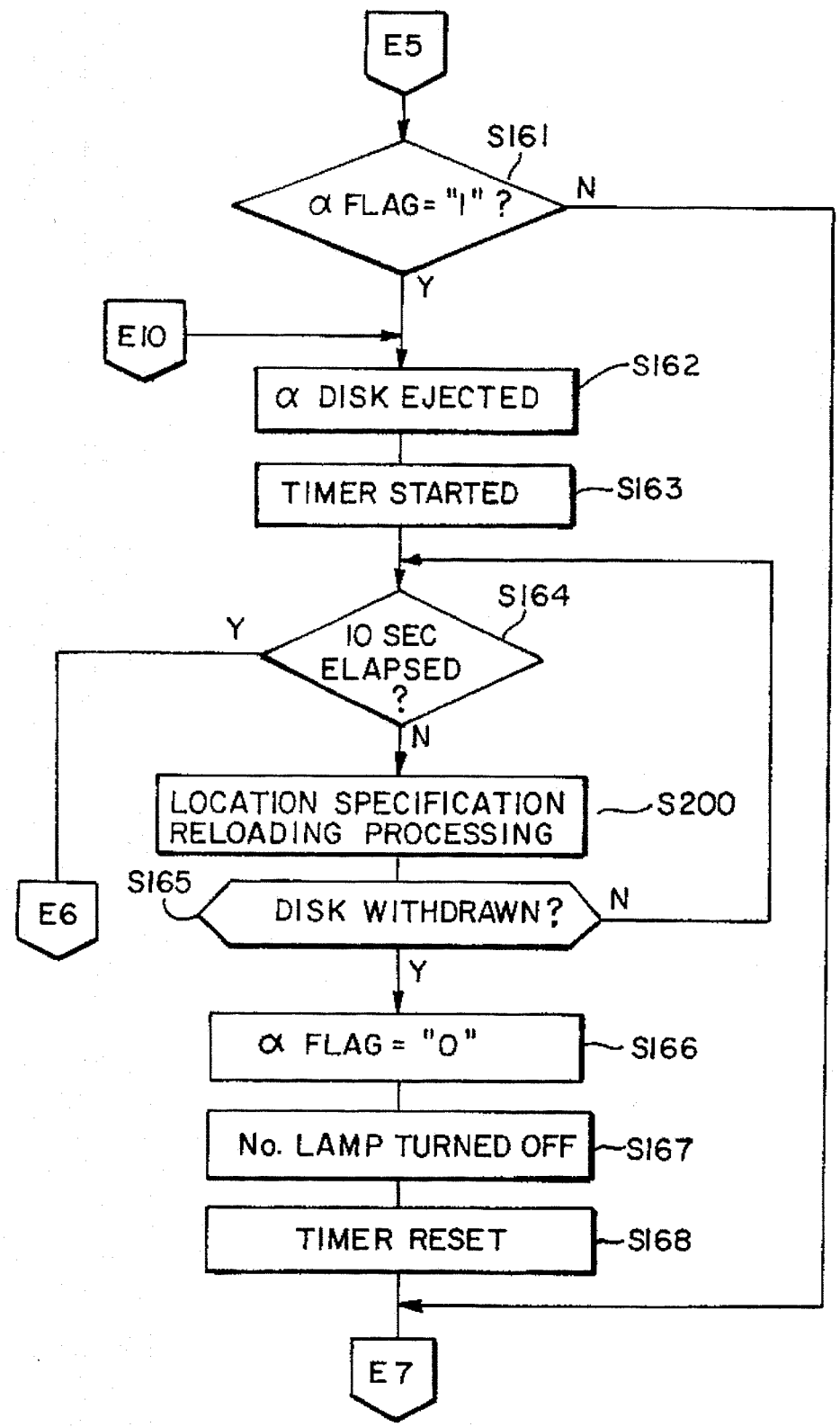
FIG. 15 is a continuation flowchart showing CPU processing operations in eject mode manual eject processing.

For manual eject processing in E5 shown in FIG. 15, it is determined whether the α flag is "1" (step S161). If the α flag is "1," the α disk is ejected as far as the reloading position (step S162), a timer is started (step S163), and then it is determined whether 10 seconds have elapsed (step S164). If 10 seconds have not elapsed, location specification reloading processing that is described later is performed (step S200), and it is determined whether the α disk on reloading standby has been withdrawn (step S165). If the disk has been withdrawn, the α flag is made "0" (step S166), the No. lamp 107a of the key 107 corresponding to the α disk is turned off (step S167), the timer that was started in step S163 is reset (step S168), and the routine goes to E7 shown in FIG. 16.

Figure 16:
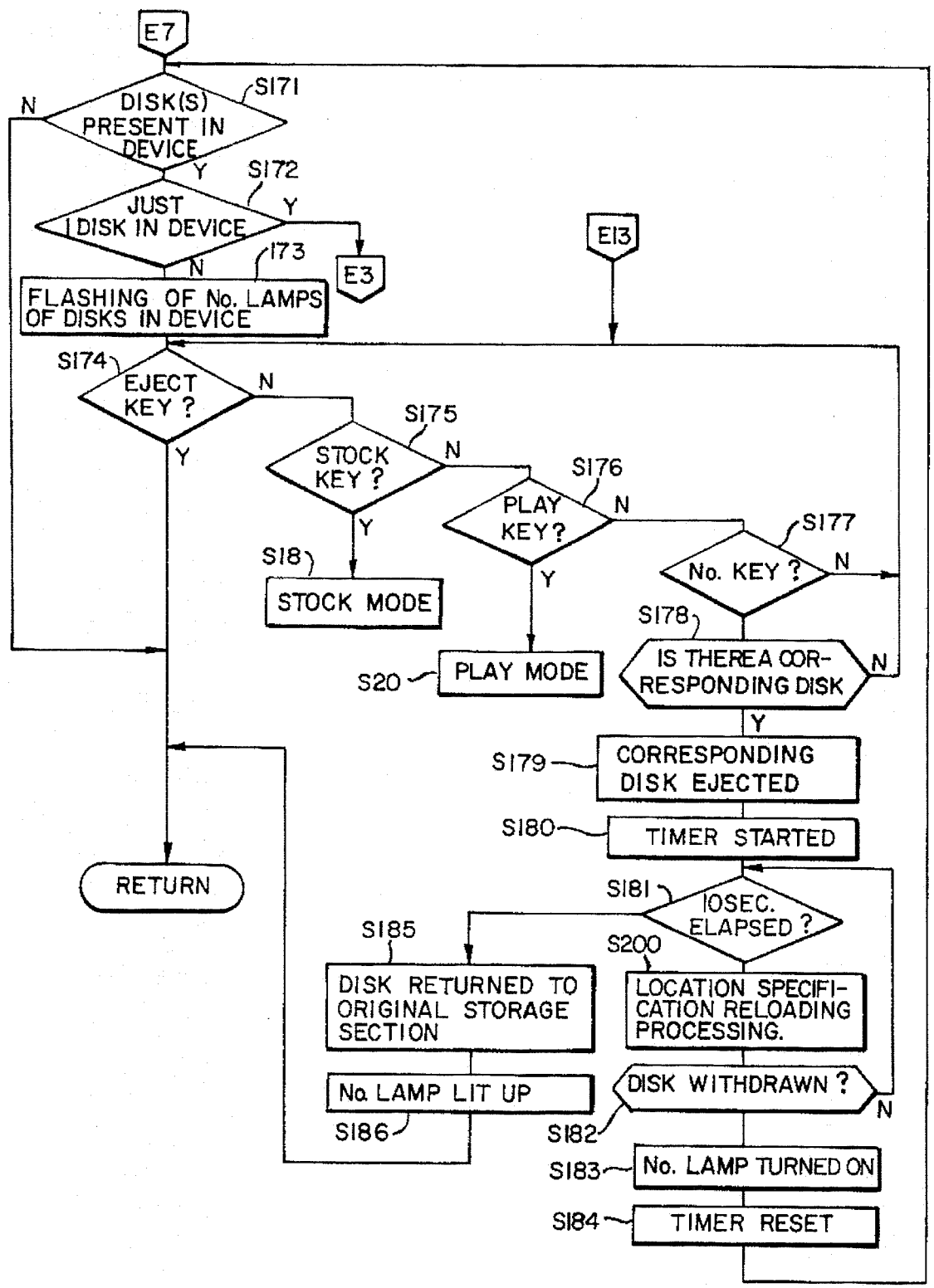
FIG. 16 is a continuation flowchart showing CPU processing operations in eject mode manual eject processing.

If the α flag is not "1" in step S161, the routine goes to E7 shown in FIG. 16.

If it is found in step S165 that the disk has not been withdrawn, the routine goes to step S164. If it is found in step S164 that 10 seconds have elapsed, the routine goes to E6 shown in FIG. 13.

In E7 shown in FIG. 16, it is determined whether or not a disk or disks is or are present in the MD device (step S171) and, if there is/are, it is determined whether there is just one disk (step S172). If there is not just one disk in the MD device, this is indicated by a flashing display of the No. lamps (103a–106a) corresponding to those storage sections (50a–50d) in which disks are stored in the MD device (step S173), and it is determined whether input has been supplied from the eject key 116 (step S174). The No. lamp (103a–106a) in step S173 draws the attention of the user to the fact that ejectable disks are present.

If there is no input from the eject key 116, it is determined whether there is input from the stock key 102 (step S175). If there is no input from the stock key 102, it is determined whether there is input from the play key 108 (step S176). If there is no input from the play key 108, it is determined whether there is No. key (103–106) input (step S177) and, if there is, it is determined whether a disk corresponding to the No. key (103–106) from which input has been supplied is present (step S178). If a corresponding disk is present, it is ejected from the disk insertion port 212 as far as the reloading position (step S179), a timer is started (step S180), and then it is determined whether 10 seconds have elapsed (step S181). If 10 seconds have not elapsed, the location specification reloading processing which is described later is performed (step S200), and it is determined whether the disk on reloading standby has been withdrawn (step S182). If the disk has been withdrawn, the No. lamp (103a–106a) of the No. key (103–106) in correspondence thereto is turned off (step S183), the timer that was started in step S180 is reset (step S184), and the routine goes to step S171.

If it is found in step S171 that there are no disks in the MD device, the current eject mode is terminated.

If it is found in step S172 that there is just one disk in the MD device, the routine goes to E3 shown in FIG. 14. If it is found that there is eject key 116 input in step S174, the eject mode is terminated.

If it is found in step S175 that there is stock key 102 input, the routine goes into the stock mode of step S18 shown in FIG. 7. If it is found in step S176 that there is play key 108 input, the routine goes into the play mode of step S20 shown in FIG. 7.

If there is no No. key (103–106) input in step S177 or if it is found in step S178 that there is no corresponding disk, the routine goes to step S174.

Arrangements may be made such that, in the processing operations of step S177 and step S178, if input from a No. key (103–106) corresponding to an unloaded, empty storage section is supplied at the time No. key (103–106) input specifying a disk that is to be ejected is awaited, the routine goes into the stock mode. In this case, even though the device is in the eject mode, it is possible to go rapidly into the stock mode without a stock key 102 input operation being performed by the user.

If it is found in step S182 that the disk has not been withdrawn, the routine goes to step S181. If it is found in step S181 that 10 seconds have elapsed, the disk on reloading standby is automatically reloaded and then is stored in its original storage section (step S185), a lit-up display by the No. lamp (103a–106a) that was caused to flash in step S173 is given (step S186), and the eject mode is terminated.

Arrangements may also be made such that, if input is supplied from a No. key (103–106) corresponding to an unloaded, empty storage section or from the α key 107 before the count of the timer started in step S180 reaches 10 seconds, the routine goes into a stock mode in which the disk on reloading standby is automatically reloaded and then is stored in its original storage section. Then, if the key input supplied is input from a No. key (103–106) corresponding to an unloaded, empty storage section, the disk in stored in the empty storage section corresponding to the No. key (103–106) from which input has been supplied, or, if the key input is from the α key 107, the disk is set on the player section 4.

In this case, even though the device is in the eject mode, it is possible to go rapidly to the stock mode without a stock key 102 input operation being performed by the user.

The purpose of making the arrangement such that a disk that is on reloading standby is automatically reloaded after elapse of a set time is to ensure protection of the disk and of the MD device against foreign matter such as dirt and dust, etc. and, for vehicle-mounted units in particular, to prevent falling of the disk due to vibration, etc.

Further, since this eject mode incorporates auto-eject processing by which disks in the MD device are automatically ejected via the disk insertion port 212 in a set order, there is no need for the user to perform a selection operation for selecting disks that are to be ejected.

Also, with this eject mode, it is possible to select ejection processing that is convenient for the user, since arrangements are made such that it is possible to make a selection out of the different forms of ejection processing consisting of auto-eject processing and manual eject processing.

Further, since these forms of ejection processing are selected by different depression times, i.e., different input times of the eject key 116, there is no need for an increase in the number of input keys, and so it is possible to ensure sufficient key space.

Figure 17:
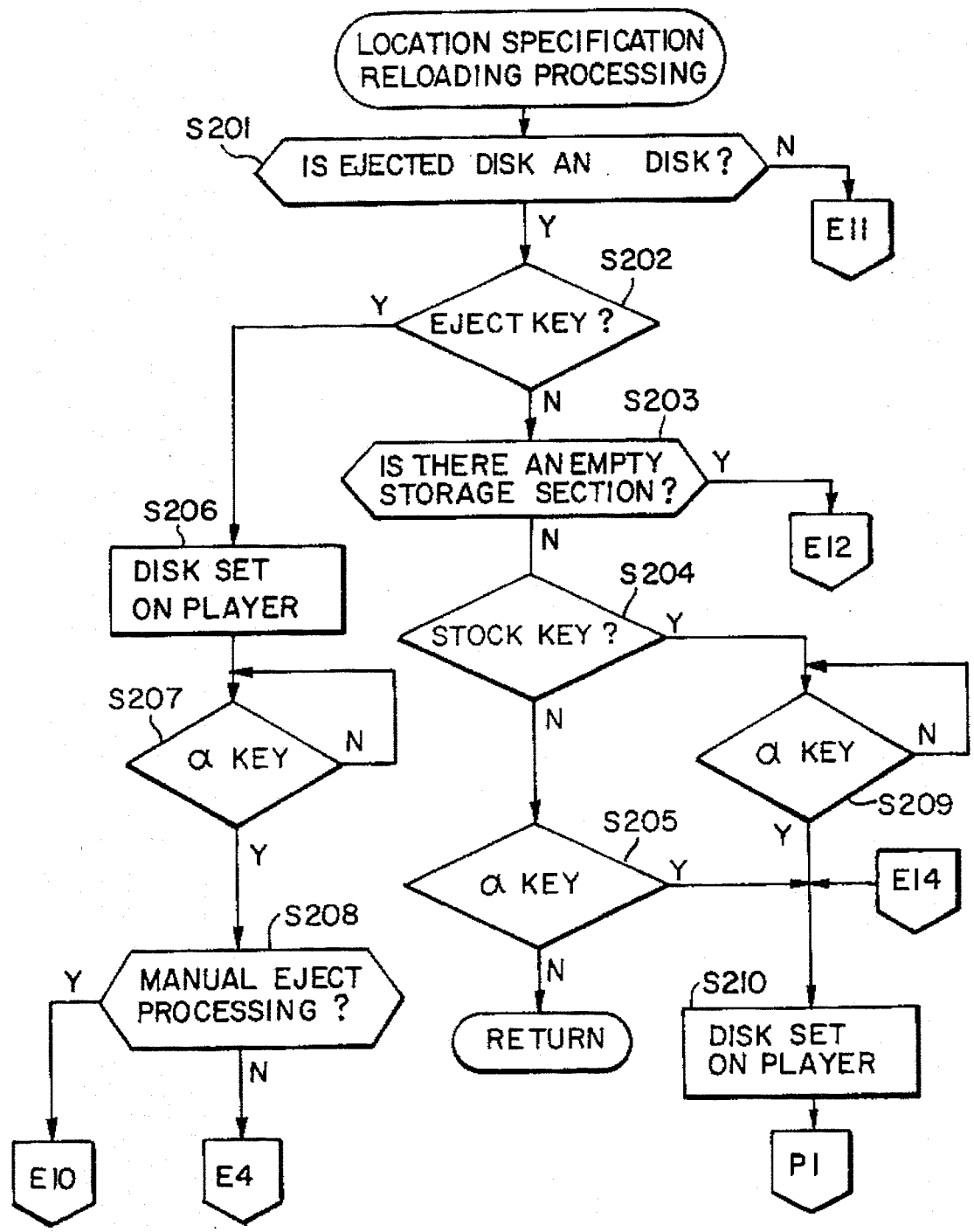
FIG. 17 is a flowchart showing CPU processing operations in the location specification processing of a first embodiment.
Figure 18:
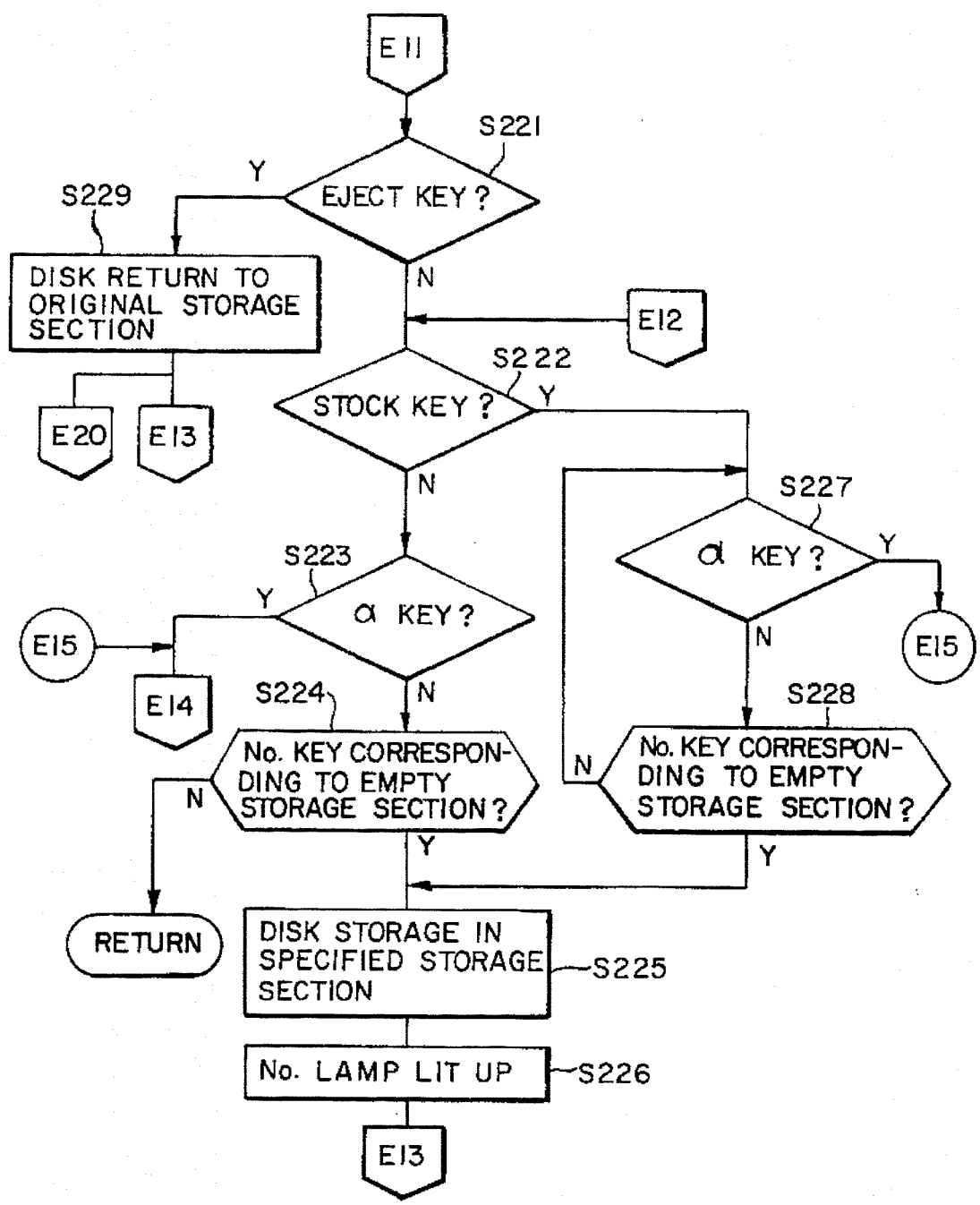
FIG. 18 is a continuation flowchart showing CPU processing operations in the location specification processing of the first embodiment.

Next, the CPU 233 processing operations in the location specification processing of step S200 will be described with reference to FIGS. 17–20. FIGS. 17 and 18 are flowcharts which show the CPU 233 processing operations in the location specification processing of a first embodiment.

Location specification processing in the first embodiment is such that, if input from the eject key 116 is received while a disk is on standby for reloading, then the routine follows on with the eject mode after the disk on reloading standby has been set on the player section 4, if it is an α disk, or has been stored in its original storage section, if it is not an α disk.

In FIG. 17, it is determined whether a disk that has been ejected as far as the reloading position, i.e., a disk that is on reloading standby is an α disk (step S201) and, if it is, it is determined whether input from the eject key 116 has been received (step S202). If no input from the eject key 116 has been received, it is determined whether there is an empty storage section in the stocker 5 (step S203). If there is no empty storage section, it is determined whether input has been received from the stock key 102 (step S204). If no input has been received from the stock key 102, it is determined whether input has been received from the α key 107 (step S205). If no input has been received from the α key 107, the location specification processing is terminated.

If, in step S201, the disk on reloading standby is not an α disk, the routine goes to E11 shown in FIG. 18.

If it is found in step S202 that input has been received from the eject key 116, then the disk on reloading standby is loaded onto the player section 4 (step S206), and it is determined whether input has been received from the α key 107 (step S207). Arrangements may also be made such that step S207 is omitted.

If input from the α key 107 has been received, it is determined whether the processing stage at the time of the move to the current location specification processing is manual eject processing (step S208) and, if it is (if step S200 shown in FIG. 15 or FIG. 16 is performed), the routine goes to E10 shown in FIG. 15. If it is not manual eject processing, i.e., if it is auto-eject processing (if step S200 shown in FIG. 13 or FIG. 14 is performed), then the routine goes to E4 shown in FIG. 13.

If it is found in step S203 that there is an empty storage section, the routine goes to E12 shown in FIG. 18. If it is found in step S204 that input from the stock key 102 has been received, it is determined whether α key 107 input has been received (step S209). The arrangements may also be made such that step S209 is omitted.

If there is α key 107 input, the disk on reloading standby is automatically reloaded and then set on the player section 4 (step S210), and the routine goes to P1 of the play mode shown in FIG. 23, which will be described later. Although the arrangements here are that the processing of step S210 is followed by a move to P1 of the play mode, the arrangements may also be made such that this processing is followed by termination of the location specification processing.

In E11 shown in FIG. 18, it is determined whether input has been received from the eject key 116 (step S221). If no input has been received from the eject key 116, it is determined whether input has been received from the stock key 102 (step S222). If no input has been received from the stock key 102, it is determined whether input has been received from the α key (step S223). If no input has been received from the α key 107, it is determined whether input from a No. key (103–106) corresponding to an empty storage section has been received (step S224). If input from a corresponding No. key (103–106) has been received, the disk on reloading standby is stored in the empty storage section corresponding to the No. key (103–106) from which input has been received (step S225), the No. lamp (103a–106a) corresponding to the disk on reloading standby is turned off and, together with this, an indication is given by lighting the No. lamp (103a–106a) of the No. key (103–106) corresponding to the storage section (50a–50d) in which the disk has been stored (step S226), and the routine goes to E13 shown in FIG. 16.

The trouble involved in user input operations is greatly reduced, since, in the processing stages of step S224, step S225, and step S226, etc., supplying input from a No. key (103–106) corresponding to an unloaded, empty storage section can cause a disk that is on reloading standby to be loaded into any required empty storage section, even though a move to the stock mode has not been made, and further, it results in the eject mode being continued, even though no input operation for returning to the eject mode has been performed.

Although the arrangements here are that the processing of step S226 is followed by a move to E13 shown in FIG. 16, the arrangements may also be made such that this processing is followed by termination of the location specification processing or by a move to the stock mode.

If it is found in step S222 that there is stock key 102 input, the No. lamps (103a–106a) corresponding to the α key 107 and to the No. keys (103–106) that correspond to empty storage sections are caused to flash and it is determined whether input has been received from the α key 107 (step S227). If there is no input from the α key 107, it is determined whether input has been received from a No. key (103–106) corresponding to an empty storage section (step S228). If there is no input from a No. key (103–106) corresponding to an empty storage section, the routine goes to step S227. If there is input from a No. key (103–106) corresponding to an empty storage section in step S228, the routine goes to step S225.

The trouble involved in user input operations is greatly reduced, since, if stock key 102 input is supplied in step S222 and input from a No. key (103–106) corresponding to an empty storage section is supplied in step S228, a disk that is on reloading standby can be stored in any required empty storage section, and the eject mode is then continued, even though no input operation for going back to the eject mode is performed.

If α key 107 input is received in step S223, the routine goes to E14 shown in FIG. 17, while if α key 107 input is received in step S227, the routine goes to E15 shown in the figure.

If no input from a No. key (103–106) corresponding to an empty storage section is received in step S224, the location specification processing is terminated.

If eject key 116 input is present in step S221, the disk on reloading standby is automatically reloaded and then is stored in its original storage section (step S229), and the routine goes to E13 shown in FIG. 16.

With the location specification processing of the first embodiment described above, the trouble involved in user input operations is greatly reduced, since, during the eject mode, if input is supplied from the eject key 116, then, even if the set time up to when reloading is started has not elapsed, a disk that is on reloading standby is automatically reloaded, and subsequently the eject mode is continued after the automatically reloaded disk has been set on the player section 4 if it is an α disk or has been returned to its original storage section if it is not an α disk.

With the location specification processing of the first embodiment described above, the trouble involved in user input operations is greatly reduced, since, during the eject mode, if input from a No. key (103–106) is received, then, even if the set time up to when automatic reloading is started has not elapsed, a disk that is on reloading standby is automatically reloaded, and then stored in the empty storage section corresponding to tile No. key (103–106) from which input has been received, and subsequently the eject mode is continued. The arrangements in location specification processing in the first embodiment are that a disk that is on reloading standby is automatically reloaded into the MD device when eject key 116 input is received, and it may also be made such that, even without any key input, a disk that is on reloading standby is also automatically reloaded into the MD device when the user pushes it in with his or her hand and, in this case the CPU 233 of the MD device cause the automatically reloaded disk to be set on the player section 4 if it is an α disk or to be returned to its original storage section if it is not an α disk.

Figure 23:
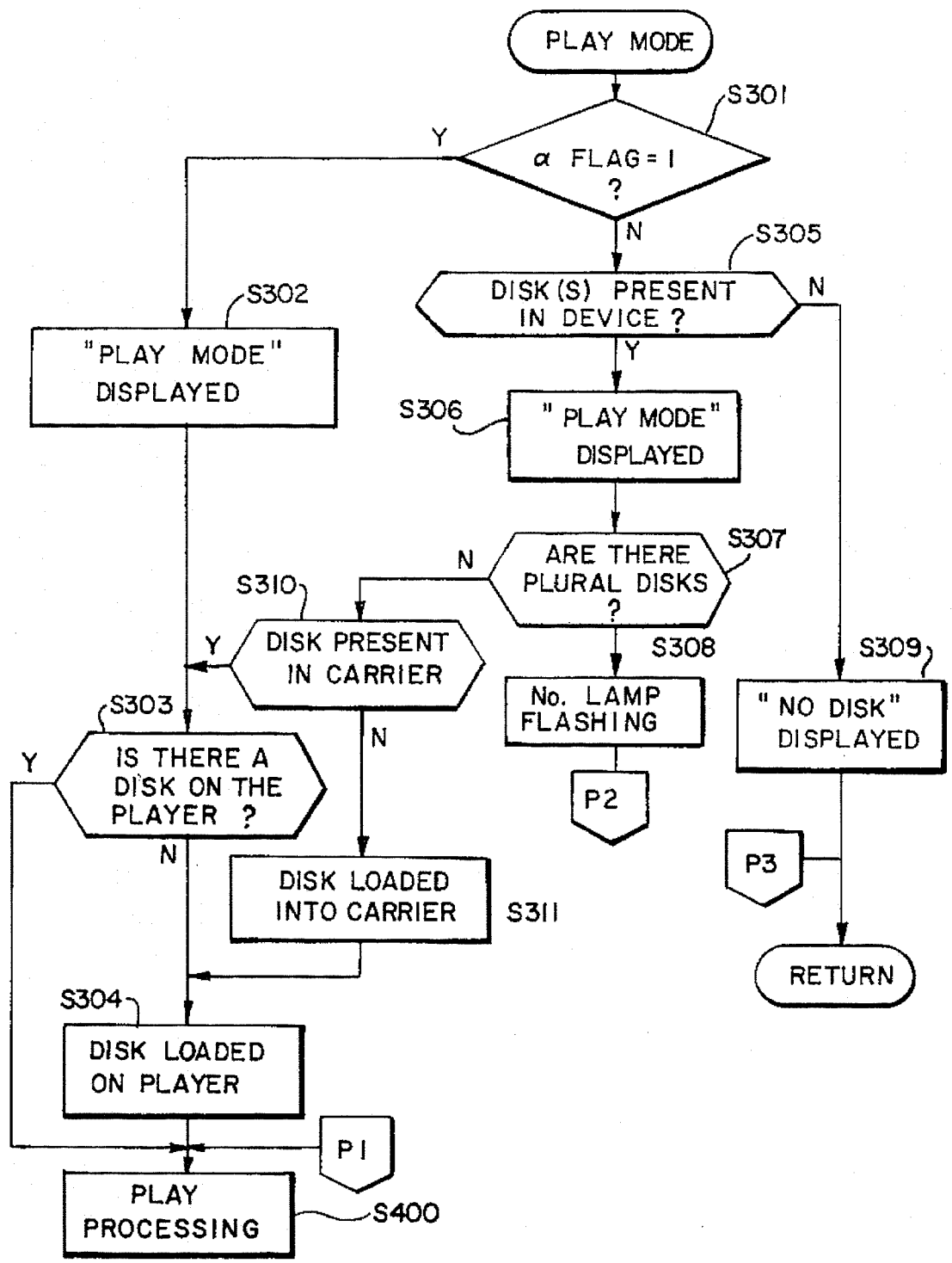
FIG. 23 is a flowchart showing CPU processing operations in the play mode.

The arrangement is also made such that if an α disk is loaded onto the player section 4 by auto-reloading, the routine goes to P1 in FIG. 23 or the current location specification processing is terminated.

Next, the processing operations of the CPU 233 in location specification processing in a second embodiment will be described. Steps that are duplicates of those of the first embodiment are indicated by the same reference codes, and a description thereof is omitted.

The location specification processing of the second embodiment is a form of processing by which, in addition to the location specification processing of the first embodiment, if, after a disk on reloading standby has been stored in its original storage section in location specification processing of the first embodiment, there are disks in storage sections other than the storage section into which this disk has been loaded, then these disks are ejected in a set order.

Figure 19:
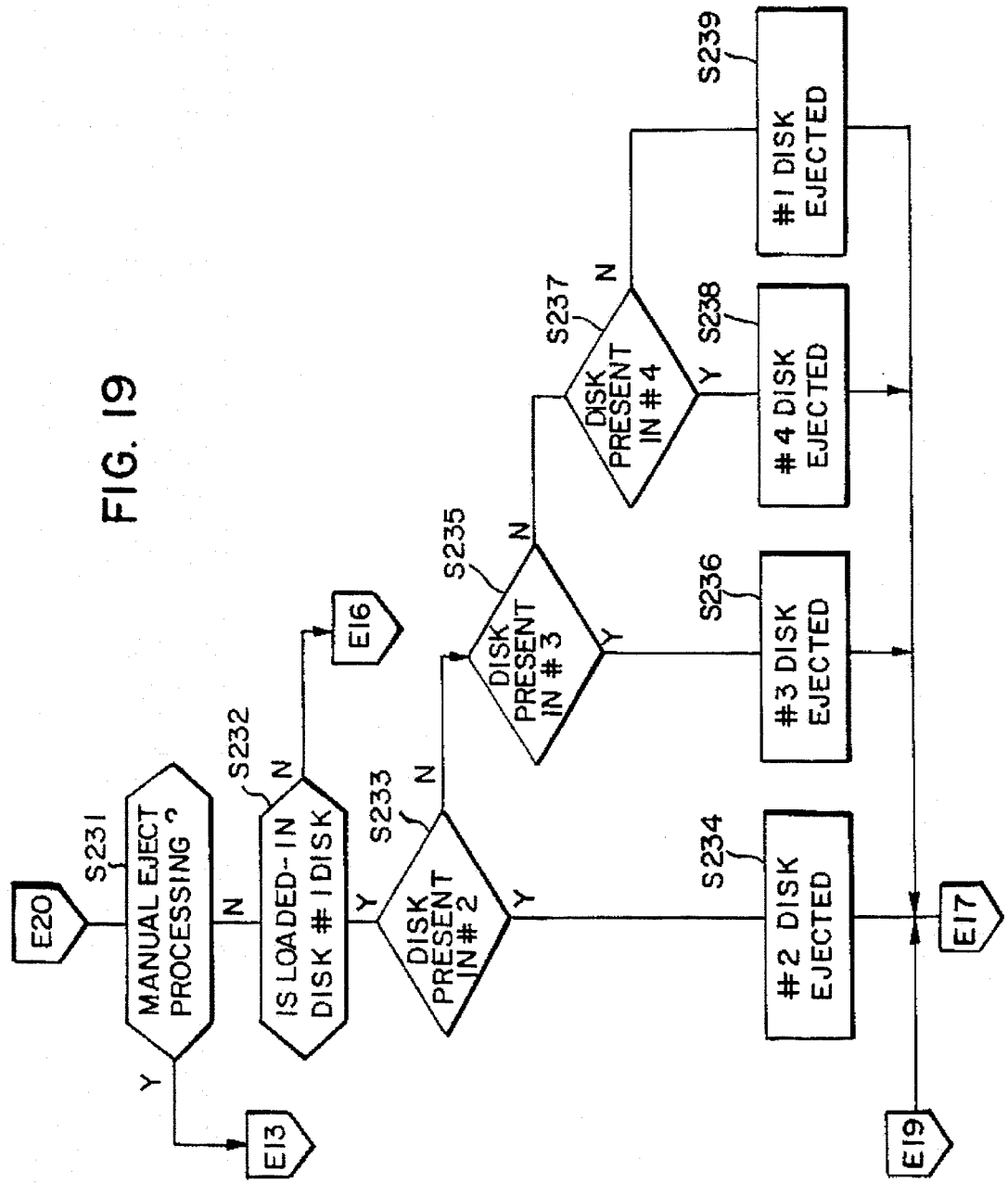
FIG. 19 is a flowchart showing CPU processing operations in the location specification processing of a second embodiment.

FIG. 19 is a flowchart showing the processing operations of the CPU 233 in location specification processing of the second embodiment. After the processing of step S229, shown in FIG. 18, in location specification processing of the first embodiment, the routine goes to E20 shown in FIG. 19.

In E20 shown in FIG. 19, it is determined whether the processing stage at the time of the move to the location specification processing is a manual eject processing stage (step S231) and, if it is, the routine goes to E13 shown in FIG. 16. The arrangement is also made such that step S231 is omitted and the routine goes directly to step S232 after E20.

If the processing is not manual eject processing, i.e., if it is auto-eject processing, it is determined whether the disk that was loaded in step S229 is a disk that is stored in the #1 storage section 50a (step S232) and, if it is, it is determined whether a disk is currently stored in the #2 storage section 50b (step S233). If there is a disk stored in the #2 storage section 50b, it is ejected as far as the reloading position (step S234), and the routine goes to E17 shown in FIG. 14.

If it is found in step S233 that there is no disk stored in the #2 storage section 50b, it is determined whether there is a disk stored in the #3 storage section 50c (step S235). If there is a disk stored in the #3 storage section 50c, it is ejected as far as the reloading position (step S236), and the routine goes to E17 shown in FIG. 14.

If it is found in step S235 that there is no disk stored in the #3 storage section 50c, it is determined whether there is a disk stored in the #4 storage section 50d. If there is a disk stored in the #4 storage section 50d, it is ejected as far as the reloading position (step S238), and the routine goes to E17 shown in FIG. 14.

If it is found in step S237 that there is no disk stored in the #4 storage section 50d, the disk stored in the H1 storage section 50a is ejected as far as the reloading position (step S239), and the routine goes to E17 shown in FIG. 14.

Figure 20:
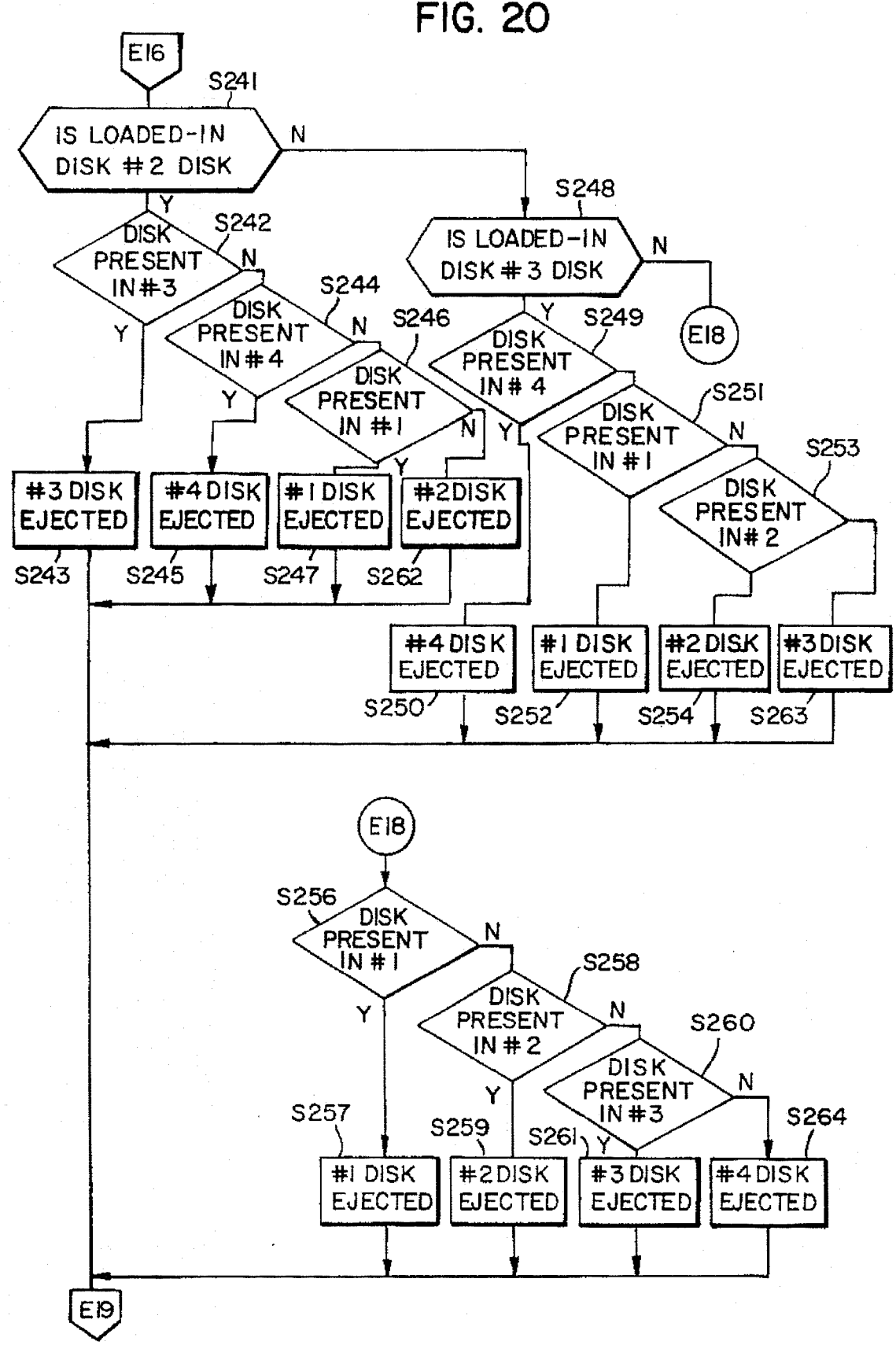
FIG. 20 is a continuation flowchart showing CPU processing operations in the location specification processing of the second embodiment.

If it is found in step S232 that the disk that was loaded in step S229 shown in FIG. 18 is not a disk that is currently stored in the #1 storage section 50a, the routine goes to E16 shown in FIG. 20.

In E16 shown in FIG. 20, it is determined whether the disk that was loaded in step S229 is a disk that is currently stored in the #2 storage section 50b (step S241) and, if it is, it is determined whether there is a disk stored in the #3 storage section 50c (step S242). If there is a disk stored in the #3 storage section 50c, it is ejected as far as the reloading position (step S243), and the routine goes to E19 shown in FIG. 19.

If it is found in step S242 that there is no disk stored in the #3 storage section 50c, it is determined whether there is a disk stored in the #4 storage section 50d (step S244). If there is a disk stored in the #4 storage section 50d, it is ejected as far as the reloading position (step S245), and the routine goes to E19 shown in FIG. 19.

If it is found in step S244 that there is no disk stored in the #4 storage section 50d, it is determined whether there is a disk stored in the #1 storage section 50a (step S246). If there is a disk stored in the #1 storage section 50a, it is ejected as far as the reloading position (step S247), and the routine goes to E19 shown in FIG. 19.

If it is found in step S246 that there is no disk stored in the #1 storage section 50a, the disk stored in the #2 storage section 50b is ejected as far as the reloading position (step S262) and, similarly, the routine goes to E19 shown in FIG. 19.

If it is found in step S241 that the disk that was loaded in step S229 shown in FIG. 19 is not a disk that is stored in the #2 storage section 50b, it is determined whether it is a disk that is stored in the #3 storage section 50c (step S248). If it is a disk that is stored in the #3 storage section 50c, it is determined whether there is a disk stored in the #4 storage section 50d (step S249). If there is a disk stored in the #4 storage section 50d, it is ejected as far as the reloading position (step S250), and the routine goes to E19 shown in FIG. 19.

If it is found in step S249 that there is no disk stored in the #4 storage section 50d, it is determined whether there is a disk stored in the #1 storage section 50a (step S251). If there is a disk stored in the #1 storage section 50a, it is ejected as far as the reloading position (step S252), and the routine goes to E19 shown in FIG. 19.

If it is found in step S251 that there is no disk stored in the #1 storage section 50a, it is determined whether there is a disk stored in the #2 storage section 50b (step S253). If there is a disk stored in the #2 storage section 50b, it is ejected as far as the reloading position (step S254), and the routine goes to E19 shown in FIG. 19.

If it is found in step S253 that there is no disk stored in the #2 storage section 50b, the disk stored in the #3 storage section 50c is ejected as far as the reloading position (step S263), and the routine goes to E19 shown in FIG. 19.

If it is found in step S248 that the disk loaded in step S229 shown in FIG. 18 is not a disk that is stored in the #3 storage section 50c, it is determined whether it is a disk that is stored in the #4 storage section 50d, and the routine goes to E18 in the figure.

At E18 in the figure, it is determined whether there is a disk stored in the #1 storage section 50a (step S256). If there is a disk stored in the #1 storage section 50a, it is ejected as far as the reloading position (step S257), and the routine goes to E19 shown in FIG. 19.

If it is found in step S256 that there is no disk stored in the #1 storage section 50a, it is determined whether there is a disk stored in the #2 storage section 50b (step S258). If there is a disk stored in the #2 storage section 50b, it is ejected as far as the reloading position (step S259), and the routine goes to E19 shown in FIG. 19.

If it is found in step S258 that there is no disk stored in the #2 storage section 50b, it is determined whether there is a disk stored in the #3 storage section 50c (step S260). If there is a disk stored in the #3 storage section 50c, it is ejected as far as the reloading position (step S261), and the routine goes to E19 shown in FIG. 19.

If it is found in step S260 that there is no disk stored in the #3 storage section 50c, the disk stored in the #4 storage section 50d is ejected as far as the reloading position (step S264), and the routine goes to E19 shown in FIG. 19.

The routine similarly goes to E19 shown in FIG. 19 if it is found in step S255 that there is no disk stored in the #4 storage section 50d.

The location specification processing of the second embodiment makes it possible to greatly reduce the trouble of operations in cases where the user wishes to eject the disks that are stored in the storage sections other than the above-noted original storage section into which a disk was loaded at the time of location specification processing of the first embodiment since, in addition to the effects of the location specification processing of the first embodiment being achieved, it is also the case that if, after a disk on reloading standby has been loaded into its original storage section in location specification processing of the first embodiment, there are disks stored in storage sections other than the storage section into which this disk has been loaded, these disks are automatically ejected in a set order.

Figure 21:
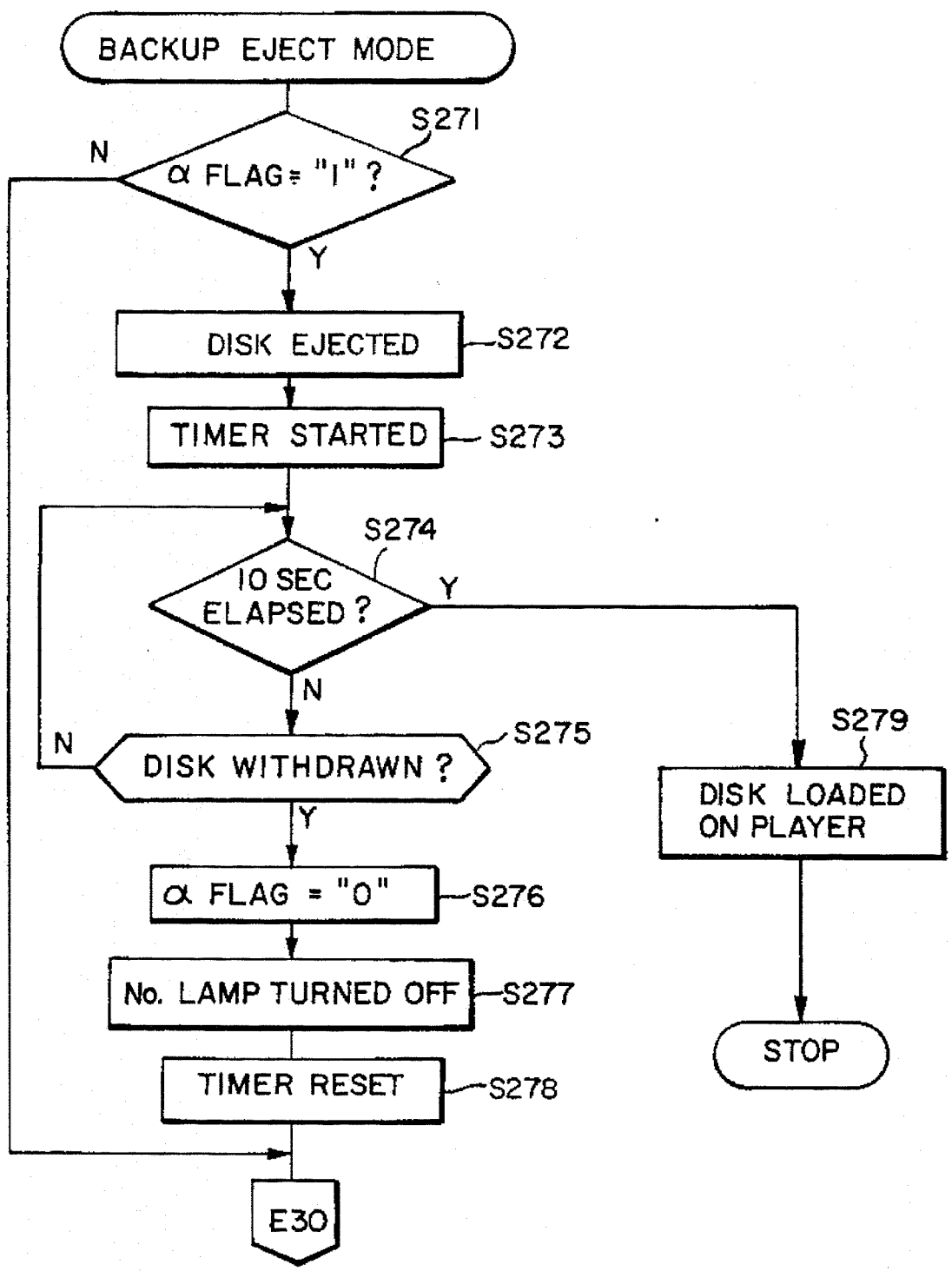
FIG. 21 is a flowchart showing CPU processing operations in the backup eject mode.
Figure 22:
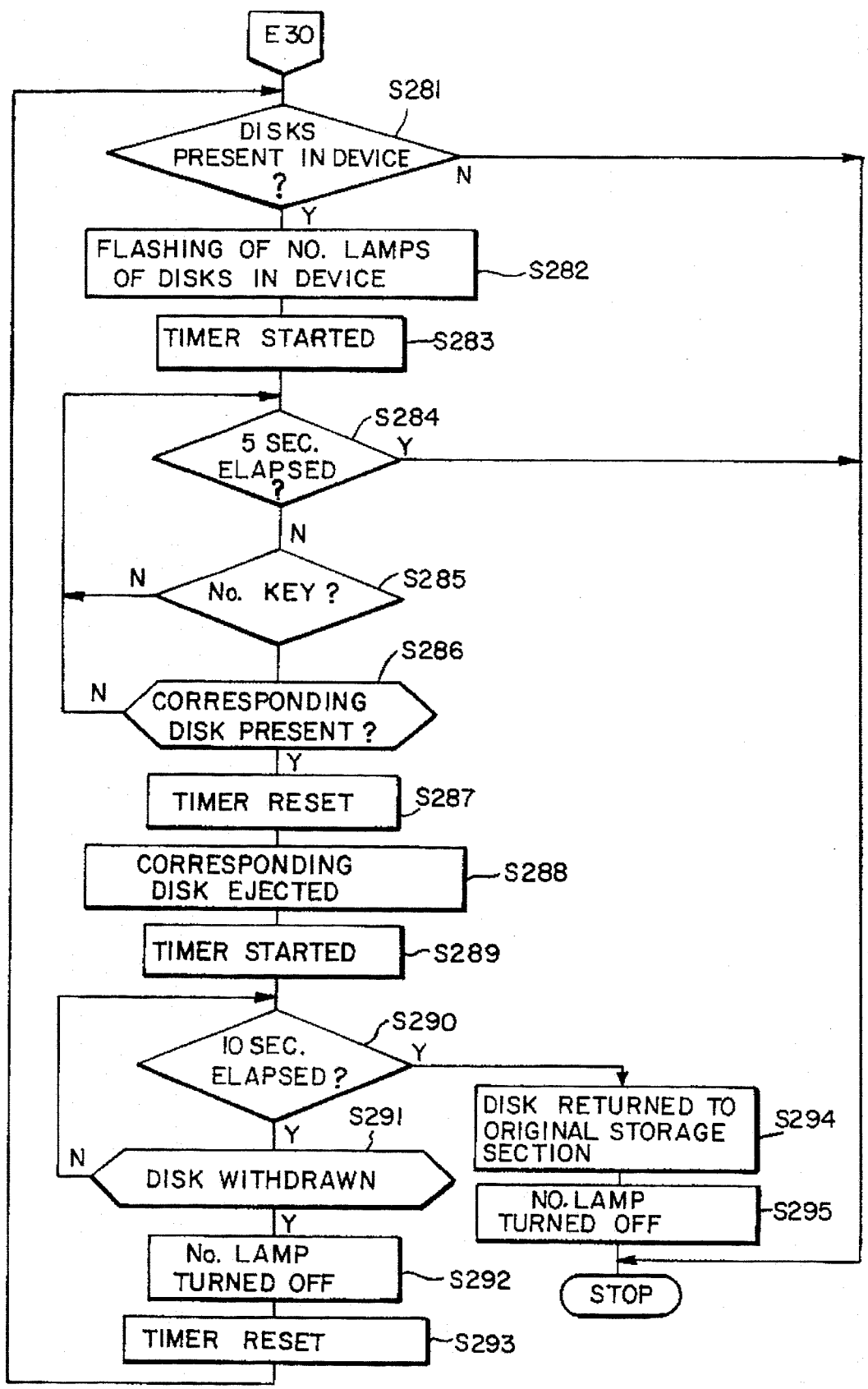
FIG. 22 is a continuation flowchart showing CPU processing operations in the backup eject mode.

Next, a backup eject mode for times when the power supply is turned off will be described. FIGS. 21 and 22 are flowcharts showing CPU 233 processing operations in this backup eject mode.

This backup eject mode is one in which, even when the power supply is turned off, i.e., when the ACC switch is switched off, the CPU 233 is energized by supply of power from a backup power supply, and eject operations for disks in the MD device are performed. The CPU 233 starts the backup eject mode if input is received from the eject key 116 at a time when the power supply is turned off.

In FIG. 21, it is determined whether the α flag is "1" (step S271). If the α flag is "1," the α disk is ejected from the disk insertion port 212 as far as the reloading position (step S272), a timer is started (step S273), and then it is determined whether 10 seconds have elapsed (step S274). If 10 seconds have not elapsed, it is determined whether the disk on reloading standby has been withdrawn (step S275) and, if it has, the α flag is made "0" (step S276), the No. lamp 107a corresponding to the disk that has been withdrawn is turned off (step S277), the timer that was started in step S273 is reset (step S278), and the routine goes to E30 shown in FIG. 22.

If it is found in step S271 that the α flag is not "1," the routine goes to E30 shown in FIG. 22.

If it is found in step S275 that the disk on reloading standby has not been withdrawn, the routine goes to step S274. If it is found in step S274 that 10 seconds have elapsed, the α disk on reloading standby is automatically reloaded and then set on the player section 4, or the carrier 3 is moved to the standby position (step S279), the backup eject mode is terminated, and the CPU 233 is deenergized again.

In E30 shown in FIG. 22, it is determined whether there are disks in the MD device (step S281). If there are disks in the MD device, an indication of this is given by causing the No. lamps (103a–106a) of the No. keys (103–106) corresponding to the storage sections (50a–50d) in which disks are stored in the MD device to flash (step S282), a timer is started (step S283), and then it is determined whether five seconds have elapsed (step S284). If five seconds have not elapsed, it is determined whether input from a No. key (103–106) has been received (step S285). If input from a No. key (103–106) has been received, it is determined whether a disk corresponding to the No. key (103–106) from which input has been received is present (step S286). If a corresponding disk is present, the timer that was started in step S283 is reset (step S287) and the disk is ejected as far as the reloading position (step S288). A flashing indication is given in step S282 in order to advise the user of the presence of ejectable disks in the storage sections (50a–50d) corresponding to the No. keys (103–106) of the No. lamps (103a–106a) that are flashing.

Next, the timer is started (step S289), and then it is determined whether 10 seconds have elapsed (step S290). If 10 seconds have not elapsed, it is determined whether the disk on reloading standby has been withdrawn (step S291) and, if it has, the currently flashing No. lamp (103a–106a) in correspondence thereto is turned off (step S292), the timer, which was started in step S289, is reset (step S293), and the routine goes to step S281.

If it is found that no No. key (103–106) input has been received in step S285, or that there is no corresponding disk in step S286, the routine goes to step S284. If it is found in step S284 that five seconds have elapsed, the backup eject mode is terminated and the CPU 233 is deenergized again.

If it is found in step S291 that the disk on reloading standby has not been withdrawn, the routine goes to step S290. If it is found in step S290 that 10 seconds have elapsed, the disk on reloading standby is automatically reloaded and then stored in its original storage section (step S294), the currently flashing No. key (103–106) is caused to give a lit-up indication (step S295), and the backup eject mode is terminated.

The backup eject mode described above makes it possible for disks that are in the MD device to be selected and ejected by eject key 116 input even when the power supply is turned off.

Next, the play mode indicated at step S20 will be described with reference to FIGS. 23–37.

First, the main processing operations of the CPU 233 in the play mode will be described with reference to FIGS. 23 and 24.

In FIG. 23, it is determined whether the α flag is "1" (step S301). If the α flag is "1," "PLAY MODE," informing the user that the current mode is play mode, is displayed (step S302), and it is determined whether a disk has been loaded onto the player section 4 (step S303). If a disk has not been loaded onto the player section 4, then one is loaded on (step S304), and the routine goes into play processing (step S400), which is described later. If a disk has been loaded onto the player section 4, in step S303, the routine goes to step S400.

If it is found in step S301 that the α flag is not "1," it is determined whether or not a disk or disks is or are present in the MD device (step S305) and, if there is/are, "PLAY MODE," informing the user that the current mode is play mode, is displayed (step S306), and it is determined whether there are plural disks in the MD device (step S307). If there are plural disks present, this is indicated by causing the No. lamps (103a–106a) corresponding to the disks present in the MD device to flash (step S308), and the routine goes to P2 shown in FIG. 24, which will be described later. The No. lamps (103a–106a) corresponding to the disks present in the MD device are caused to give a flashing indication in order to urge the user to select a disk.

If it is found in step S305 that there are no disks in the MD device, "NO DISK," informing the user that there are no disks to be played, is displayed (step S309), and the play mode is terminated.

If it is found in step S307 that there are not plural disks, it is determined whether the carrier 3 contains a disk (step S310). If the carrier 3 does contain a disk, the routine goes to step S303. If the carrier 3 does not contain a disk, one is loaded into it (step S311), and the routine goes to step S304.

Figure 24:
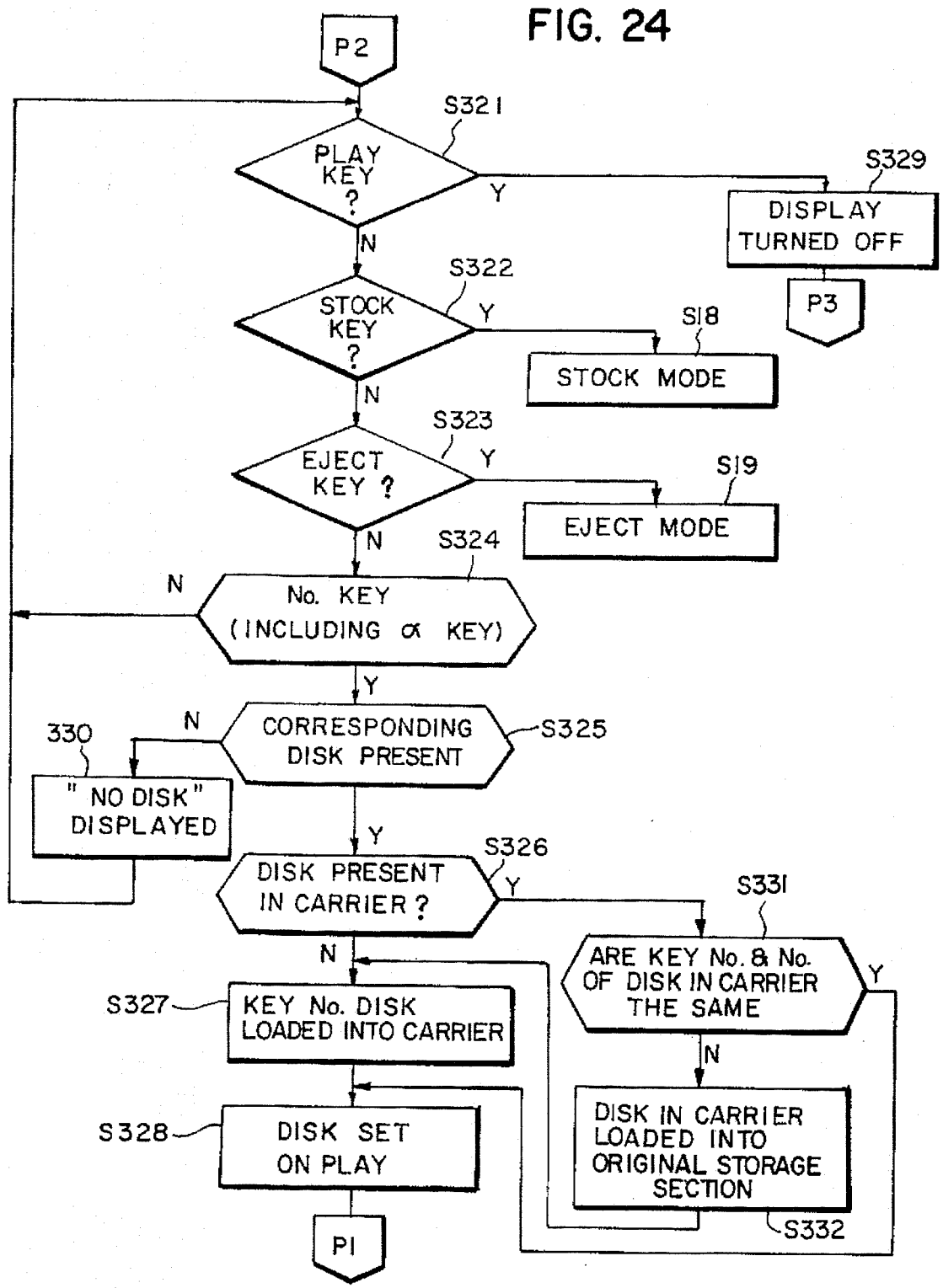
FIG. 24 is a continuation flowchart showing CPU processing operations in the play mode.

At P2 shown in FIG. 24, it is determined whether input from the play key 108 has been received (step S321). If no play key 108 input has been received, it is determined whether input from the stock key 102 has been received (step S322). If no stock key 102 input has been received, it is determined whether input has been received from the eject key 116 (step S323). If no input has been received from the eject key 116, it is determined whether input from the α key 107 or from a No. key (103–106) has been received (step S324).

If it is found that α key 107 or No. key (103–106) input has been received, it is determined whether a disk corresponding to the α key 107 or the No. key (103–106) from which input has been received is present (step S325). If there is a corresponding disk, it is determined whether it is in the carrier 3 (step S326). If there is no disk in the carrier 3, the disk corresponding to the α key 107 or the No. key (103–106) from which input has been received is loaded into the carrier 3 (step S327), this disk is set on the player section 4 (step S238), and the routine goes to P1 shown in FIG. 23.

If it is found in step S321 that input has been received from the play key 108, the display currently being shown is turned off (step S329), and the routine goes to P3 shown in FIG. 23. If it is found in step S322 that input has been received from the stock key 102, the routine goes into the stock mode of step S18 shown in FIG. 7. If it is found in step S323 that input has been received from the eject key 116, the routine goes into the eject mode of step S19 shown in FIG. 7.

If it is found in step S324 that no α key 107 or No. key (103–106) input has been received, the routine goes to step S231. If it is found in step S325 that there is no corresponding disk, "NO DISK," informing the user that no corresponding disk is present, is displayed (step S330), and the routine goes to step S321.

If it is found in step S326 that the carrier 3 contains a disk, it is determined whether the No. corresponding to this disk and the No. of the No. key (103–106) from which the above-noted input was received are the same (step S331). If they are not the same, the disk that is in the carrier 3 is loaded into its original storage section (step S332), and the routine goes to step S327, while if they are found to be the same in step S331, the routine goes to step S328.

Figure 25:
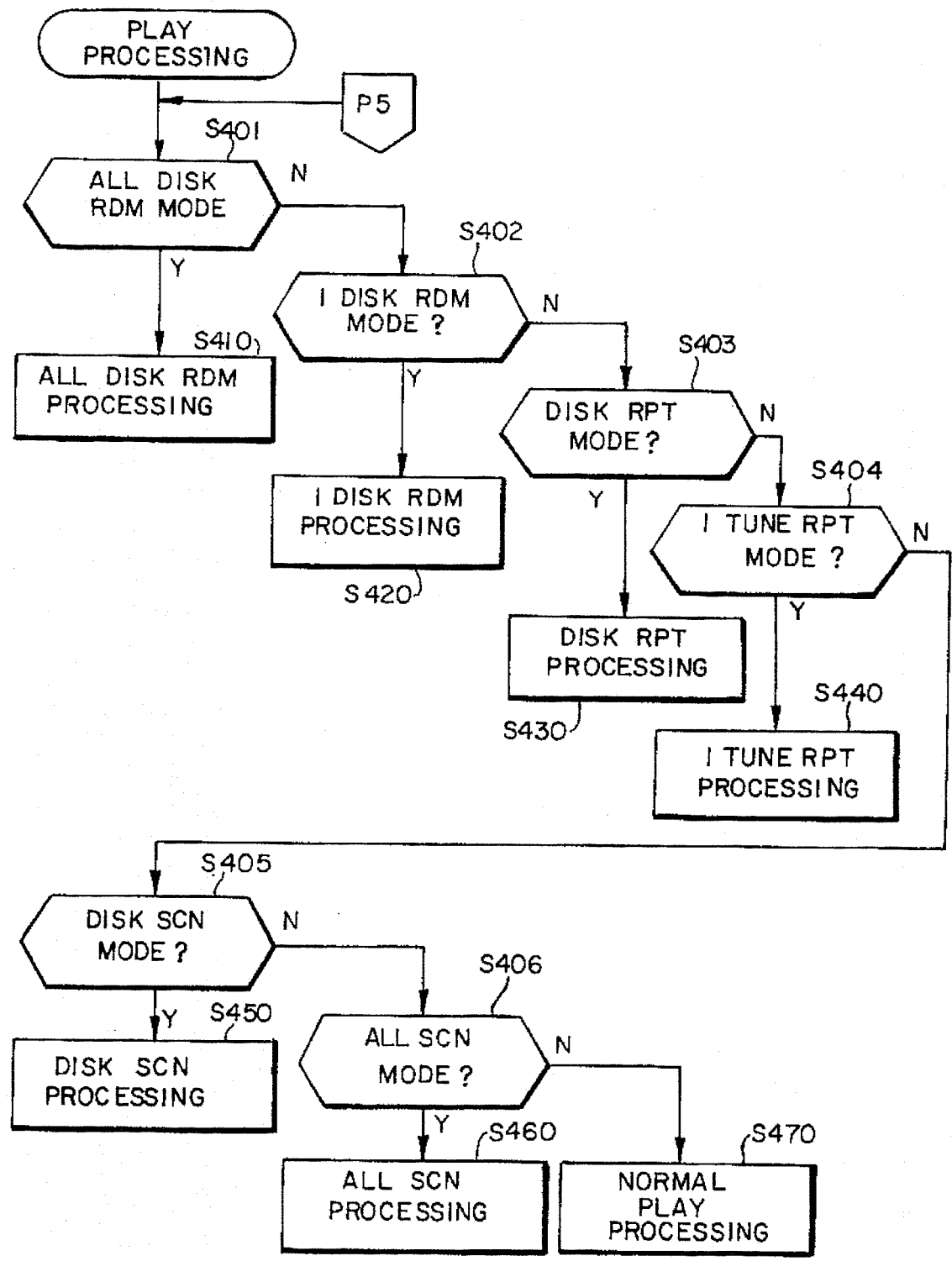
FIG. 25 is a flowchart showing CPU processing operations in play processing in the play mode.

Next, the CPU 233 processing operations in the play processing of step S400 will be described with reference to the flowchart of FIG. 25.

In the play processing shown in FIG. 25, it is determined whether the mode is all disks random (referred to below simply as "all disks RDM") mode (step S401). If it is all disks RDM mode, the routine goes into all disks RDM processing, which is described later (step S410). If the mode is not all disks RDM mode, it is determined whether it is 1 disk random (simply 1 disk "RDM" below) mode (step S402). If it is 1 disk RDM mode, the routine goes into 1 disk RDM processing, which is described later (step S420).

If it is found in step S402 that the mode is not 1 disk RDM mode, it is determined whether the mode is disk repeat (referred to below simply as "disk RPT") mode (step S403). If it is disk RPT mode, the routine goes into disk RPT processing, which is described later (step S430).

If it is found in step S403 that the mode is not disk RPT mode, it is determined whether the mode is 1 tune repeat mode (step S404). If it is 1 tune repeat mode, the routine goes into 1 tune RPT processing, which is described later (step S440).

If it is found in step S404 that the mode is not 1 tune RPT mode, it is determined whether the mode is disk scan (referred to below simply as "disk SCN") mode (step S405). If it is disk SCN mode, the routine goes into disk SCN processing, which is described later (step S450).

If it is found in step S405 that the mode is not disk SCN mode, it is determined whether the mode is all scan (referred to below simply as "all SCN") mode (step S406). If it is all SCN mode, the routine goes into all SCN processing, which is described later (step S460).

If it is found in step S406 that the mode is not all SCN mode, the routine goes into normal play processing, which is described below (step S470). In play processing, the lamp from amongst the No. lamps (103a–106a) that corresponds to the disk that is currently being played gives a flashing display, lamps that correspond to storage sections (50a–50d) which currently hold disks give a lit-up display, and lamps that correspond to storage sections (50a–50d) in which disks have not been loaded are turned off.

Next, the processing operations of the CPU 233 in the normal play processing of step S470 shown in FIG. 25 will be described with reference to FIG. 26.

Figure 26:
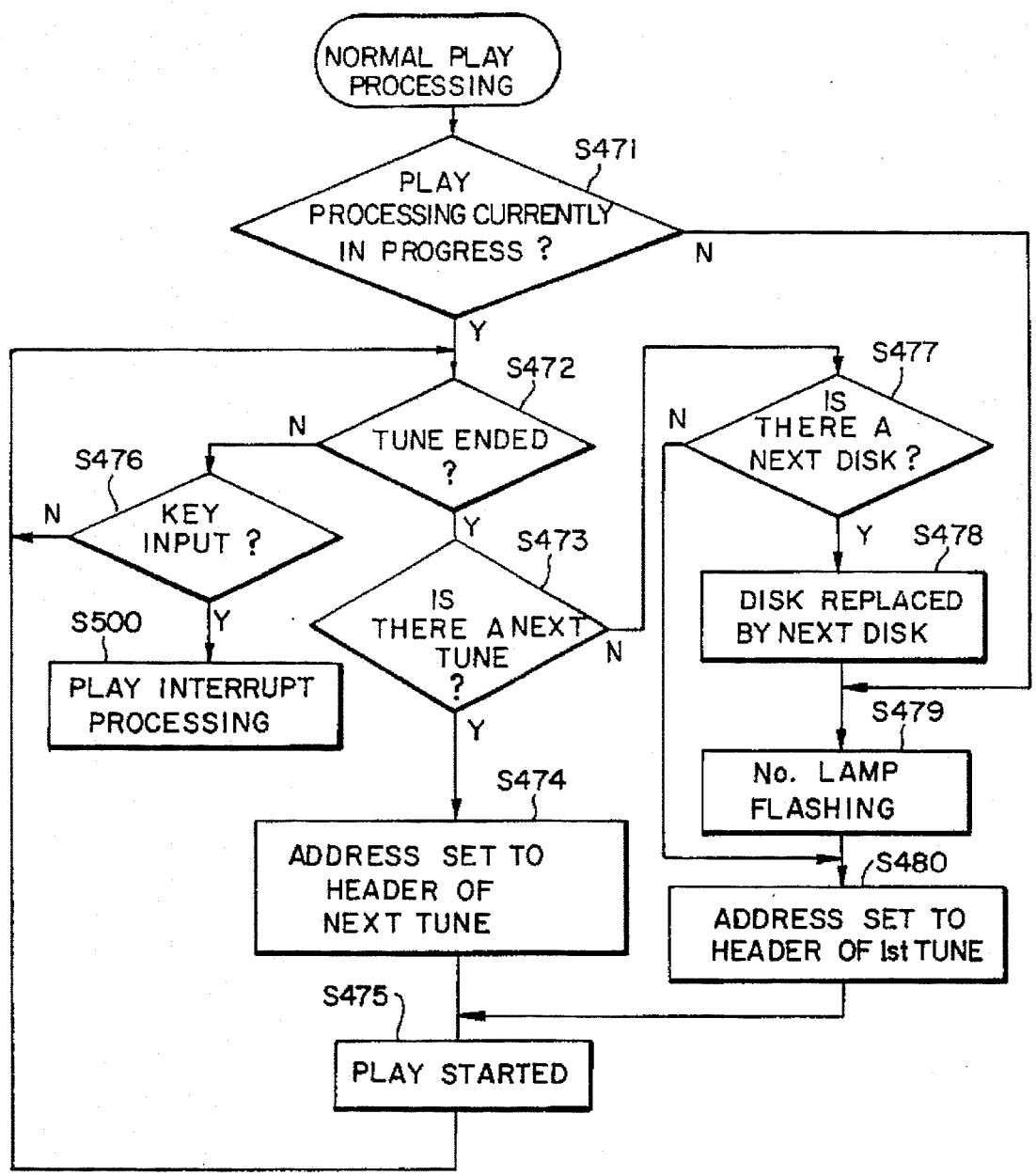
FIG. 26 is a flowchart showing CPU processing operations in normal play processing of the play mode.

In FIG. 26, it is determined whether normal play processing is currently in progress (step S471) and, if it is, it is determined whether playing of a tune on the disk for which normal play processing is being performed has ended (step S472). If playing of this tune has ended, it is determined whether there is a next tune (step S473). If there is a next tune, the address is set to the header of this next tune (step S474), playback operation is started (step S475), and the routine goes to step S472.

If it is found in step S472 that playing of the tune has not ended, it is determined whether key input, i.e., input from one of the operating mode keys which are the stock key 102 and the eject key 116, or from a special playback key such as the RPT key 109, RDM key 110, and SCN key 111, etc., or from a No. key (103–106) for selecting a disk, etc., has been received (step S476). If no such key input has been received, the routine goes to step S472. If input has been received from one of these keys, the routine goes into play interrupt processing, which is described later (step S500).

If it is found in step S473 that there is not a subsequent tune that can be played, it is determined whether there is a subsequent disk that can be played (step S477). If there is a subsequent disk for playing, the disk on which the playing of tunes has been completed is replaced by the subsequent disk (step S478), the No. lamp (103a–106a) corresponding to this replacement disk is caused to give a flashing display (step S479), the address is set to the disk's header tune (step S480), and the routine goes to step S475.

If it is found in step S471 that play processing is not currently in progress, the routine goes to step S479. If it is found in step S477 that there is not a subsequent disk for playing, the routine goes to step S480.

In this normal play processing, when playing of all the disks in the MD device is completed, playing starts again from the header tune of the first disk.

Next, the processing operations of the CPU 233 in the play interrupt processing of the above-noted step S500 shown in FIG. 26 will be described with reference to FIGS. 27 and 28.

Play interrupt processing is processing such that, if there is key input during a playback operation, the routine goes into the processing mode specified by the key input and starts playback operation in respect of the disk specified by the key input. Key input in this case does not include input from function keys such as the FF key 114 or FB key 115, etc., but is only key input relating to operating modes, special playback keys and the No. keys (103–106), etc.

Figure 27:
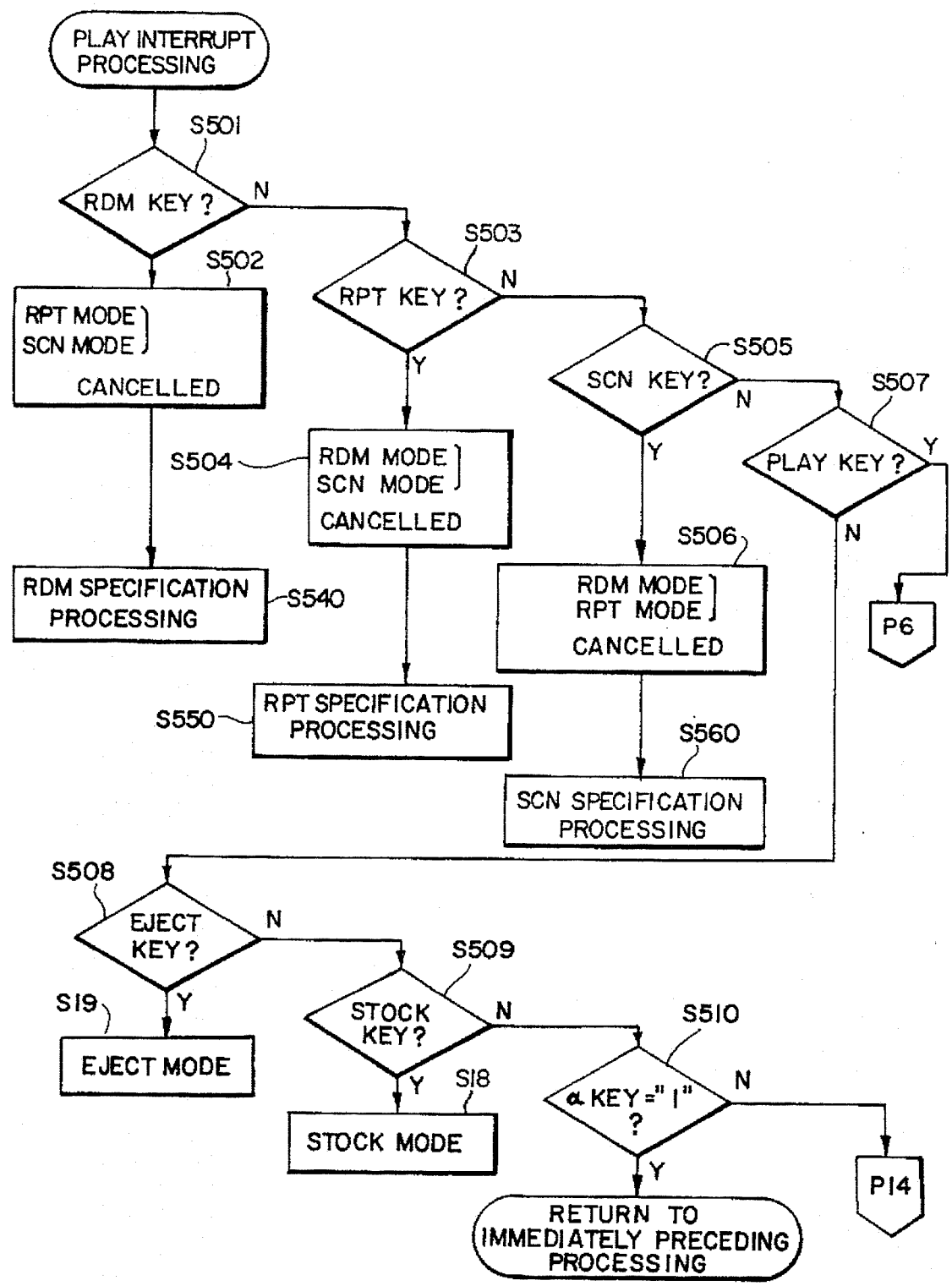
FIG. 27 is a flowchart showing CPU processing operations in play interrupt processing in the play mode.

In FIG. 27, it is determined whether input from the RDM key 110 has been received (step S501). If input from the RDM key 110 has been received, any currently-shown display relating to the RPT mode or SCN mode is turned off and the RPT mode or SCN mode is cancelled (step S502), and the routine goes into RDM processing, which is described later (step S540).

If it is found in step S501 that no RDM key 110 input has been received, it is determined whether input from the RPT key 109 has been received (step S503). If input has been received from the RPT key 109, any currently-shown display relating to the RDM mode or SCN mode described below is turned off and the RDM mode or SCN mode is cancelled (step S504), and the routine goes into the RPT specification processing described below (step S550).

If it is found in step S503 that input has not been received from the RPT key 109, it is determined whether input from the SCN key 111 has been received (step S505). If input has been received from the SCN key 111, any currently-shown display relating to the RDM mode or RPT mode described below is turned off and the RDM mode or RPT mode is cancelled (step S506), and the routine goes into the SCN specification processing described below (step S560).

If it is found in step S505 that input from the SCN key 111 has not been received, it is determined whether input from the play key 108 has been received (step S507). If input has been received from the play key 108, the routine goes to P6 shown in FIG. 7. When play key 108 input is received, the current play interrupt processing is terminated, and the routine goes into the immediately preceding processing.

If it is found in step S507 that no input has been received from the play key 108, it is determined whether input from the eject key 116 has been received (step S508). If input has been received from the eject key 116, the routine goes into the eject mode of step S19 shown in FIG. 7. If input has not been received from the eject key 116, it is determined whether input has been received from the stock key 102. If input has been received from the stock key 102, the routine goes into the stock mode of step S18 shown in FIG. 7. If input has not been received from the stock key 102, it is determined whether the α flag is "1" (step S510). If the α flag is "1," the routine goes into the play mode that immediately preceded the move into play interrupt processing. If the α flag is not "1," the routine goes to P4 shown in FIG. 28.

Figure 28:
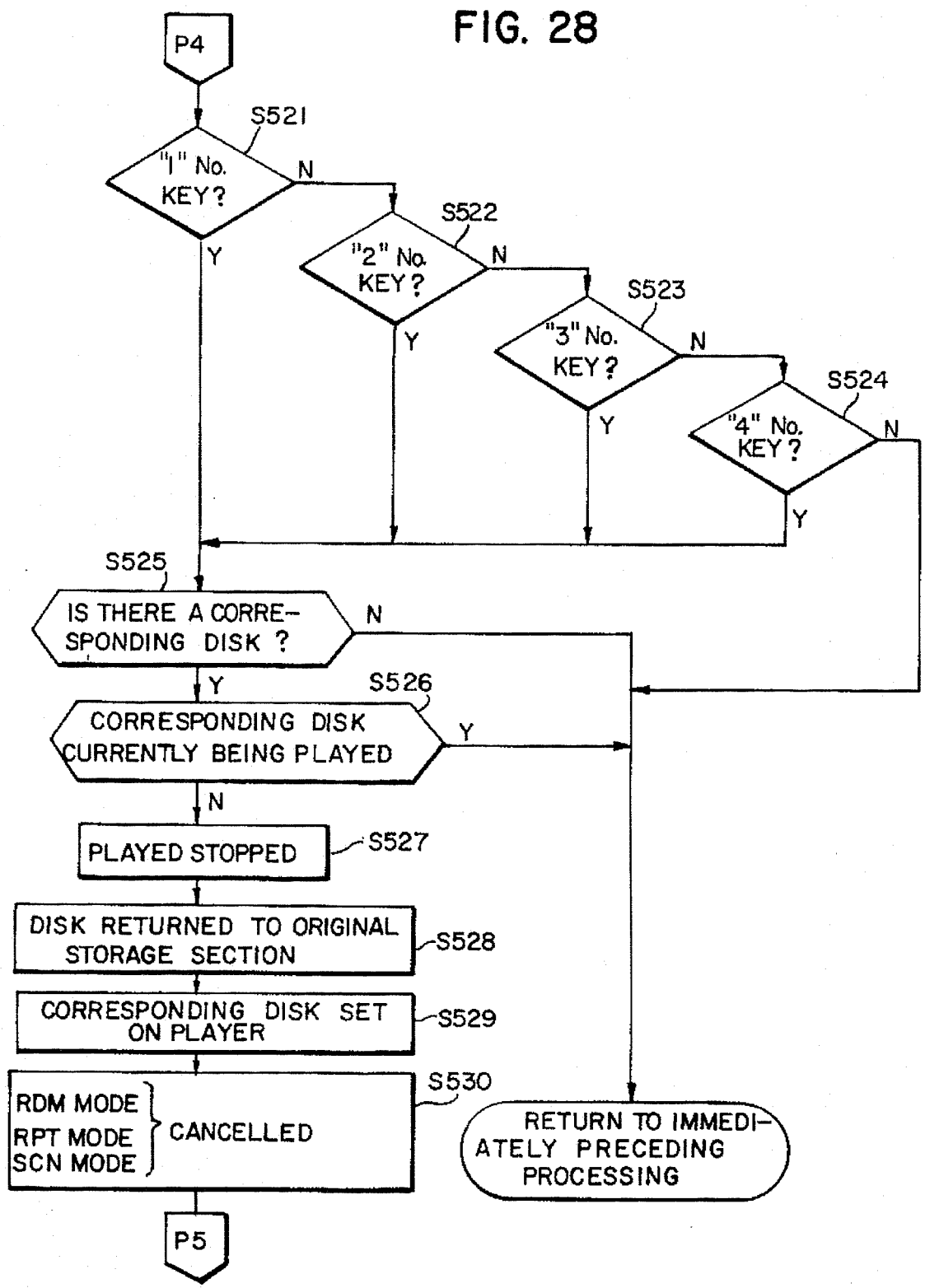
FIG. 28 is a continuation flowchart showing CPU processing operations in play interrupt processing in the play mode.

At P4 shown in FIG. 28, it is determined whether input from the No. key 103 corresponding to the #1 storage section 50a has been received (step S521). If no input from the No. key 103 has been received, it is determined whether input from the No. key 104 corresponding to the #2 storage section 50b has been received (step S522). If no input from the No. key 104 has been received, it is determined whether input from the No. key 105 corresponding to the #3 storage section 50c has been received (step S523). If no input from the No. key 105 has been received, it is determined whether input from the No. key 106 corresponding to the #4 storage section 50d has been received (step S524).

If it is found that No. key (103–106) input has been received in step S521, step S522, step S523, or step S524, it is determined whether a disk which is stored in the storage section (50a–50d) corresponding to the No. key (103–106) from which the input has been received is present (step S525). If a corresponding disk is present, it is determined whether the disk which is currently the subject of playback operation is this corresponding disk (step S526). If it is not the corresponding disk, the playback operation is stopped (step S527), the disk that has been stopped is returned to its original storage section (step S528), the disk corresponding to the No. key (103–106) from which input has been received is loaded onto the player section 4 (step S529), any currently-shown display relating to the special playback modes, which are the RDM mode, the RPT mode, and the SCN mode, is turned off (step S530), and the routine goes to P5 shown in FIG. 25. Thus, in this case, subsequently, the routine goes into the normal play processing of step S470 and normal playback of the selected disk is effected.

If it is found in step S525 that there is no corresponding disk present, or in step S526 that the disk for which playback operation is currently being effected is the corresponding disk, or in step S524 that no input has been received from the No. key 106 corresponding to the #4 storage section 50d, the routine goes into the processing mode that immediately preceded the move into play interrupt processing.

This play interrupt processing makes it possible to greatly improve the operating characteristics in the MD device, since when, during a playback operation, input is received from, e.g., an operating mode key which is constituted by the stock key 102 or the eject key 116, and changes the operating mode or a special playback key such as the RDM key 110, etc., the routine goes into the processing mode specified by the input of the relevant key, and when, during playback operation, input from a No. key (103–106) is received, playback operation in respect of the disk corresponding to the No. key (103–106) from which input has been received is started.

Next, the RDM specification processing of step S540 shown in FIG. 27 will be described.

The RDM mode comprises all disks RDM processing, in which all the tunes of all the disks that are in the MD device are made the object of random playing, and 1 disk RDM processing, in which all the tunes of just one disk are made the object of random playing, and RDM specification processing is processing whereby all disks RDM processing or 1 disk RDM processing is selected, depending on the length of the RDM key 110 input time (depression time).

However, with RDM specification processing, if it is attempted to perform all disks RDM processing when it is only possible to access one disk, e.g., when the α flag is "1" or when there is only one disk in the MD device, the display unit 117 is caused to display "DISK RDM," which tells the user that the current processing mode is all disks RDM processing, and since in terms of control content there is no difference at all from 1 disk RDM processing, there may be situations in which the user is misled.

In order to counter such situations, the RDM specification processing here is so arranged that when only one disk can be accessed, a move to all disks RDM processing is inhibited, and the routine immediately goes into 1 disk RDM processing.

Figure 29:
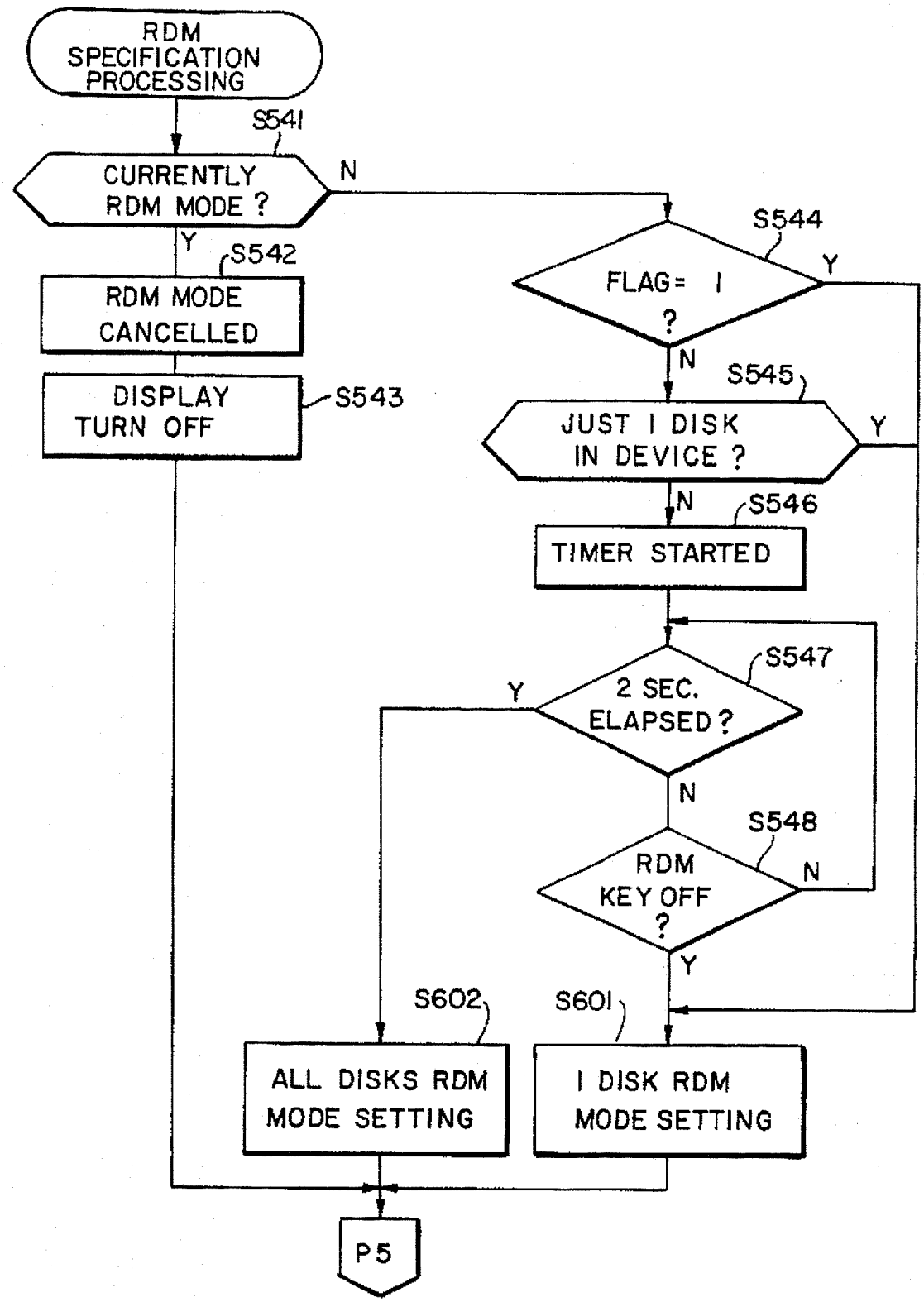
FIG. 29 is a flowchart showing CPU processing operations in RDM specification processing in the play mode.

FIG. 29 is a flowchart showing the processing operations of the CPU 233 in RDM specification processing.

In the RDM specification processing shown in FIG. 29, it is determined whether the current mode is an RDM mode (step S541). If it is an RDM mode, this RDM mode is cancelled (step S542), any display relating to the different forms of RDM processing described below is turned off (step S543), and the routine goes into the play processing (PS) of FIG. 25. In this case, all the special playback modes having been disconnected, and the routine subsequently goes to the normal play processing of step S470.

If it is found in step S541 that the current processing mode is not an RDM mode, it is determined whether the α flag is "1" (step S544). If the α flag is not "1," it is determined whether there is just one disk in the MD device (step S545). If there is not just a single disk, a timer is started (step S546), and then it is determined whether two seconds have elapsed (step S547). If two seconds have not elapsed, it is determined whether the RDM key 110 input supplied in step S501 has gone to the OFF state (step S548). If the RDM key 110 input has gone to the OFF state, the 1 disk RDM mode in which the 1 disk RDM processing described below is performed is set (step S601), and then the routine goes to P5 shown in FIG. 25.

If it is found in step S544 that the α flag is "1," or in step S545 that there is just one disk in the device, the routine goes to step S601. If it is found in step S548 that the RDM key 110 input is not in the OFF state, the routine goes to step S547 and, if it is found in step S547 that two seconds have elapsed, i.e., that the RDM key 110 has been kept depressed, for two seconds, the all disks RDM mode for pertbrining the all disks RDM processing described below is set (step S602), and then the routine goes to P5 shown in FIG. 25.

This RDM specification processing makes it possible to effectively counter a situation in which the user is misled concerning the current processing mode, since when the α flag is "1" or when there is only one disk in the MD device, a move to all disks RDM processing is inhibited, and there is an unconditional move to 1 disk RDM processing, and the process makes it possible to avoid a situation in which the operating time is delayed due to detection of long-time depression of the RDM key 110.

Next, the processing operations of the CPU 233 in all disks RDM processing (step S410 of FIG. 25) will be described with reference to the flowchart shown in FIG. 30.

Figure 30:
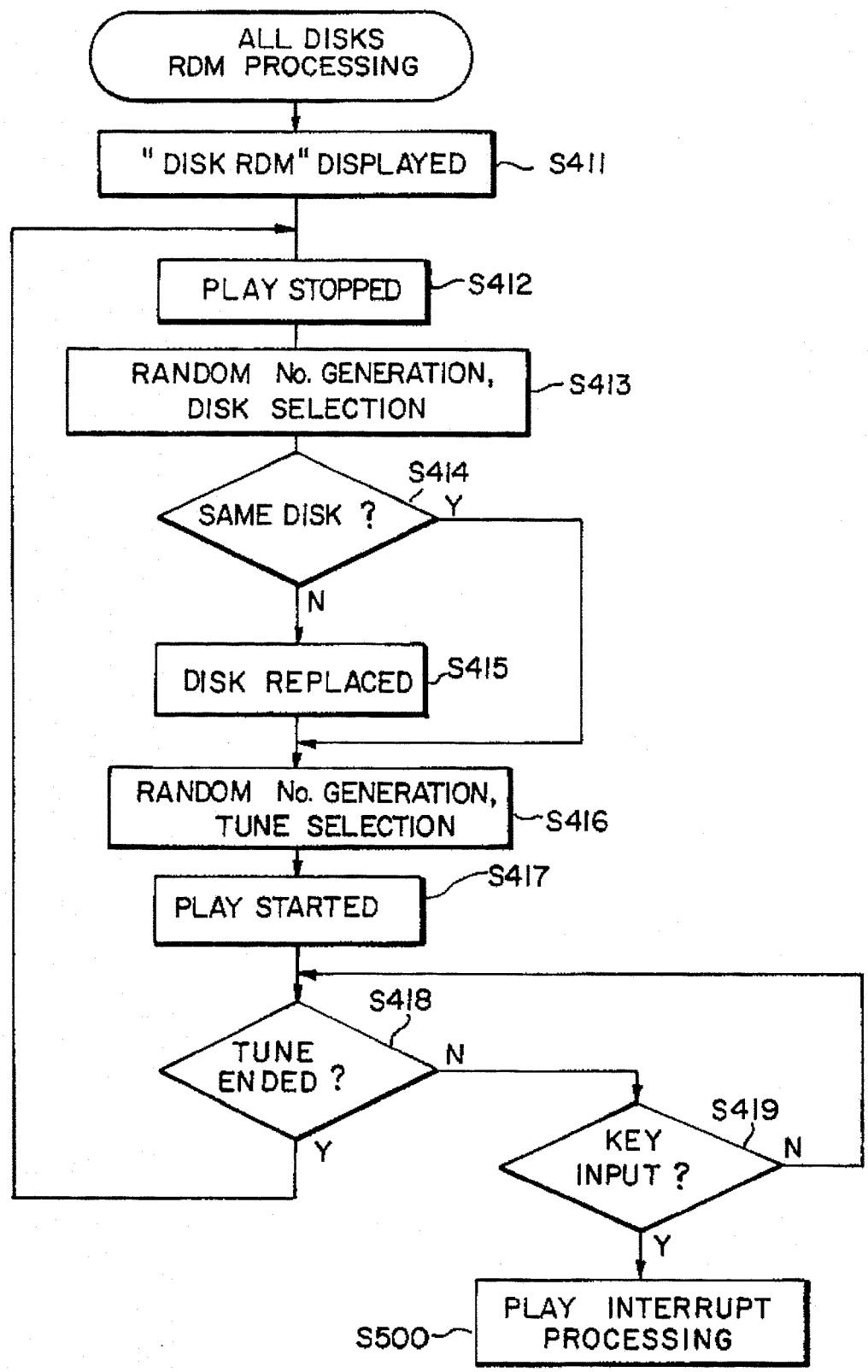
FIG. 30 is a flowchart showing CPU processing operations in all disks RDM processing.

In FIG. 30, "DISK RDM," informing the user that the current processing mode is all disks RDM processing is displayed (step S411) and, if the current operating state is that of execution of a playback operation, this playback operation is stopped (step S412), a random number is generated, and a disk in the device is selected (step S413), and it is determined whether this selected disk and the disk currently loaded on the player section 4 are the same (step S414).

If the selected disk and the disk currently loaded on the player section are not the same, the disk currently loaded on the player section 4 is replaced by the selected disk (step S415), a random number is generated for the tunes on the replacement disk in order to select a tune (step S416), playback operation for the selected tune is started (step S417), and then it is determined whether playing of this tune has ended (step S418). If playing of the tune has ended, the routine goes to step S412.

If it is found in step S414 that the disks are identical, the routine goes to step S416. If it is found in step S418 that playing of the tune has not ended, it is determined whether key input, i.e., as described above, key input from an operating mode key, special playback key or No. key (103–106), has been received (step S419). If there is no such key input, the routine goes to step S418. If such key input has been received, the routine goes into the play interrupt processing of step S500 shown in FIG. 27.

Next, the processing operations of the CPU 233 in 1 disk RDM processing (step S420 of FIG. 25) will be described with reference to the flowchart shown in FIG. 31.

Figure 31:
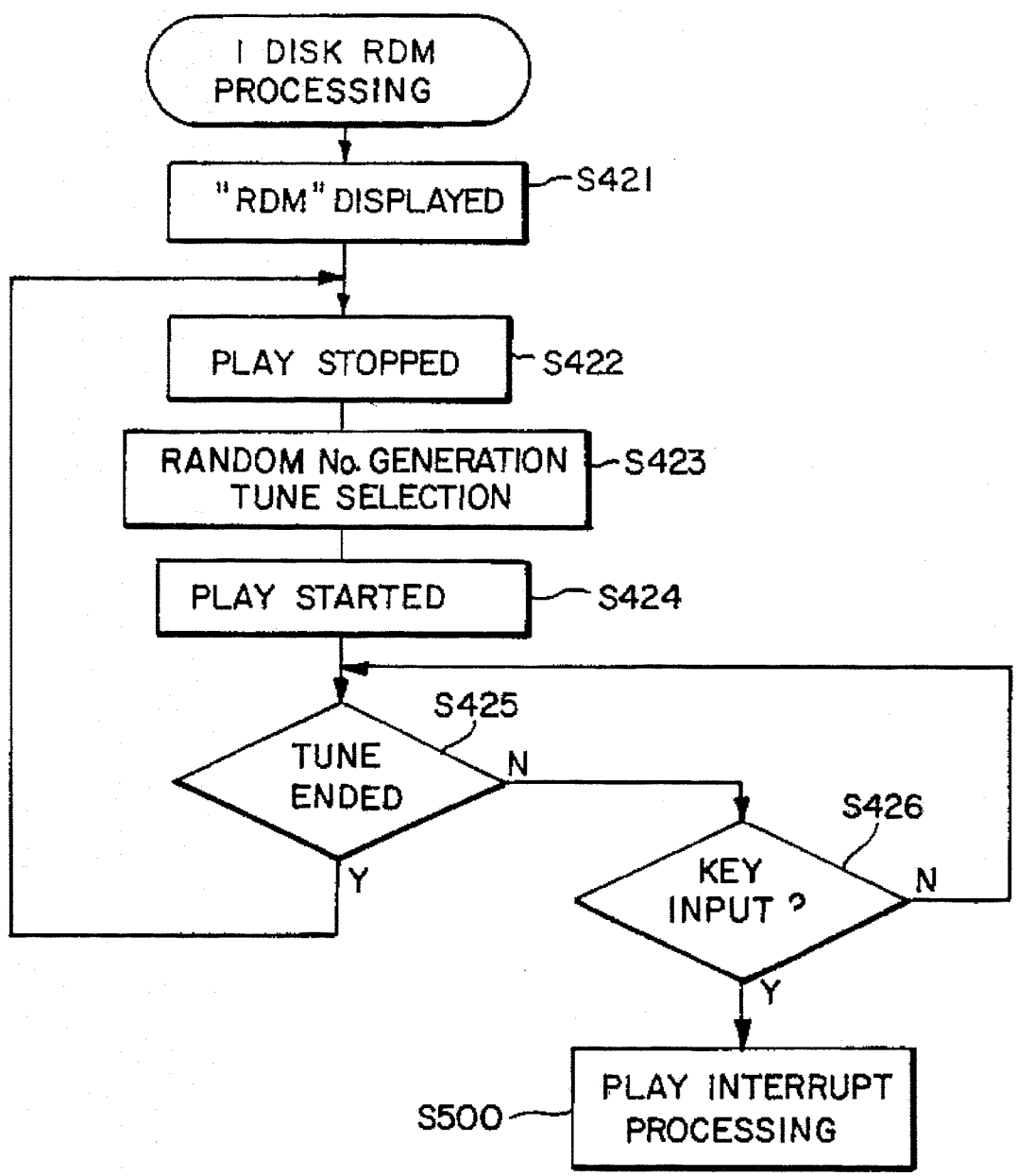
FIG. 31 is a flowchart showing CPU processing operations in 1 disk RDM processing.

In FIG. 31, "RDM," informing the user that the current processing mode is 1 disk RDM processing is displayed (step S421) and, if the current operating state is that of execution of a playback operation, this playback operation is stopped (step S422), a random number is generated for the tunes of one disk in order to select a tune (step S423), and playback operation in respect of the selected tune is started (step S424), and then it is determined whether playing of this tune has ended (step S425). If playing of the tune has ended, the routine goes to step S422.

If it is found in step S425 that playing of the tune has not ended, it is determined whether key input, i.e., as described above, key input from an operating mode key, special playback key or No. key (103–106), has been received (step S426). If there is no such key input, the routine goes to step S425. If it is found in step S426 that such key input has been received, the routine goes into the play interrupt processing of step S500 shown in FIG. 27.

Although disks and/or tunes are selected on the basis of random numbers in the RDM modes of the embodiment described above, the arrangement is also made such that disks and/or tunes are selected on the basis of linear m series feedback connection method code strings.

Next, the RPT specification processing of step S550 shown in FIG. 27 will be described.

The RPT mode comprises disk RPT processing, in which one disk out of all the disks that are in the MD device is selected and repeat playing of all the tunes of the selected disk is effected, and 1 tune RPT processing, in which one tune out of the tunes of a selected disk is selected and repeat playing of this tune is effected, and RPT specification processing is processing whereby disk RPT processing or 1 tune RPT processing is selected, depending on the length of RPT key 109 input time (depression time.)

However, with RPT specification processing, if it is attempted to perform all disks RPT processing when it is only possible to access one disk, e.g., when the α flag is "1" or when there is only one disk in the MD device, the display unit 117 is caused to display "DISK RPT," which tells the user that the current processing mode is disk RPT processing and, since in terms of control content there is no difference at all from normal play processing, there may be situations in which the user is misled.

In order to counter such situations, the RPT specification processing here is so arranged that when only one disk can be accessed, a move to disk RPT processing is inhibited, and the routine immediately goes into 1 tune RPT processing.

Figure 32:
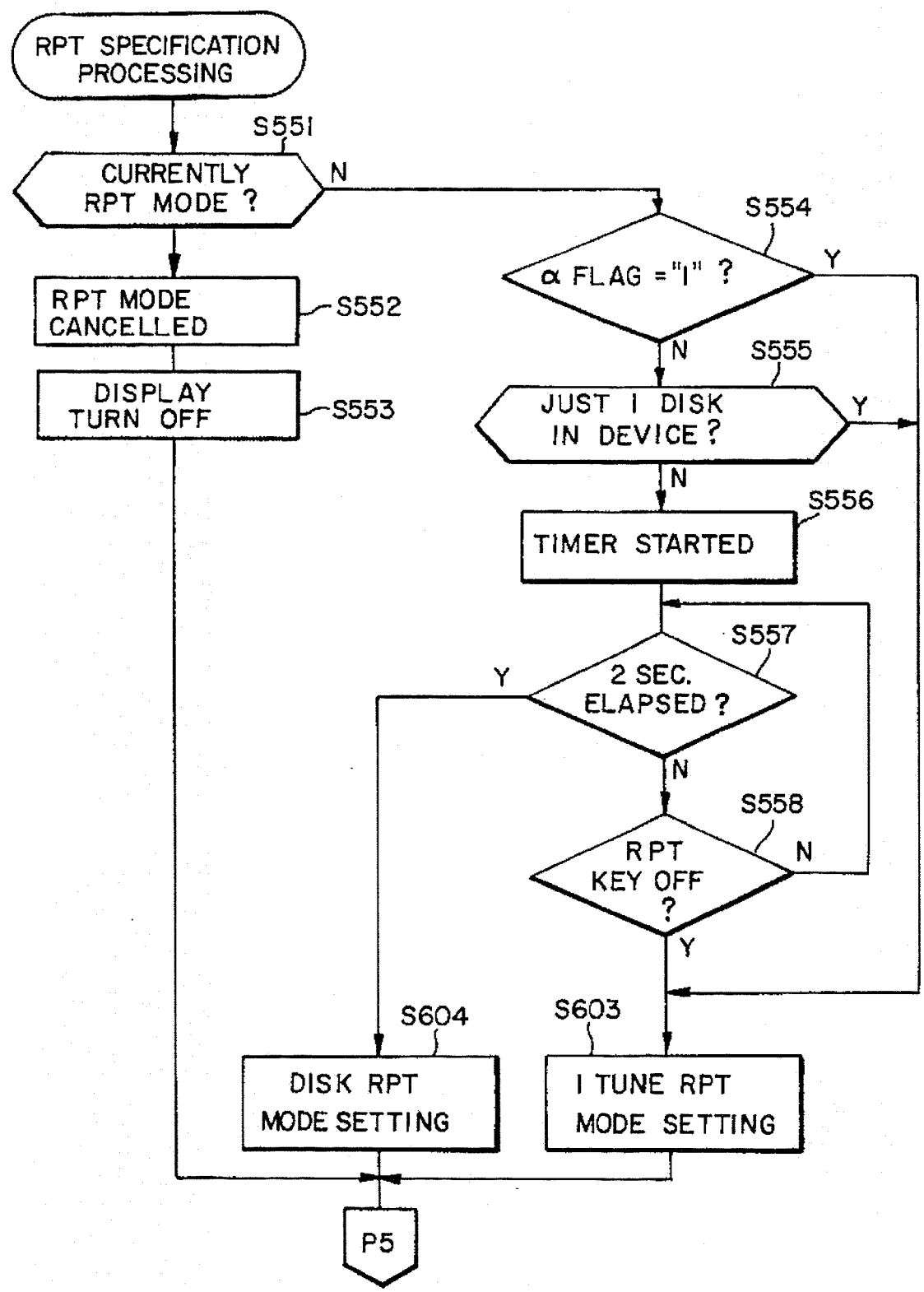
FIG. 32 is a flowchart showing CPU processing operations in play mode RPT specification processing.

FIG. 32 is a flowchart showing the processing operations of the CPU 233 in RPT specification processing.

In FIG. 32, it is determined whether the current mode is an RPT mode (step S551). If it is an RPT mode, this RPT mode is cancelled (step S552), any display relating to the different forms of RPT processing described below is turned off (step S553), and the routine goes into the play processing (P5) of FIG. 25. In this case, all the special playback modes having been disconnected, the routine subsequently goes to the normal play processing of step S470 (see FIG. 26).

If the current mode is not an RPT mode, it is determined whether the α flag is "1" (step S554). If the α flag is not "1," it is determined whether there is just one disk in the MD device (step S555). If there is not just a single disk, a timer is started (step S556), and then it is determined whether two seconds have elapsed (step S557). If two seconds have not elapsed, it is determined whether the RPT key 109 input supplied in step S503 has gone to the OFF state (step S558). If the RPT key 109 input has gone to the OFF state, then 1 tune RPT mode in which the 1 tune RPT processing described below is performed is set (step S603), and then the routine goes to P5 shown in FIG. 25.

If it is found in step S558 that the RPT key 109 input is not in the OFF state, the routine goes to step S557 and, if it is found in step S557 that two seconds have elapsed, the disk RPT mode for performing the disk RPT processing described below is set (step S604), and then the routine goes to P5 shown in FIG. 25.

If it is found in step S554 that the α flag is "1," or in step S555 that there is just one disk in the MD device, the routine goes to step S603.

This RPT specification processing makes it possible to effectively counter a situation in which the user is misled concerning the current processing mode, since when the α flag is "1" or when there is only one disk in the MD device, a move to all disks RPT processing is inhibited, and there is an unconditional move to 1 disk RPT processing, and the process makes it possible to avoid a situation in which the operating time is delayed due to detection of long-time depression of the RPT key 109.

Next, the processing operations of the CPU 233 in disk RPT processing (step S430 of FIG. 25) will be described with reference to the flowchart of FIG. 33.

Figure 33:
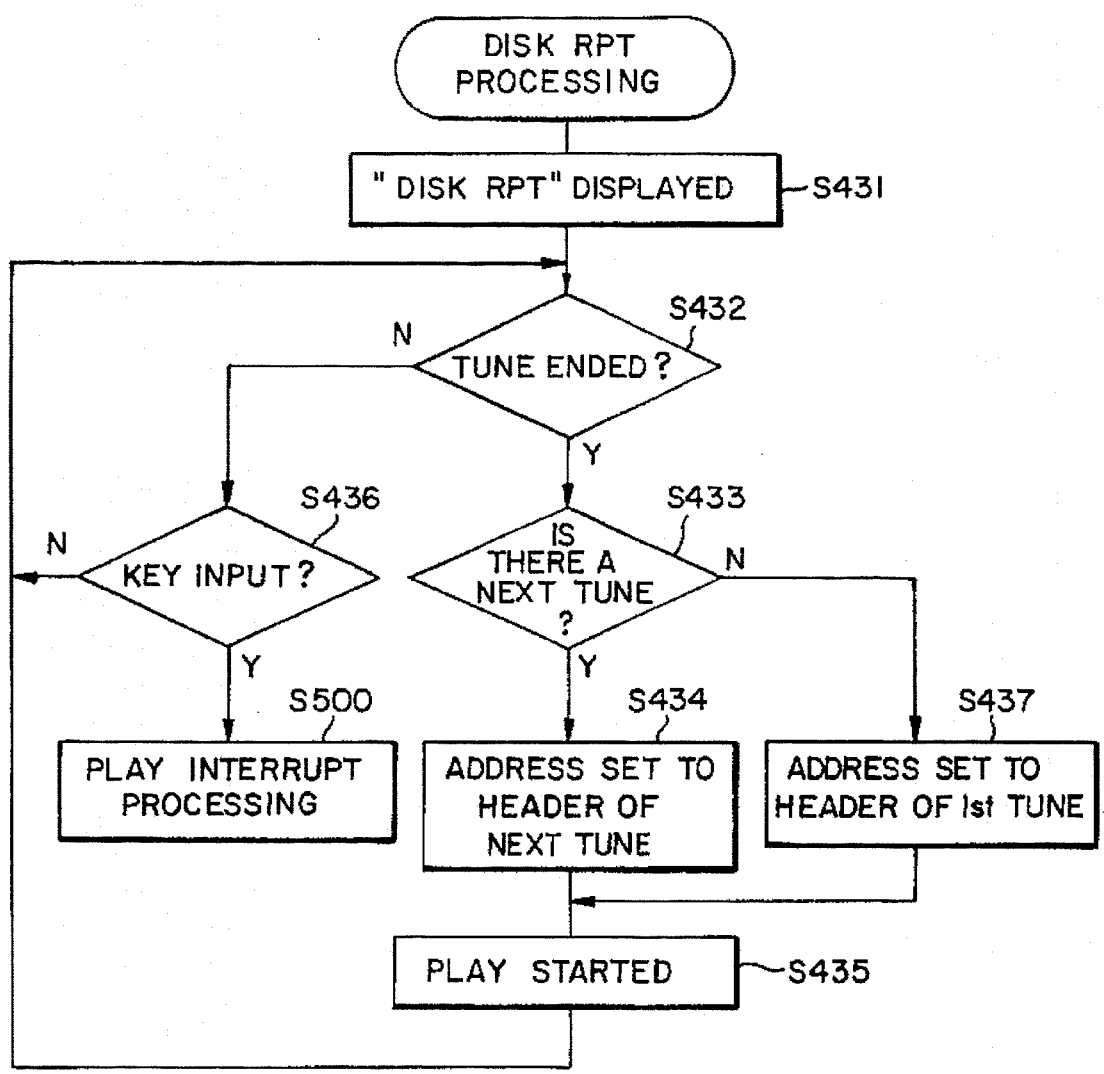
FIG. 33 is a flowchart showing CPU processing operations in disk RPT processing.

In FIG. 33, "DISK RPT," informing the user that the current processing mode is disk RPT processing, is displayed (step S431) and, if a tune is currently being played, it is determined whether it has ended (step S432). If the tune currently being played has ended, it is determined whether there is a next tune to be played (step S433). If there is a next tune for playing, the address is set to the header of this tune (step S434), playback operation in respect of this tune where the address has been set is started (step S435), and the routine goes to step S432.

If it is found in step S432 that playing of the tune has not ended, it is determined whether key input, i.e., as described above, operating mode key, special playback key or No. key (103–106) input, has been received (step S436). If no such key input has been received, the routine goes to step S432. If such key input has been received, the routine goes to the play interrupt processing of step S500 shown in FIG. 27.

If it is found in step S433 that there is no next tune for playing, the address is set to the tune header of that disk (step S437), and the routine goes to step S435.

Next, the processing operations of the CPU 233 in 1 tune RPT processing (step S440 of FIG. 25) will be described with reference to the flowchart of FIG. 34.

Figure 34:
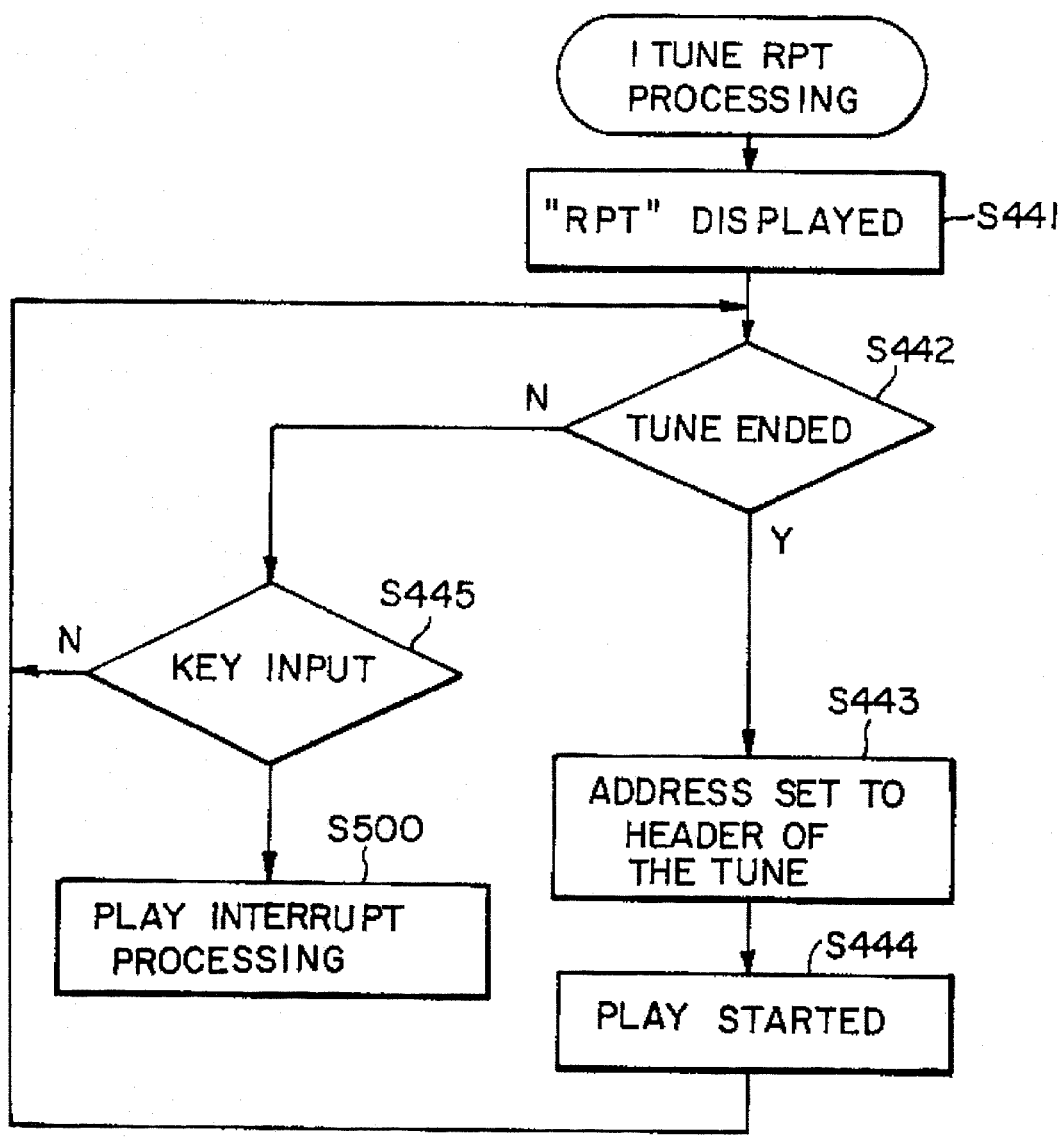
FIG. 34 is a flowchart showing CPU processing operations in 1 tune RPT processing.

In FIG. 34, "RPT," informing the user that the current processing mode is 1 disk RPT processing, is displayed (step S441) and, if a tune is currently being played, it is determined whether it has ended (step S442). If the tune currently being played has ended, the address is set to the header of this tune (step S443), playback operation is started (step S444), and the routine goes to step S442.

If it is found in step S442 that playing of the tune has not ended, it is determined whether key input, i.e., as described above, operating mode key, special playback key or No. key (103–106) input, has been received (step S445). If no such key input has been received, the routine goes to step S442. If such key input has been received, the routine goes to the play interrupt processing of step S500 shown in FIG. 27.

Next, the SCN specification processing of step S560 shown in FIG. 27 will be described.

The SCN mode comprises disk SCN processing, in which scan playing of just the introductory portion of the first tune on all of the disks in the MD device is effected for a set time, e.g., 10 seconds, and all SCN processing, in which scan playing of the introductory portion of all the tunes on all the disks is effected for 10 seconds, and SCN specification processing is processing whereby disk SCN processing or all SCN processing is selected, depending on the length of SCN key 111 input time (depression time).

However, with SCN specification processing, if it is attempted to perform disk SCN processing when it is only possible to access one disk, e.g., when the α flag is "1" or when there is only one disk in the MD device, the control content is simply that the introductory portion of the first tune on just this one disk is repeatedly scanned and played, which is of no practical use at all. Further, when the display unit 117 is caused to display "DISK SCN," telling the user that the current processing mode is disk SCN processing, there may be situations in which the user is misled.

In order to counter such situations, the SCN specification processing here is so arranged that when only one disk can be accessed, a move to disk SCN processing is inhibited, and the routine immediately goes into all SCN processing.

Figure 35:
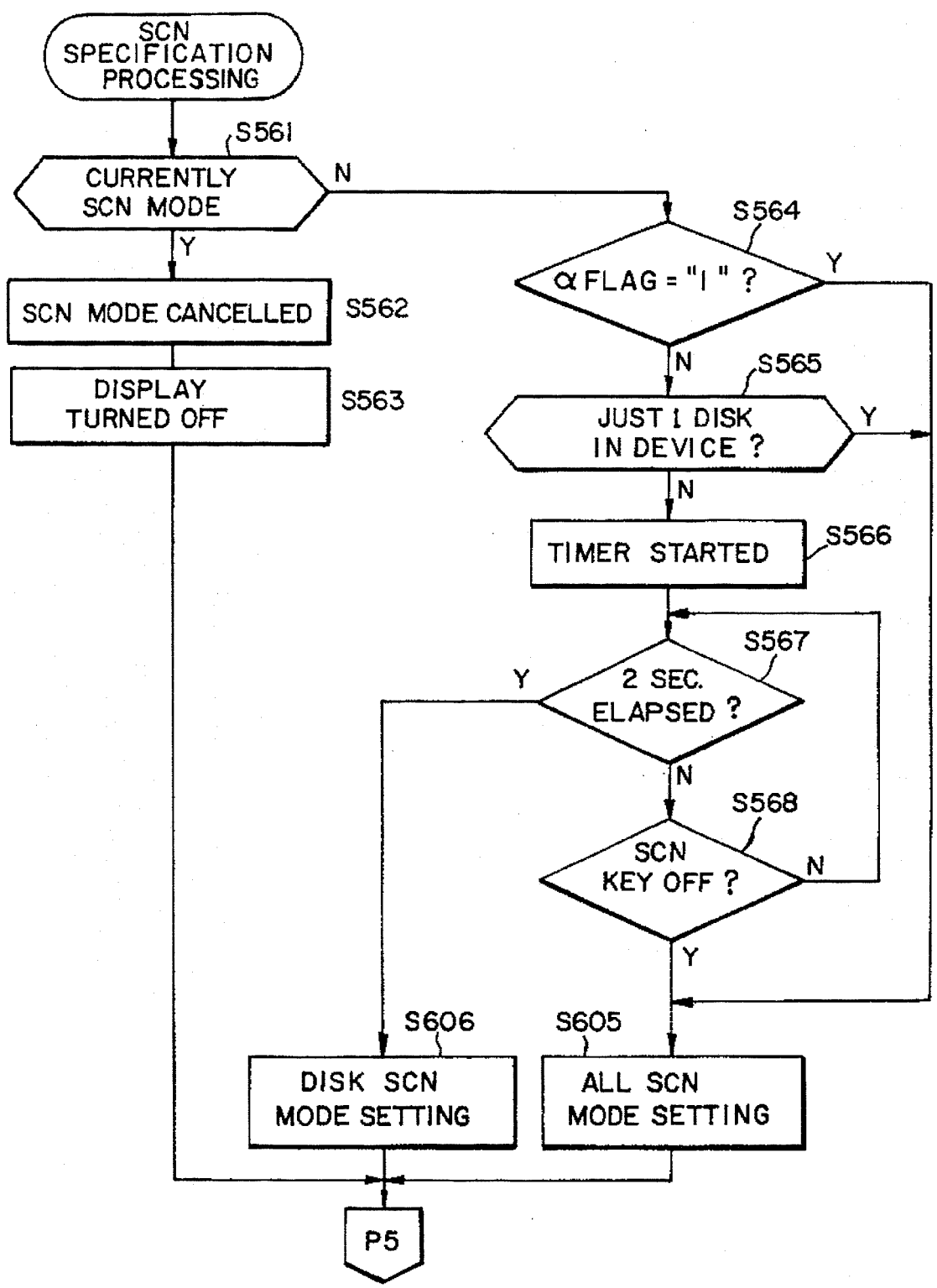
FIG. 35 is a flowchart showing CPU processing operations in play node SCN specification processing.

FIG. 35 is a flowchart of the processing operations of the CPU 233 in SCN specification processing.

In the SCN specification processing shown in FIG. 35, it is determined whether the current processing mode is an SCN mode (step S561). If the current processing mode is an SCN mode, this SCN mode is cancelled (step S562), and any currently-shown display relating to the different forms of SCN processing is turned off (step S563), and the routine goes to the play processing (P5) of FIG. 25. In this case, all the special playback modes having been disconnected, the routine subsequently goes to the normal play processing of step S470 (see FIG. 26).

If it is found in step S561 that the current mode is not an SCN mode, it is determined whether the α flag is "1" (step S564). If the α flag is not "1," it is determined whether there is just one disk in the MD device (step S565). If there is not just a single disk in the MD device, a timer is started (step S566), and then it is determined whether two seconds have elapsed (step S567). If two seconds have not elapsed, it is determined whether the SCN key 111 input supplied in step S505 has gone to the OFF state (step S568). If the SCN key 111 input has gone to the OFF state, the all SCN mode for performing all SCN processing described below is set (step S605), and then the routine goes to P5 shown in FIG. 25.

If it is found in step S568 that the SCN key 111 input is not in the OFF state, the routine goes to step S567. If it is found in step S567 that two seconds have elapsed, i.e., that the SCN key 111 has been kept depressed for two seconds, the disk SCN mode for performing the disk SCN processing described below is set (step S606), and then the routine goes to P5 shown in FIG. 25.

If it is found in step S564 that the α flag is "1" or, in step S565, that there is just one disk in the device, the routine goes to step S605.

This SCN specification processing makes it possible to effectively counter a situation in which the user is misled concerning the current processing mode since, when the α flag is "1" or when there is only one disk in the MD device, a move to disk SCN processing is inhibited, and there is an unconditional move to all SCN processing, and the process makes it possible to avoid a situation in which the operating time is delayed due to detection of long-time depression of the SCN key 111.

Next, the processing operations of the CPU 233 in disk SCN processing (step S450 of FIG. 25) will be described with reference to the flowchart of FIG. 36.

Figure 36:
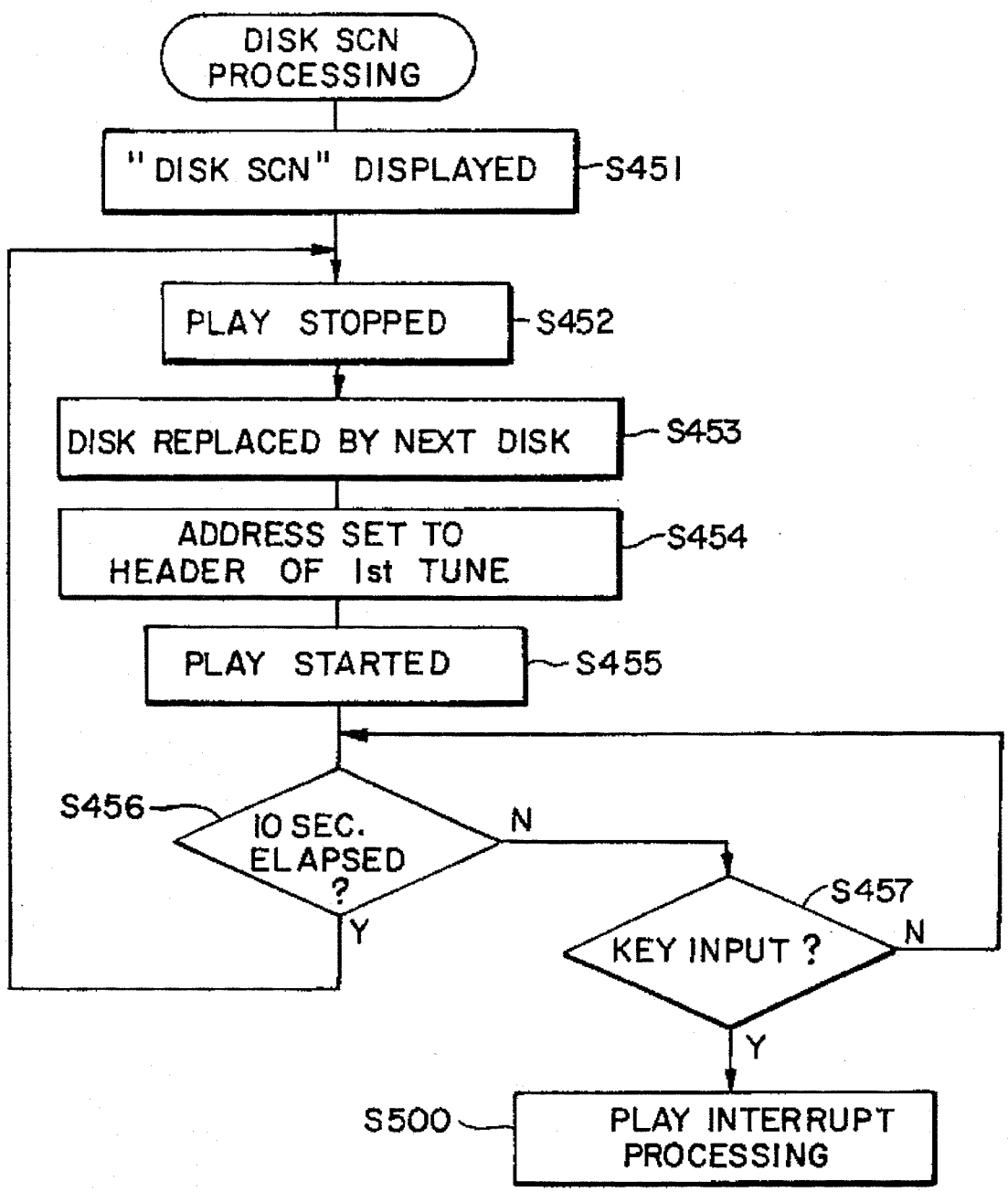
FIG. 36 is a flowchart showing CPU processing operations in disk SCN processing.

In FIG. 36, "DISK SCN," informing the user that the current processing mode is disk SCN processing, is displayed (step S451) and, if playing is currently in progress, the playback operation is stopped (step S452), the disk whose playback has been stopped is replaced by the next disk (step S453), the address is set to the header of the first tune of the replacement disk (step S454), playback operation in respect of the tune for which this setting has been made is started (step S455), and then it is determined whether 10 seconds have elapsed (step S456). If 10 seconds have elapsed, the routine goes to step S452.

If it is found in step S456 that 10 seconds have not elapsed, it is determined whether key input, i.e., as described above, key input from an operating mode key, special playback key or No. key (103–106), has been received (step S457). If there is no such key input, the routine goes to step S456. If such key input has been received, the routine goes into the play interrupt processing of step S500 shown in FIG. 27.

Next, the processing operations of the CPU 233 in the SCN processing (step S460 of FIG. 25) will be described with reference to the flowchart of FIG. 37.

Figure 37:
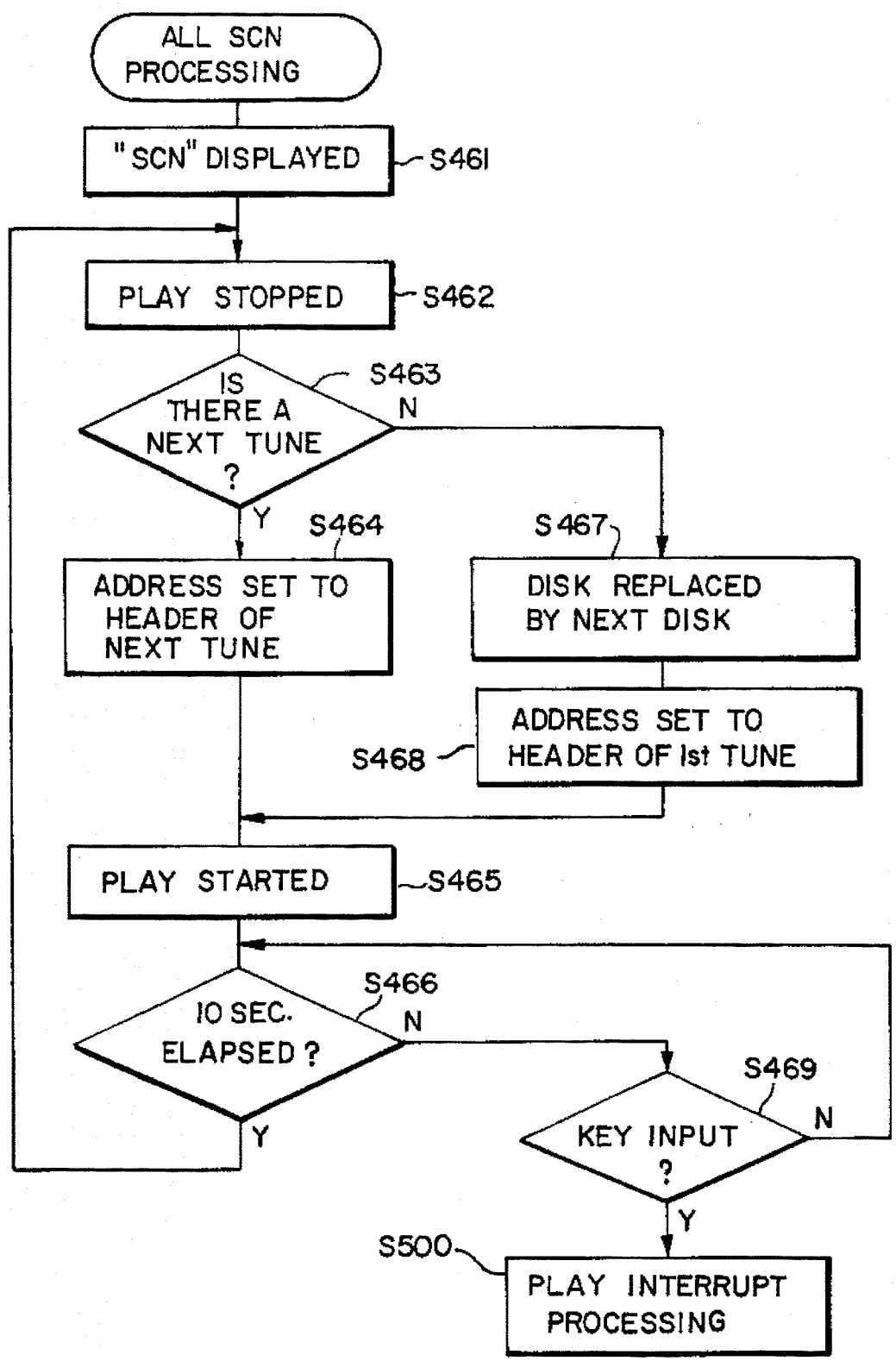
FIG. 37 is a flowchart showing CPU processing operations in all SCN processing.

In FIG. 37, "SCN," informing the user that the current processing mode is all SCN processing, is displayed (step S461) and, if playing is currently in progress, the playback operation is stopped (step S462), and it is determined whether there is a subsequent tune (step S463). If there is a subsequent tune, the address is set to the header of this subsequent tune (step S464), playback operation in respect of this tune is started (step S465), and then it is determined whether 10 seconds have elapsed (step S466). If 10 seconds have elapsed, the routine goes to step S462.

If it is found in step S463 that there is no subsequent tune, the disk on which playing of tunes has been completed is replaced by the next disk (step S467), the address is set to the header of the first tune of the replacement disk (step S468), and the routine goes to step S465.

If it is found in step S466 that 10 seconds have not elapsed, it is determined whether key input, i.e., as described above, key input from an operating mode key, special playback key or No. key (103–106), has been received (step S469). If there is no such key input, the routine goes to step S466. If such key input has been received, the routine goes into the play interrupt processing of step S500 shown in FIG. 27.

With an MD device in which the medium recording-playback device of the invention constituted in the manner described above is used, the trouble involved in operations by a user for selecting disks that are to be ejected can be greatly reduced, since the system comprises auto-eject processing by which disks that are present in the device are ejected in a set order.

Further, with this MD device, the user can select convenient forms of processing, since it is possible to select different forms of eject processing, consisting of the above-noted auto-eject processing and manual eject processing in which required disks are selected.

Further, since alternative selection of the forms of processing is effected in accordance with the length of time the eject key 116 is held depressed, there is no need to provide an extra input key, and so it is possible to ensure sufficient key space.

Further, if there is only one disk in the device, the trouble involved in user operations is greatly reduced, since auto-eject processing is automatically selected.

Although the structure in the embodiments described above is one in which the carrier 3 and player section 4 are independent, the structure may, by way of another embodiment, be made an integral structure in which the player section 4 is integral with the carrier 3. With such a structure, rotational drive of disks loaded into the carrier 3 can be effected rapidly, since the player section 4 is displaced in the Y1 and Y2 directions in FIG. 1.

Further, although the α flag is made "1" in response to a key 107 input in the embodiments described above, the arrangement is also made such that the α flag is made "1" when the CPU 233 detects a state in which loading into the stocker 5 is impossible, such as, e.g., when the storage sections (50a–50d) are full or when, for some reason or other, a fault has occurred in the stocker 5, etc. In particular, for detection of when the stocker 5 becomes faulty, the arrangement is made such that a fault detection means that detects stocker 5 fault states is provided in the MD device, and the α flag is made "1" in response to a detection signal from this fault detection means.

Further, although the standby position of the carrier 3 is a position facing the opening portion of the storage section 50b in the embodiments described above, it is not limited to being a position facing the storage section 50b, but may be in any position, as long as it is not a position facing the disk insertion port 212, in other words a position where the disk insertion port 212 is opened. If, for example, this standby position is a position facing the storage section 50c, the load-in order may be storage section 50c, storage section 50d, storage section 50a, storage section 50b, or storage section 50c, storage section 50d, storage section 50b, storage section 50a, etc. Further, as well as being a position facing one of the storage sections (50a–50b), the standby position may also be a position between the storage section 50a and the storage section 50b, a position between the storage section 50b and the storage section 50c, a position between the storage section 50c and the storage section 50d, or a position between the storage section 50d and the player section 4, etc.

Further, needless to say, although, in the embodiments described above, for the set order relating to the storage sections and to accessing of disks stored in the storage sections, i.e., the load-in order in the stock mode, the ejection order in the eject mode, and the playing order in the play mode, identification #1 is given for the storage section 50a, #2 is given for the storage section 50b, #3 is given for the storage section 50c, and #4 is given for the storage section 50d, the arrangement is made such that #1 is the storage section 50b, #2 is the storage section 50c, #3 is the storage section 50d, and #4 is the storage section 50a, and various changes in the set order are possible.

Further, although the arrangement in the embodiments described above is that opening and closing action of the insertion prevention shutter 217 for the disk insertion port 212 is linked to the carrier 3 raising and lowering action, it is not limited to being linked to the carrier 3 raising and lowering action, but the arrangement is made such that the insertion prevention shutter 217 opening and closing actions are performed in response to set inputs, e.g., electrical commands.

Further, also, in the embodiments described above, a description was given with reference to an MD device that is a special-purpose device for playback, but the same effects can also be achieved by having the same structure for an MD device with which recording is also possible. Also, the play/pause key 108 may be made a play/stop key, or a stop key or a pause key may be provided separately from a play key.

Further, needless to say, although, in the embodiments described above, up to a maximum of five disks can be accommodated, a greater number of disks can be accommodated if the number of storage sections of the stocker 5 is increased.

In the embodiments described above, a description was given with reference to application to an MD device in which the recording medium elements are MDs, but if the recording medium elements are optical recording medium elements such as CDs or video disks, etc. or magnetic recording medium elements such as floppy disks, etc., application to devices that handle these recording media is similarly possible.

Figure 8:
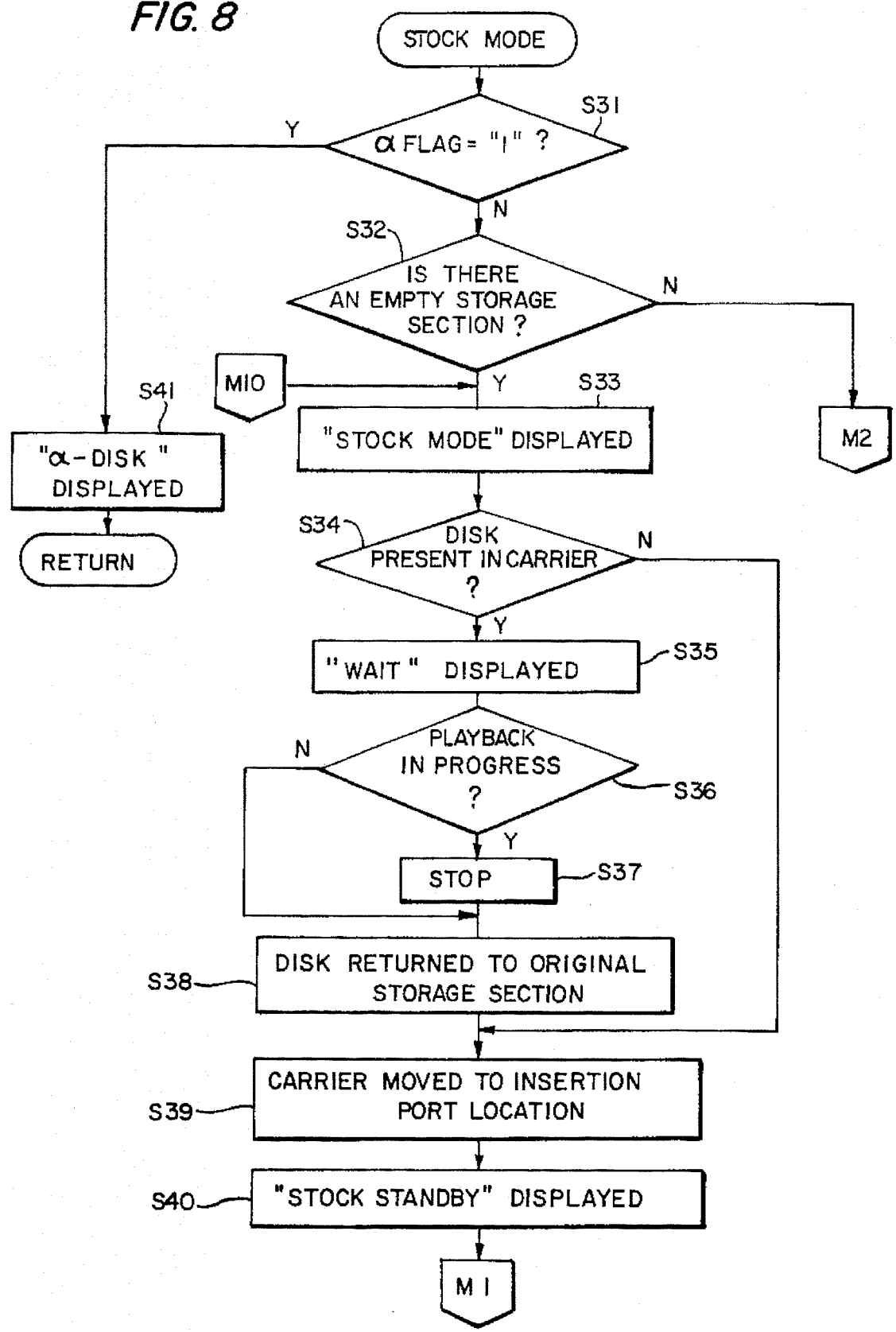
FIG. 8 is a flowchart showing CPU processing operations in the stock mode.

Although the arrangement is made such that the routine goes to step S33 of FIG. 8 if the finding of step S23 in FIG. 7 is negative, the arrangement is also, for example, made such that after a move to step S60 of FIG. 9 and insertion of a disk, in step S85, following the processing of step S81 of FIG. 10, the disk is loaded into the empty storage section corresponding to the No. key (103–106) from which input was received in step S17.

As noted in the description above and described in relation to steps S16, 17 and 21–23, in cases where the operating mode is not specified, if, when oe key 107 or No. key (103–106) input is received, no disk corresponding to this key input is present, a subsequently-inserted disk is loaded onto the playback section 4, if the input is supplied from the α key 107, or is loaded into an empty storage section if the input is supplied from a No. key (103–106). However, this arrangement need not be limited to cases in which the operating mode is not specified, but the arrangement is also made such that even at the time of, e.g., eject operation or play operation, if α key 107 or No. key (103–106) input is received but no disk corresponding to this key input is present, a subsequently-inserted disk is loaded onto the playback section 4, if the input is supplied from the α key 107, or is loaded into an empty storage section if the input is supplied from a No. key (103–106). After this, it is possible to move to the stock mode.

The arrangement is also made such that, in cases where α key 107 or No. key (103–106) input is received during disk reloading standby (e.g., during the 10-second standby of step S151) at the time of eject operation, if no corresponding disk is present, the disk that is on reloading standby is reloaded into its original storage section and, after that, a subsequently-inserted disk is loaded onto the playback section 4, if the input is supplied from the α key 107, or is loaded into an empty storage section if the input is supplied from a No. key (103–106).

The medium recording-playback device of the invention constituted in the manner described above makes it possible to greatly reduce the trouble of operations for selection by the user of recording medium elements that are to be ejected, since the arrangement is made such that recording medium elements that are present in the device are ejected in a set order.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A medium recording-playback device which comprises:
a medium storage means in which a plurality of recording medium elements are respectively stored in a plurality of storage regions that are distinguished by identification numbers;
a transport means by which the recording medium elements, currently installed, in said device are loaded into the respective storage regions of said medium storage means or are ejected to a set position from an insertion port;
an operating means for inputting ejection commands that sets one of an automatic ejection process and a manually-selected ejection process in respect to the removal of the recording medium elements, the operating means including an input operator key and a timer responsive to operation of the input operator key to set a time period, a predetermined time period being previously set in the operating means, and a comparison of the operator-set time period with the predetermined time period determining whether said automatic ejection system process or said manually-selected ejection process is enabled; and
a control means which, in response to said ejection commands, causes recording medium elements that are present in said device to be ejected in a set order.

2. A medium recording-playback device as claimed in claim 1 wherein the operating means includes a key member to cause the medium recording-playback device to operate as a single disk player.

3. A medium recording-playback device as claimed in claim 1 wherein the control means further includes a second timer set to a second predetermined time period and, if a selected one of said recordin medium elements is not removed from the device within the second predetermined time period, it is subsequently reloaded into the medium storage means into its storage region.

4. A medium recording-playback device as claimed in claim 1 wherein said control means, in response to a set input, causes one of the recording medium elements that has been ejected as far as said set position in the course of the automatic ejection processing to be loaded back into said device, and causes the automatic ejection processing to be performed in respect of said recording medium elements other than the recording medium element that has been loaded back into said device.

5. A medium recording-playback device which comprises:
a medium storage means in which a plurality of recording medium elements are respectively stored in a plurality of storage regions that are distinguished by identification numbers;
a transport means by which the recording medium elements, currently installed in said device are loaded into the respective storage regions of said medium storage means or are ejected to a set position from an insertion port;
an operating means for inputting ejection commands that sets one of an automatic ejection process and a manually-selected ejection process in respect to the removal of the recording medium elements and inputting stored medium designations which designate storage regions in correspondence to said identification numbers, the operating means including an input operator key and a timer responsive to operation of the input operator key to set a time period, a predetermined time period being previously set in the operating means, and a comparison of the operator-set time period with the predetermined time period determining whether said automatic ejection process or said manually-selected ejection process is enabled; and
a control means which, in response to said ejection commands, either selects said automatic ejection processing, in which said recording medium elements that are present in said device are ejected in a set order, or said manually selected ejection processing, in which said recording medium elements that are designated by said stored medium designations are ejected.

6. A medium recording-playback device as claimed in claim 5 wherein said control means selects said automatic ejection processing or said manually selected ejection processing in accordance with differences between the input times of said ejection commands.

7. A medium recording-playback device as claimed in claim 6 wherein, if there is only one recording medium element present in said device, said control means selects only said automatic ejection processing.

8. A medium recording-playback device as claimed in claim 6 wherein said control means, in response to a set input, causes one of the recording medium elements that has been ejected as far as said set position in the course of the automatic ejection processing to be loaded back into said device, and causes the automatic ejection processing to be performed in respect of said recording medium elements other than the recording medium element that has been loaded back into said device.

9. A medium recording-playback device as claimed in claim 5 wherein, if there is only one recording medium element present in said device, said control means selects only said automatic ejection processing.

10. A medium recording-playback device as claimed in claim 9 wherein said control means, in response to a set input, causes one of the recording medium elements that has been ejected as far as said set position in the course of the automatic ejection processing to be loaded back into said device, and causes the automatic ejection processing to be performed in respect of said recording medium elements other than the recording medium element that has been loaded back into said device.

11. A medium recording-playback device as claimed in claim 5 wherein said control means, in response to a set input, causes one of the recording medium elements that has been ejected as far as said set position in the course of the above-noted automatic ejection processing to be loaded back into said device, and causes the automatic ejection processing to be performed in respect of said recording medium elements other than the recording medium element that has been loaded back into said device.

* * * * *